(12) United States Patent
Matsumoto

(10) Patent No.: US 7,881,912 B2
(45) Date of Patent: Feb. 1, 2011

(54) ORTHOGONAL BASIS BUBBLE FUNCTION ELEMENT NUMERICAL ANALYSIS METHOD, ORTHOGONAL BASIS BUBBLE FUNCTION ELEMENT NUMERICAL ANALYSIS PROGRAM, AND ORTHOGONAL BASIS BUBBLE FUNCTION ELEMENT NUMERICAL ANALYZING APPARATUS

(75) Inventor: Junichi Matsumoto, Tsukuba (JP)

(73) Assignees: Japan Science and Technology Agengy, Kawaguchi-Shi (JP); National Institute of Advanced Industrial Science and Technology, Tokyo (JP)

( * ) Notice: Subject to any disclaimer, the term of this patent is extended or adjusted under 35 U.S.C. 154(b) by 867 days.

(21) Appl. No.: 11/791,659

(22) PCT Filed: Nov. 25, 2005

(86) PCT No.: PCT/JP2005/021727

§ 371 (c)(1),
(2), (4) Date: May 25, 2007

(87) PCT Pub. No.: WO2006/057359

PCT Pub. Date: Jun. 1, 2006

(65) Prior Publication Data

US 2007/0299641 A1    Dec. 27, 2007
US 2008/0234993 A2    Sep. 25, 2008

(30) Foreign Application Priority Data

Nov. 26, 2004  (JP)  ............... 2004-343213
Mar. 14, 2005  (JP)  ............... 2005-071239

(51) Int. Cl.
*G06F 17/10*  (2006.01)

(52) U.S. Cl. .......... 703/2; 703/6; 703/22; 703/18; 703/9; 345/420; 345/175; 345/423

(58) Field of Classification Search .............. None
See application file for complete search history.

(56) References Cited

FOREIGN PATENT DOCUMENTS

JP    2002-328955    11/2002

(Continued)

OTHER PUBLICATIONS

Kong et al. High_order triangular and tetrahedral dinite elements with mass lumping for solving the wave equation Journal of Engineering Mathematics 35: pp. 405-426, 1999.*

(Continued)

*Primary Examiner* — Kamini Shah
*Assistant Examiner* — Cuong V Luu
(74) *Attorney, Agent, or Firm* — Kratz, Quintos & Hanson, LLP

(57) ABSTRACT

A known analytical physical quantity of an analysis subject and an element level consistent mass matrix of each element are obtained by acquiring units. A bubble function is integrated for each element, and the element level diagonal mass matrix of each element is computed by substituting the value that is integrated for the element level consistent mass matrix of each element. The diagonal mass matrix for the entire analysis region is computed by the summation (superposition) of the element level diagonal mass matrices of each element and inverse matrix thereof is computed. A motion of the analysis subject is analyzed based on the known analytical physical quantity, the diagonal mass matrix for the entire analysis region, and the inverse matrix thereof.

3 Claims, 28 Drawing Sheets

FOREIGN PATENT DOCUMENTS

| | | |
|---|---|---|
| JP | 2003-220808 | 8/2003 |
| WO | WO 2004/088563 | 10/2004 |

OTHER PUBLICATIONS

Azzedddine Soulaimani, Yosef Saad An arbitrary Lagrangian-Eulerian finite element method for solving three-dimensional free surface flows Compter Methods Applied Mechanics and Engineering 162, pp. 79-106, 1998.*

D.N. Arnold, et al.; "A Stable Finite Element for the Stokes Equations;" *Calcolo*; vol. 21; No. 4; Oct.-Dec. 1984; pp. 337-344.

J.C. Simo, et al.; "Stable and Time-Dissipative Finite Element Methods for the Incompressible Navier-Strokes Equations in Advection Dominated Flows;" *International Journal for Numerical Methods in Engineering*; vol. 38; 1995; pp. 1475-1506.

J. Matsumoto; "Two-Level Three-Level Finite Element Method for Incompressible Viscous Flow Analysis Based on Bubble Functions;" *Applied Mechanics*; vol. 7; Aug. 2004; pp. 339-346./Yes-Abstract.

K. Hatanaka; "Computational Study on Forward and Inverse Analyses of Incompressible Viscous Fluid Flow by Multistep Finite Element Method;" A doctoral thesis at the graduate school of Chuo University; Mar. 1993/Partial translation (Chapter 1, 1-1, 1-2, 8, 8-1, 8-2.).

Zienkiewicz et al; "On Discontinuous Galerkin methods;" International J. for Numerical Methods in Engineering 58 (2003) pp. 1119-1148.

Matsumoto et al; "A Consideration of Finite Element Method Analysis of Incompressible Fluid using Bubble Function;" Annual Conference of the Japan Society for Industrial and Applied Mathematics (1996) pp. 46-47—Partial Translation.

Matsumoto et al; "Incompressible viscous Flow Analysis and Adaptive Finite Element Method Using Linear Bubble Function;" J. Applied Mech. (Japan Society of Civil Engineers), vol. 2 (Aug. 1999) pp. 223-232—English Abstract.

Matsumoto et al; "Shape Identification for Fluid Structure Interaction Problem Using Improved Bubble Element;" International J. Computational Fluid Dynamics vol. 15 (2001) pp. 33-45.

Japanese Office Action dated Aug. 3, 2010, along with its English Translation.

* cited by examiner

Maximum cone height = 0.9456

Maximum cone height = 0.7735

Maximum cone height = 0.9458

Maximum cone height = 0.7039

Maximum cone height = 0.9453

Maximum cone height = 0.9998

Maximum cone height = 0.8780

Maximum cone height = 1.0015

Maximum cone height = 0.8602

Maximum cone height = 0.9950

ORTHOGONAL BASIS BUBBLE FUNCTION ELEMENT NUMERICAL ANALYSIS METHOD, ORTHOGONAL BASIS BUBBLE FUNCTION ELEMENT NUMERICAL ANALYSIS PROGRAM, AND ORTHOGONAL BASIS BUBBLE FUNCTION ELEMENT NUMERICAL ANALYZING APPARATUS

TECHNICAL FIELD

The present invention relates to an orthogonal basis bubble function element numerical analysis method, an orthogonal basis bubble function element numerical analysis program, and an orthogonal basis bubble function element numerical analyzing apparatus for performing highly reliable numerical simulation for analysis by finite element method (finite element analysis) that adopts bubble function element by using a mass matrix composed only of diagonal terms having high computational efficiency.

BACKGROUND ART

Conventional bubble function element is explained. FIG. 47 is a schematic showing a conventional two-dimensional bubble function element, and FIG. 48 is a schematic showing a conventional three-dimensional bubble function element. As shown in FIGS. 47 and 48, a triangular (tetrahedral) bubble function element is expressed by the following equation (1) in the isoparametric coordinate system [r, s] ({r, s, t}) by using 4 (5) nodes composed of 3 (4) points forming the triangle (tetrahedron) and a center of gravity point (refer to non-patent documents 1, 2, and 3).

[Equations 1]

$$u_h | \Omega_e = \sum_{\alpha=1}^{N+1} \Phi_\alpha u_\alpha + \phi_B u_B = \Phi^T u = u^T \Phi \tag{1}$$

$$\Phi_\alpha = \Psi_\alpha - \frac{1}{N+1}\phi_B, \alpha = 1 \ldots N+1 \tag{2}$$

In equation (1), $\Phi_\alpha$ and $\phi_B$ represent the shape functions of bubble function element, $u_\alpha$ and $u_B$ represent the values of each vertex (analytical physical quantity) of a triangle (tetrahedron) and the value of the center of gravity point (analytical physical quantity), and N represents the number of spatial dimensions. Shape functions are expressed by the following equations (3) to (6) in vector-based description.

[Equations 2]

Two-Dimensions $$\Phi^T = [\Phi_1 \Phi_2 \Phi_3 \phi_B] \tag{3}$$

$$u^T = [u_1 u_2 u_3 u_B] \tag{4}$$

Three-Dimensions $$\Phi^T = [\Phi_1 \Phi_2 \Phi_3 \Phi_4 \phi_B] \tag{5}$$

$$u^T = [u_1 u_2 u_3 u_4 u_B] \tag{6}$$

In equation (2), $\psi_\alpha$ represents the shape function of the linear element of two dimensions or three dimensions, and is expressed by the following equations (7) and (8).

[Equations 3]

Two-Dimensions $$\Psi_1 = 1-r-s, \Psi_2 = r, \Psi_3 = s \tag{7}$$

Three-Dimensions $$\Psi_1 = 1-r-s-t, \Psi_2 = r, \Psi_3 = s, \Psi_4 = t \tag{8}$$

Shape function $\phi_B$ is called a bubble function. The bubble function is defined for each element such that the value is zero on the boundary of elements and is one at the center of gravity point. In an unsteady problem, a finite element formula adopting a bubble function element for spatial discretization can be expressed as the following equation (9).

[Equations 4]

$$M\dot{u} + F(u) = 0 \tag{9}$$

In equation (9), u represents an unknown analytical physical quantity (pollutant concentration, temperature, discharge, water depth, flow velocity, pressure, displacement, etc.), M is a mass matrix, and F(u) is a term collectively containing terms other than the temporal differential term. As temporal discretization of equation (9), a four-step solution based on Taylor expansion is expressed by the following equations (10) to (13) (refer to non-patent document 4).

[Equations 5]

Four-step solution

< 1st step >

$$u^{n+1/4} = u^n - M^{-1}\frac{\Delta t}{4}F(u^n) \tag{10}$$

< 2nd step >

$$u^{n+2/4} = u^n - M^{-1}\frac{\Delta t}{3}F(u^{n+1/4}) \tag{11}$$

< 3rd step >

$$u^{n+3/4} = u^n - M^{-1}\frac{\Delta t}{2}F(u^{n+2/4}) \tag{12}$$

< 4th step >

$$u^{n+1} = u^n - M^{-1}\Delta t F(u^{n+3/4}) \tag{13}$$

The superscript n in equations (10) to (13) represents a known analytical physical quantity at present time n, and n+1 represents an unknown analytical physical quantity at the time after an infinitesimal time $\Delta t$ has elapsed from a given time n.

Non-patent document 1: D. N. Arnold, F. Brezzi and M. Fortin, "A Stable Finite Element for the Stokes Equations", Calcolo, Vol. 21, 1984, pp. 337-pp. 344

Non-patent document 2: J. C. Simo, F. Armero and C. A. Taylor, "Stable and Time-Dissipative Finite Element Methods for the Incompressible Navier-Stokes Equations in Advection Dominated Flows", International Journal for Numerical Methods in Engineering, Vol. 38, 1995, pp. 1475-pp. 1506

Non-patent document 3: Jun-ichi Matsumoto, "Two-Level Three-Level Finite Element Method for Incompressible Viscous Flow Analysis Based on Bubble Functions", Journal of Applied Mechanics (Japan Society of Civil Engineers), Vol. 7, August 2004, pp. 339-pp. 346

Non-patent document 4: Katsunori Hatanaka, "Computational Study on Forward and Inverse Analyses of Incompressible Viscous Fluid Flow by Multistep Finite Element Method", PhD Thesis, Chuo University, 1993

DISCLOSURE OF INVENTION

Problem to be Solved by the Invention

As shown in equations (10) to (13), the inverse matrix of a mass matrix is necessary for obtaining an unknown analytical physical quantity $u^{n+1}$ from the known analytical physical quantity $u^n$ using a four-step solution. FIG. 49 shows an analytical model for the analysis of a conventional Rotating Cone problem; FIG. 50 shows contours as an initial condition for the analysis of a conventional Rotating Cone problem; and FIG. 51 shows contours as the computed result of the analysis of a conventional Rotating Cone problem using a consistent mass matrix (refer to non-patent document 4).

An analytical model 4900 shown in FIG. 49 is set as an initial condition (zero rotation). If the model is rotated a given number of times, e.g., five rotations, using the inverse matrix of a mass matrix, the contour model 5000, shown in FIG. 50, of the analytical model 4900 at the initial condition produces the result (contour model 5100) shown in FIG. 51.

In general, as bubble function elements are used for temporal discretization, the above mass matrix is a sparse distribution matrix (consistent mass matrix). Therefore, numerical analysis for obtaining the inverse matrix of the distribution matrix (consistent mass matrix) requires large memory capacity and much computation time, and problems such as high manufacturing cost of the apparatus and delay of the analytical process exist.

In order to solve these problems, an approximate matrix (lumped mass matrix), that is given components only in diagonal terms by summing (by concentrating) components of each row in a mass matrix, is commonly used. In the case a lumped mass matrix is used, as the components of a matrix are only diagonal terms, the inverse matrix of the lumped mass matrix is a matrix containing the reciprocals of each diagonal component and numerical analysis can be executed with a substantially small memory capacity and short computing time compared to the case of using a consistent mass matrix without approximation and the inverse matrix of the consistent mass matrix.

However, in the case that the above lumped mass matrix is used, the lumped mass matrix is not an identical matrix to its original matrix, but an approximate matrix. Therefore, if the analytical model 4900, at an initial condition (zero rotation) shown in FIG. 49, is rotated a given number of times, e.g., five rotations, the contour model 5000, shown in FIG. 50, of the analytical model 4900 at the initial condition produces the result (contour model 5200) shown in FIG. 52. As the contour model 5200 obtained by rotating the analytical model 4900 five rotations is highly deformed compared to the contour model 5100 shown in FIG. 51, the precision of computation is low, and a problem of low reliability of the analysis results exists.

In order to solve the problems associated with the conventional techniques described above, an object of the present invention is to provide an orthogonal basis bubble function element numerical analysis method, an orthogonal basis bubble function element numerical analysis program, and an orthogonal basis bubble function element numerical analyzing apparatus that are simple and that can realize highly reliable finite element analysis.

Means for Solving Problem

To solve the above programs and achieve an object, the orthogonal basis bubble function element numerical analysis method, orthogonal basis bubble function element numerical analysis program, orthogonal basis bubble function element numerical analysis and orthogonal basis bubble function element numerical analysis apparatus according to the present invention is characterized by acquiring a consistent mass matrix of each element of an analysis subject; generating, based on the bubble function of each element of the analysis subject, the diagonal mass matrix of each element by diagonalizing the consistent mass matrix of each element obtained at the acquiring; and analyzing a motion of the analysis subject based on a known analytical physical quantity of the analysis subject and the diagonal mass matrix of each element generated at the generating step.

Further, generating the diagonal mass matrix of each element may be by substituting an integration value of the bubble function of each element into the consistent mass matrix of each element. Moreover, computing the diagonal mass matrix of an entire analysis subject region based on the diagonal mass matrix generated; computing an inverse matrix of the diagonal mass matrix, for the entire analysis subject region; and analyzing the motion of the analysis subject based on the known analytical physical quantity of the analysis subject, the diagonal mass matrix for the entire analysis subject region, and the inverse matrix computed at the second computing may be also be performed.

According to the present inventions, for finite element analysis using a bubble function element, without approximation of a mass matrix, a bubble function that produces a mass matrix in the form of a diagonal matrix by satisfying the following conditional expression (14) is employed.

[Equations 6]

$$\langle \phi_B, 1 \rangle_{\Omega_e} = \|\phi_B\|_{\Omega_e}^2 = CA_2 \quad (14)$$

Two-dimensions $$C = \frac{3}{4}$$

Three-dimensions $\quad (15\text{-}1)$ $$C = \frac{4}{5}$$

$$\langle \phi_B, 1 \rangle_{\Omega_e} = \int_{\Omega_e} \phi_B \, d\Omega$$

$$\|\phi_B\|_{\Omega_e}^2 = \langle \phi_B, \phi_B \rangle_{\Omega_e} = \langle \phi_B^2, 1 \rangle = \int_{\Omega_e} \phi_B^2 \, d\Omega \quad (15\text{-}2)$$

$$A_e = \int_{\Omega_e} d\Omega \quad (15\text{-}3)$$

The above equations (15-1) to (15-3) are integrals for the formulation of bubble function elements, and $\langle \bullet, \bullet \rangle_{\Omega_e}$ represents the integral of element region $\Omega_e$, and $A_e$ represents the area (volume) of element region $\Omega_e$. By the equations, it is possible to analyze using precise diagonal mass matrix of each element by introducing the condition that the basis (shape function) of bubble function element is orthogonal, without using a lumped mass matrix that is approximated by summing up components in the consistent mass matrix of each element. The diagonal mass matrix for the entire region analysis subject and its inverse matrix can simply be computed, and motion of the analysis subject can be analyzed precisely using a unknown physical quantity of the analysis subject.

Effect of the Invention

An orthogonal basis bubble function element numerical analysis method, an orthogonal basis bubble function element numerical analysis program, and an orthogonal basis bubble function element numerical analyzing apparatus related to the present invention facilitate improvement in the reliability of motion analysis of an analysis subject by a simple and precise analytical process. The present invention facilitates the realization of an efficient analyzing method (orthogonal basis bubble function element numerical analysis method), such as reduction of required memory capacity and shortening of analysis time.

Figure 1:
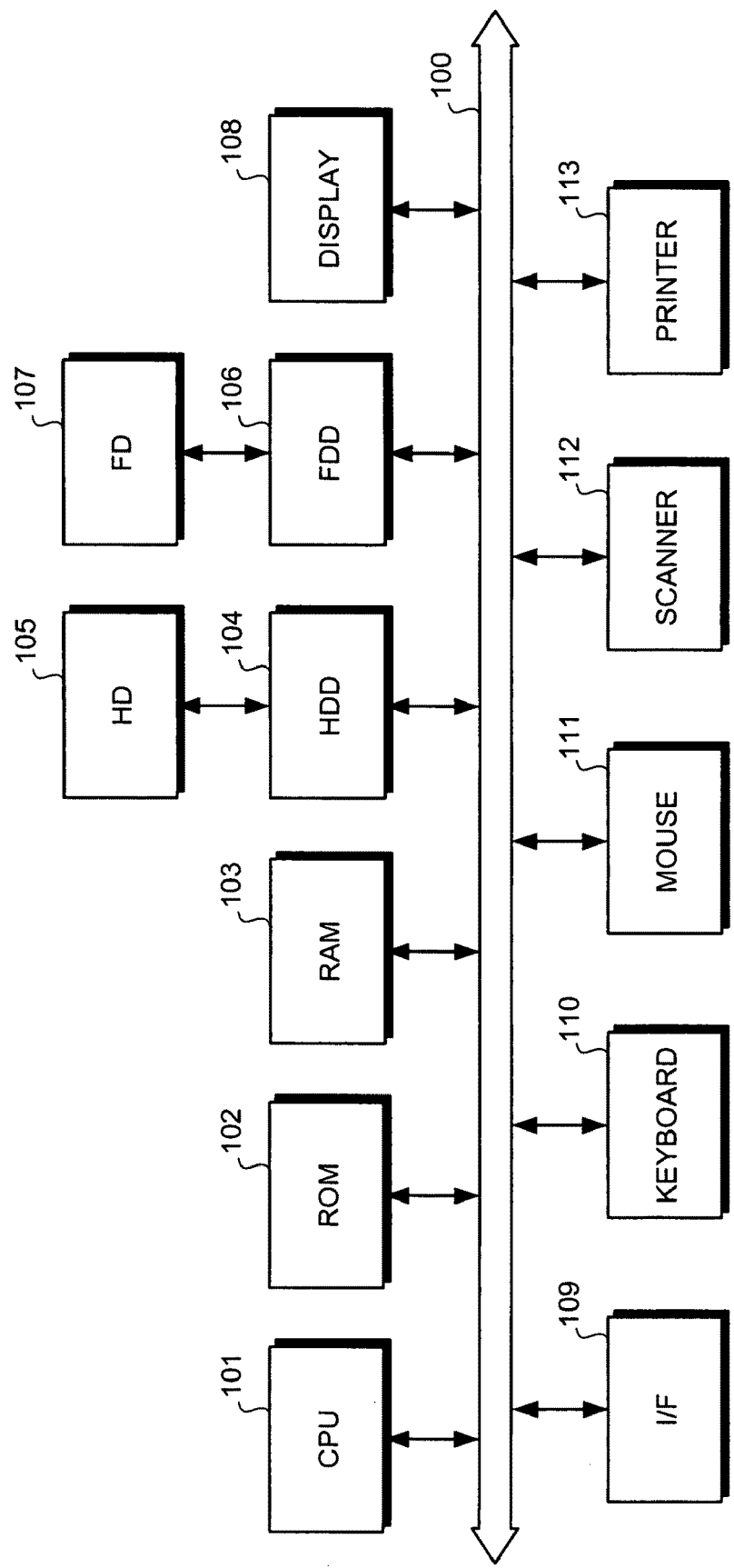
FIG. 1 is a block diagram showing the hardware configuration of a numerical analyzing apparatus according to an embodiment of the present invention.

EXPLANATIONS OF LETTERS OR NUMERALS 200 numerical analyzing apparatus
201 data storing unit
202 first acquiring unit
203 second acquiring unit
204 generating unit
205 first computing unit
206 second computing unit
207 analyzing unit

BEST MODE(S) FOR CARRYING OUT THE INVENTION

With reference to the accompanying drawings, exemplary embodiments of an orthogonal basis bubble function element numerical analysis method, an orthogonal basis bubble function element numerical analysis program, and an orthogonal basis bubble function element numerical analyzing apparatus (hereinafter, "numerical analyzing apparatus") according to the present invention are explained in detail.

(Hardware Configuration of a Numerical Analyzing Apparatus)

The hardware configuration of the numerical analyzing apparatus related to this embodiment is described. FIG. 1 is a block diagram showing the hardware configuration of the numerical analyzing apparatus according to an embodiment of the present invention. The numerical analyzing apparatus is equipped with a CPU 101, a ROM 102, a RAM 103, an HDD (hard disk drive) 104, an HD (hard disk) 105, an FDD (flexible disk drive) 106, an FD (flexible disk) 107 as an example of removable recording medium, a display 109, an I/F (interface) 109, a keyboard 110, a mouse 111, a scanner 112, and a printer 113. Each component is connected by a bus 100.

The CPU 101 manages control of the entire numerical analyzing apparatus. The ROM 102 stores programs such as a boot program, etc. The RAM 103 is used as a work area of the CPU 101. The HDD 104, under the control of the CPU 101, controls the reading and writing of data on the ED 105. The HD 105 stores data written under the control of the HDD 104.

The FDD 106, under the control of the CPU 101, controls the reading and writing of data on the FD 107. The FD 107 stores data written under the control of the FDD 106, and provides the numerical analyzing apparatus with the data stored on the FD 107. As a removable recording medium, in addition to the FD 107, a CD-ROM (CD-R, CD-RW), an MO, a DVD (Digital Versatile Disk), and a memory card can be used. The display 108 displays a cursor, icons, tool boxes, and data such as text, images, and information on functions. For the display 108, for example, a CRT, a TFT liquid crystal display, and plasma display can be adopted.

The I/F 109 is connected to a network, such as the internet, through telephone lines and then is connected to other devices via the network. The I/F 109 interfaces the internal units to the network, and controls the input and output of data from external devices. For the I/F 109, for example, a modem and LAN adaptor can be adopted.

The keyboard 110, equipped with keys for character, numeric, and various command entry, performs data input. The keyboard 110 can be substituted with a touch-panel input pad or a numeric key pad. The mouse 111 is used for moving a cursor, selecting an area, and moving and changing the size of windows. A device having functions equivalent to a pointing device may also be adopted, such as a track ball or a joy stick.

The scanner 112 optically reads images and imports image data into the numerical analyzing apparatus. The printer 113 prints image data and text data. For the printer 113, for example, a laser printer or an inkjet printer can be adopted.

(Functional Configuration of a Numerical Analyzing Apparatus)

Figure 2:
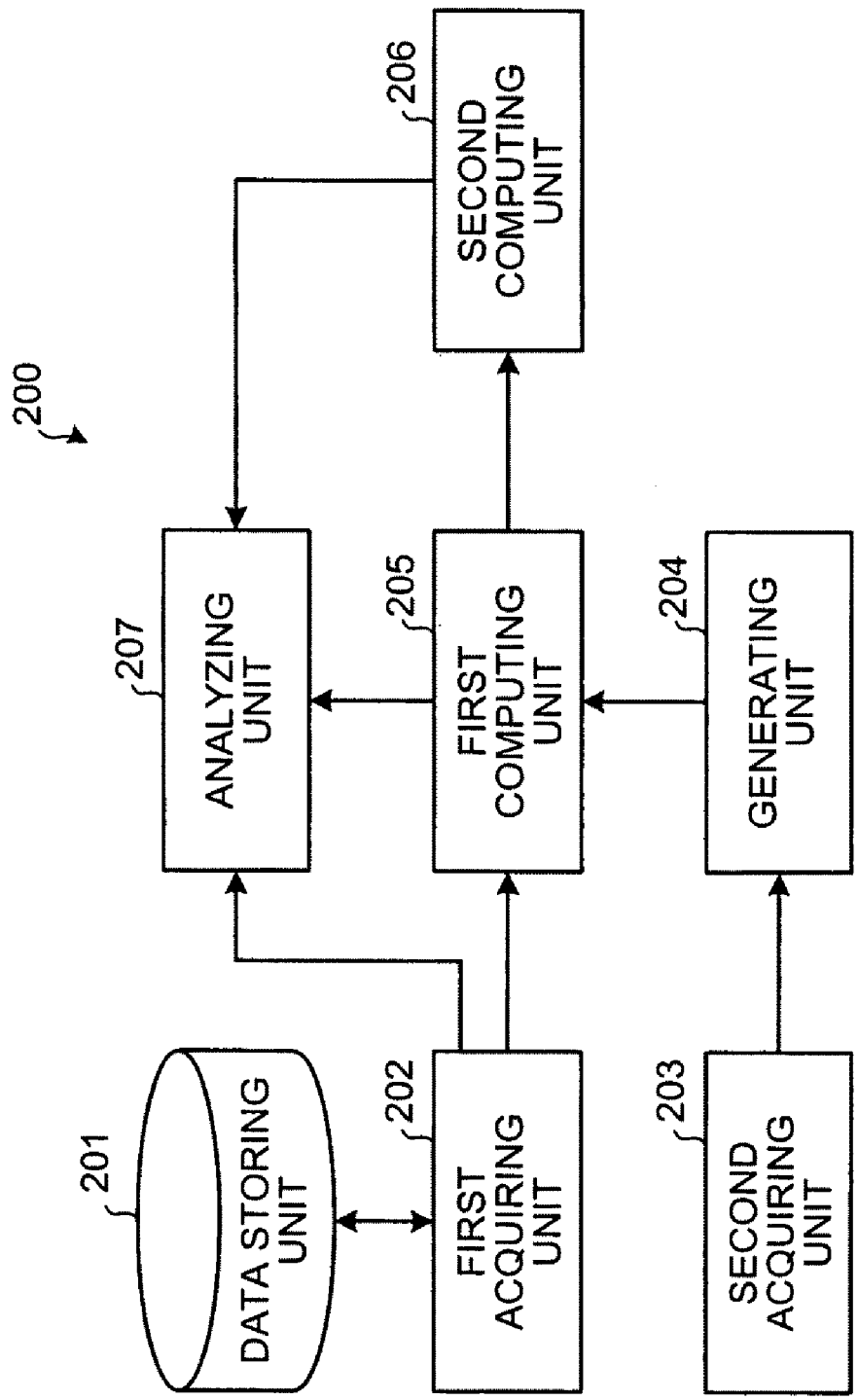
FIG. 2 is a block diagram showing the functional configuration of a numerical analyzing apparatus according to an embodiment of the present invention.

A functional configuration of the numerical analyzing apparatus according to an embodiment of the present invention is described. FIG. 2 is a block diagram showing the functional configuration of the numerical analyzing apparatus according to an embodiment of the present invention. As shown in FIG. 2, a numerical analyzing apparatus 200 includes a data storing unit 201, a first acquiring unit 202, a second acquiring unit 203, a generating unit 204, a first computing unit 205, a second computing unit 206, and an analyzing unit 207.

Figure 3:
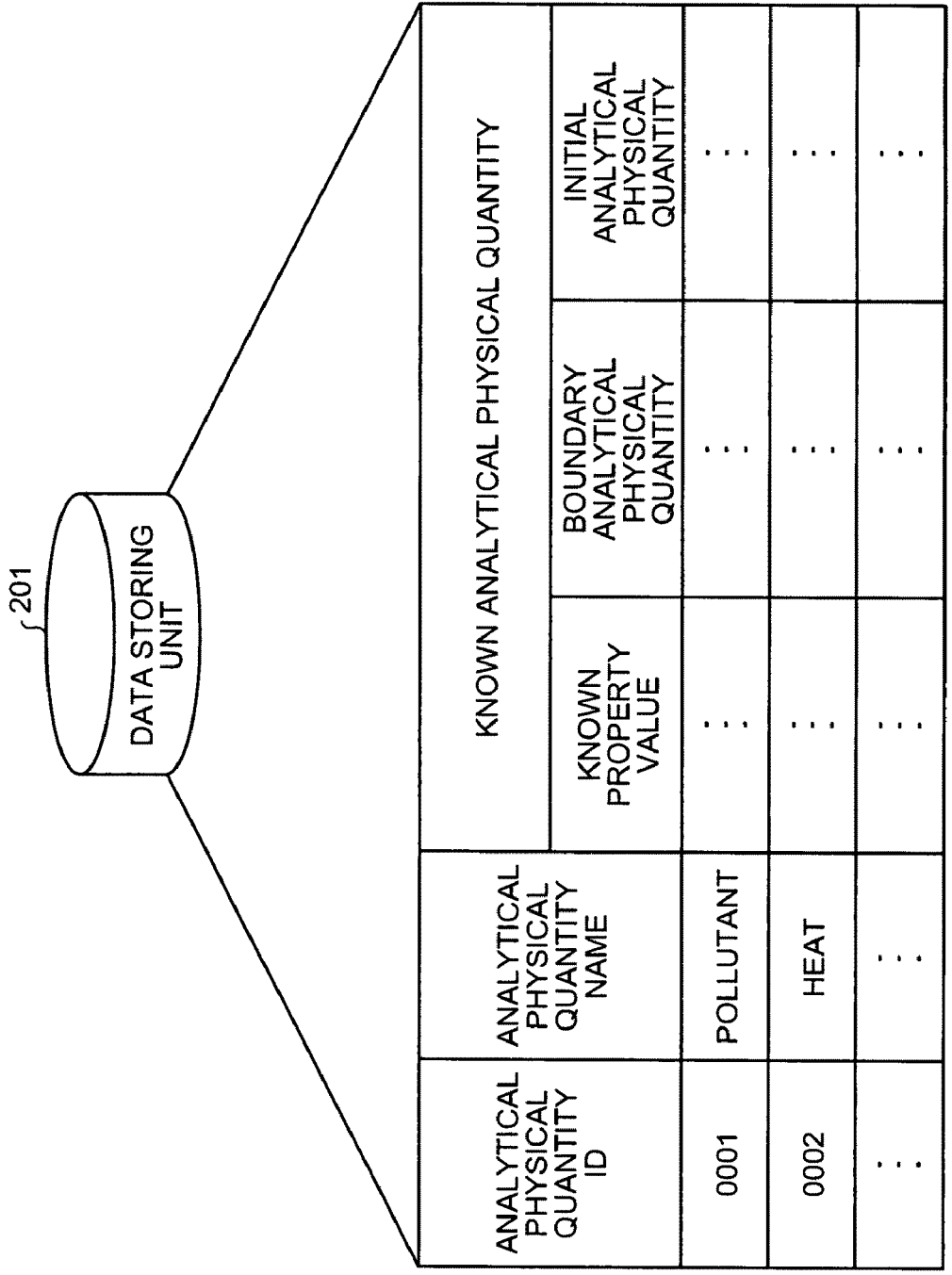
FIG. 3 is a schematic showing an information table of analytical physical quantities stored in a data storage unit of a numerical analyzing apparatus according to an embodiment of the present invention.

The data storing unit 201 stores an information table of analytical physical quantities for the numerical analysis of an analysis subject. The information table of analytical physical quantities is explained. FIG. 3 is a schematic showing the information table of analytical physical quantities related to an embodiment of the present invention.

As shown in FIG. 3, analytical physical quantity ID's, analytical physical quantity names (pollutants, heat, fluid, structure, etc.), and known analytical physical quantities are stored in the information table of analytical physical quantities related to the analysis subject. As known analytical physical quantities, known physical property values, boundary analytical physical quantities, and initial analytical physical quantities are stored.

The analytical physical quantity ID and the analytical physical quantity names are information specified at the input operation performed by a user, and when the analytical physical quantity ID and the analytical physical quantity names are specified, known physical property values, boundary analytical physical quantities, and initial analytical physical quantities can be extracted.

The known physical property value is information for determining the physical property of the analysis subject for which an analytical physical quantity ID or an analytical physical quantity name is specified at the input operation performed by the user. Diffusion coefficient, density, specific heat, thermal conductivity, coefficient of viscosity, coefficient of bottom friction, Young's modulus, and Poisson's ratio are examples of known physical properties.

The boundary analytical physical quantity is information that indicates a condition under which analysis is performed of an analysis region (mesh consisting of triangular or tetrahedral partitions) that consists of each element of the analysis subject. Substantial concentration, temperature, flow velocity, pressure, discharge, water depth, and displacement are the examples of boundary analytical physical quantities.

In the case that the analysis subject is, for example, a pollutant or heat, substantial concentration=origin (source) value, or temperature=origin (source) value at the origin (source) of the pollutant or heat, respectively, is the boundary analytical physical quantity. In the case that the analysis subject is fluid and a boundary is a wall, it is possible to set flow velocity=0 and discharge=0, and in the case that the analysis subject is a structure and the boundary is a fixed object, it is possible to set displacement=0. Steady problems (problems containing analytical physical quantities that are not time-dependent and that do not change with time lapse) can be analyzed using the known physical property values and boundary analytical physical quantities.

In the case of unsteady problems (problems containing analytical physical quantities that are time-dependent and that change with time lapse), initial analytical physical quantities as initial conditions are additionally required. The initial analytical physical quantities are values of analytical physical quantities at the start of analysis. At the data storing unit 201, in order to execute temporal stepwise analytical computation, temporal increments and the number of computation steps are also stored in the analytical physical quantity information table as initial set up information (not illustrated).

Mesh information that define an analysis range, such as a partitioning width, number of nodes, number of elements, nodal coordinate values corresponding to node numbers, and element coupling information corresponding to element numbers is also stored about the meshes. The meshes are finite shapes, such as triangles in the case that the analysis range is a two-dimensional space, and tetrahedrons in the case that the analysis range is a three-dimensional space. Meshes can also be imported by reading with the scanner 102 shown in FIG. 1. Specifically, for example, the function of the data storing unit 201 is realized, by the RAM 103, the HD 105, or the FD 107 shown in FIG. 1.

The first acquiring unit 202 acquires a known analytical physical quantity of the analysis subject. Specifically, by manipulation of an input device (for example, the key board 110 or the mouse 111 shown in FIG. 1), the analytical physical quantity ID of the analysis subject is selected, and a known analytical physical quantity is extracted from the data storing unit 201. Specifically for example, the function of the first acquiring unit 202 is realized by the CPU 101 executing a program stored in the ROM 102, RAM 103, HD 105 or FD 107 shown in FIG. 1, or by the I/F 109 shown in FIG. 1.

The second acquiring unit 203 acquires the consistent mass matrix of each element (mesh) of the analysis subject. Specifically for example, the function of the second acquiring unit 203 is realized by the CPU 101 executing a program stored in the ROM 102, RAM 103, HD 105 or FD 107 shown in FIG. 1, or via the I/F 109 shown in FIG. 1.

The generating unit 204 generates the diagonal mass matrix of each element by diagonalizing, based on the bubble function of each element of the analysis subject, the consistent mass matrix of each element that is acquired by the second acquiring unit 203. Specifically, for example, the function of the generating unit 204 is realized by the CPU 101 executing a program stored in the ROM 102, RAM 103, HD 105 or FD 107 shown in FIG. 1, or via the I/F 109 shown in FIG. 1.

The first computing unit 205 computes the diagonal mass matrix for the entire region subject to analysis based on the diagonal mass matrix of each element generated by the generating unit 204. Specifically for example, the function of the first computing unit 205 is realized by the CPU 101 executing a program stored in the ROM 102, RAM 103, HD 105 or FD 107 shown in FIG. 1, or via the I/F 109 shown in FIG. 1.

The second computing unit 206 computes, for the entire analysis region, the inverse matrix of the diagonal mass matrix that is computed by the first computing unit 205. Specifically for example, the function of the second computing unit 206 is realized by the CPU 101 executing a program stored in the ROM 102, RPM 103, HD 105 or FD 107 shown in FIG. 1, or via the I/F 109 shown in FIG. 1.

The analyzing unit 207 analyzes the motion of the analysis subject based on the known analytical physical quantity acquired by the first acquiring unit 202 and on the diagonal mass matrix, of each element, generated by the generating unit 204. Specifically, the motion of the analysis subject is analyzed based on the known analytical physical quantity acquired by the first acquiring unit 202, a diagonal mass matrix for the entire analysis region computed by the first computing unit 205, and an inverse matrix computed by the second computing unit 206. In the case of a solution that analyzes the motion of the analysis subject using only the diagonal mass matrix of each element, without using a diagonal mass matrix for the entire analysis region (for an example, refer to: O. C. Zienkiewicz, R. L. Taylor, S. J. Sherwin and J. Peiro, "On Discontinuous Galerkin Methods", International Journal for Numerical Methods in Engineering, Vol. 58, 2003, pp. 1119-1148), the generating unit 204 and first computing unit 205 are one and the same, and also analysis can be proceeded to the second computing unit 206. Specifically, for example, the function of the analyzing unit 207 is realized by the CPU 101 executing a program stored in the ROM 102, RAM 103, HD 105 or FD 107 shown in FIG. 1, or via the I/F 109 shown in FIG. 1.

Figure 4:
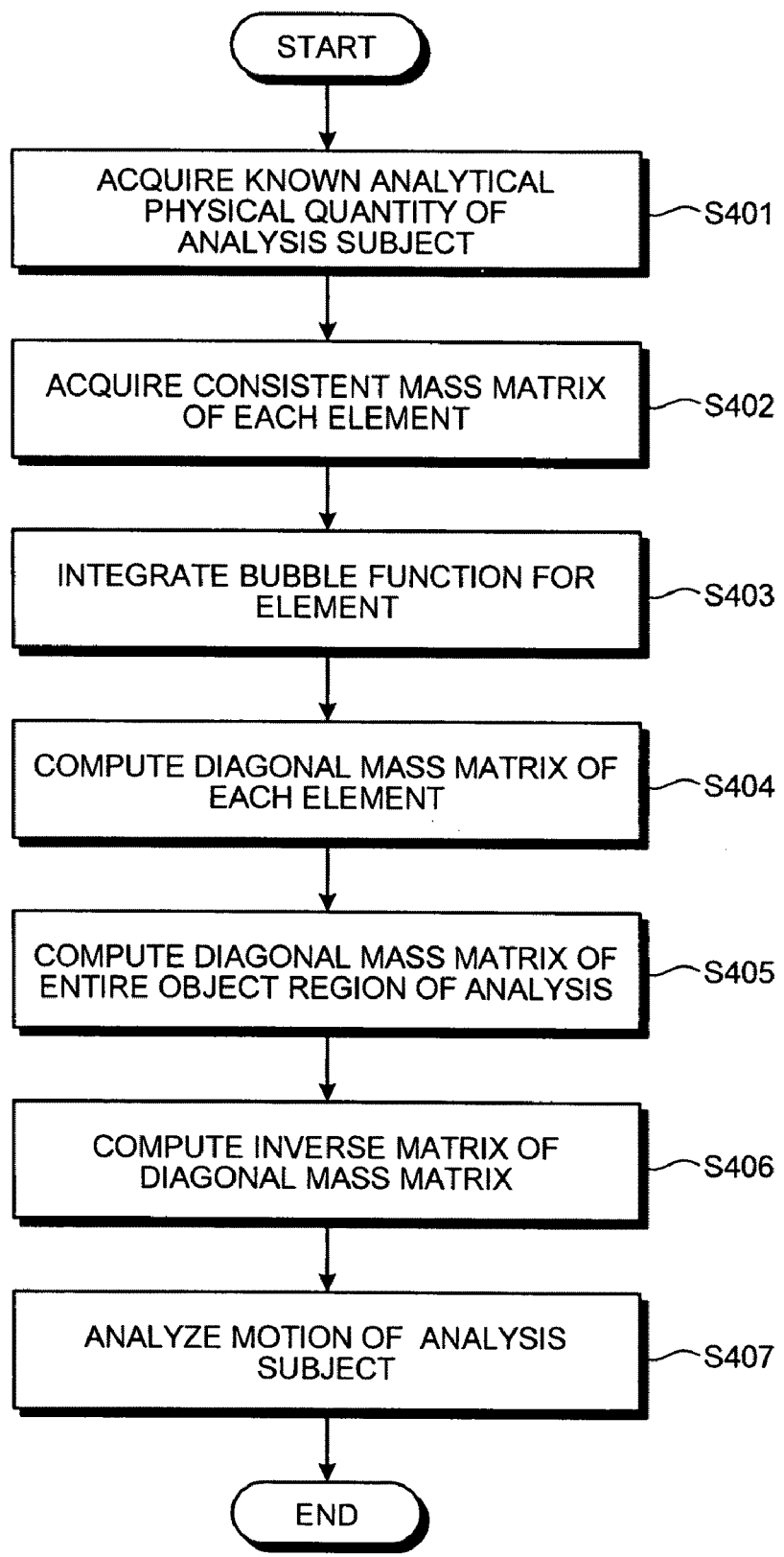
FIG. 4 is a flowchart showing a protocol of a numerical analyzing process by a numerical analyzing apparatus according to an embodiment of the present invention.

A protocol of a numerical analyzing process of the numerical analyzing apparatus 200 according to the present embodiment is explained. FIG. 4 is a flowchart showing the protocol of a numerical analyzing process by the numerical analyzing apparatus 200 according to an embodiment of the present invention. The known analytical physical quantity of the analysis subject is acquired (step S01) by the first acquiring unit 202. The consistent mass matrix of each element (element level) is acquired (step S402) by the second acquiring unit 203.

Subsequently, bubble functions are integrated for each element (step S403) and the diagonal mass matrix of each element (element level) is computed (step S404) by substituting the value integrated at step S403 for the consistent mass matrix of each element (element level). The diagonal mass matrix of the entire analysis region is computed (step S405) by the summation (superposition) of the diagonal mass matrix of each element (element level).

The inverse matrix of the diagonal mass matrix is computed (step S406), and the motion of the analysis subject is analyzed based on the known analytical physical quantity of the subject, the diagonal mass matrix of the entire analysis region, and the inverse matrix thereof. Specifically, for example, analysis is possible by substituting the aforementioned for equations (10) to (13).

A specific analyzing process of a numerical analyzing apparatus 200 is explained, <1. Orthogonal Basis Bubble Function Element>

In analysis using a finite element method (finite element analysis), a mass matrix M is obtained by multiplying a weighting function by a function that results from the interpolation of a given analytical physical quantity, and then by integrating for a subject region. In the case a bubble function element is adopted, the mass matrix M is formed by superposing, on the entire system, an element group obtained by dividing an arbitrary region, which is the analysis subject, by the number of elements N, into triangular (tetrahedral) shapes; and by using integration for an element region, the mass matrix M is expressed as the following equation (16).

[Equations 7]

$$M = \sum_{e=1}^{N_e} \langle \Phi, \Phi^T \rangle_{\Omega_e} = \sum_{e=1}^{N_e} M_{ij}^{(e)}, i = 1 \ldots N+2, j = 1 \ldots N+2 \quad (16)$$

The following equations (18) and (20) must be satisfied in order for the basis (shape function) of a bubble function element to orthogonalize to equation (16). Equation (17) is used to induce equation (18). Equation (19) is used to induce equation (20).

[Equations 8]

$$\langle \Phi_a, \Phi_B \rangle_{\Omega_e} = \frac{1}{N+1} \langle 1, \phi_B \rangle_{\Omega_e} - \frac{1}{N+1} \|\phi_B\|_{\Omega_e}^2 = 0, a = 1 \ldots N+1 \quad (17)$$

[Equations 9]

From equation (17), $$\langle 1, \phi_B \rangle_{\Omega_e} = \|\phi_B\|_{\Omega_e}^2 \quad (18)$$

[Equations 10]

$$\langle \Phi_\alpha, \Phi_\beta \rangle_{\Omega_e} = \langle \Psi_\alpha, \Psi_\beta \rangle_{\Omega_e} - \frac{1}{(N+1)^2} \langle 1, \phi_B \rangle_{\Omega_e} = 0, \quad (19)$$

$$\alpha \neq \beta, \beta = 1 \ldots N+1$$

[Equations 11]

From equation (19), $$\langle 1, \phi_B \rangle_{\Omega_e} = (N+1)^2 \langle \Psi_\alpha, \Psi_\beta \rangle_{\Omega_e} \quad (20)$$

The following equation (21) is obtained from equations (18) and (20).

[Equations 12]

$$\langle \phi_B, 1 \rangle_{\Omega_e} = \|\phi_B\|_{\Omega_e}^2 = CA_e \quad (21)$$

$$C = \frac{1}{A_e}(N+1)^2 \langle \Psi_\alpha, \Psi_\beta \rangle_{\Omega_e}, \alpha \neq \beta$$

Two-dimensions $$C = \frac{3}{4}$$

Three-dimensions $$C = \frac{4}{5}$$

<2. Bubble Function Satisfying Orthogonal Condition>

A bubble function expressed by the following equation (22) is proposed as a function that satisfies equations (18) and (20).

[Equations 13]

$$\phi_B = \frac{\alpha_1 \hat{\phi}_B + \alpha_2 \tilde{\phi}_B + \bar{\phi}_B}{\alpha_1 + \alpha_2 + 1} \quad (22)$$

Where, $\alpha_1, \alpha_2$ are unknown quantities $\hat{\phi}_B, \tilde{\phi}_B, \bar{\phi}_B$ are bubble functions, each different The following equation (23) is induced by substituting equation (22) for equation (18).

[Equations 14]

$$\beta_1 \alpha_1^2 + \beta_2 \alpha_2^2 + \beta_3 + \beta_4 \alpha_1 \alpha_2 + \beta_5 \alpha_1 + \beta_6 \alpha_2 = 0 \quad (23)$$

$$\beta_1 = \langle \hat{\phi}_B, 1 \rangle_{\Omega_e} - \|\hat{\phi}_B\|_{\Omega_e}^2,$$

$$\beta_2 = \langle \tilde{\phi}_B, 1 \rangle_{\Omega_e} - \|\tilde{\phi}_B\|_{\Omega_e}^2, \beta_3 = \langle \bar{\phi}_B, 1 \rangle_{\Omega_e} - \|\bar{\phi}_B\|_{\Omega_e}^2,$$

$$\beta_4 = \langle \tilde{\phi}_B, 1 \rangle_{\Omega_e} + \langle \hat{\phi}_B, 1 \rangle_{\Omega_e} - 2\langle \hat{\phi}_B, \tilde{\phi}_B \rangle_{\Omega_e},$$

$$\beta_5 = \langle \bar{\phi}_B, 1 \rangle_{\Omega_e} + \langle \hat{\phi}_B, 1 \rangle_{\Omega_e} - 2\langle \hat{\phi}_B, \bar{\phi}_B \rangle_{\Omega_e},$$

$$\beta_6 = \langle \bar{\phi}_B, 1 \rangle_{\Omega_e} + \langle \tilde{\phi}_B, 1 \rangle_{\Omega_e} - 2\langle \tilde{\phi}_B, \bar{\phi}_B \rangle_{\Omega_e}.$$

Or, $$\beta_1 = (\langle \hat{\phi}_B, 1 \rangle_{\Omega_e} - \|\hat{\phi}_B\|_{\Omega_e}^2) A_e^{-1},$$

$$\beta_2 = (\langle \tilde{\phi}_B, 1 \rangle_{\Omega_e} - \|\tilde{\phi}_B\|_{\Omega_e}^2) A_e^{-1},$$

$$\beta_3 = (\langle \bar{\phi}_B, 1 \rangle_{\Omega_e} - \|\bar{\phi}_B\|_{\Omega_e}^2) A_e^{-1},$$

$$\beta_4 = (\langle \tilde{\phi}_B, 1 \rangle_{\Omega_e} + \langle \hat{\phi}_B, 1 \rangle_{\Omega_e} - 2\langle \hat{\phi}_B, \tilde{\phi}_B \rangle_{\Omega_e}) A_e^{-1},$$

$$\beta_5 = (\langle \bar{\phi}_B, 1 \rangle_{\Omega_e} + \langle \hat{\phi}_B, 1 \rangle_{\Omega_e} - 2\langle \hat{\phi}_B, \bar{\phi}_B \rangle_{\Omega_e}) A_e^{-1},$$

$$\beta_6 = (\langle \bar{\phi}_B, 1 \rangle_{\Omega_e} + \langle \tilde{\phi}_B, 1 \rangle_{\Omega_e} - 2\langle \tilde{\phi}_B, \bar{\phi}_B \rangle_{\Omega_e}) A_e^{-1}$$

The following equation (24) is induced by substituting equation (22) for equation (20).

[Equations 15]

$$\alpha_2 = \gamma_1 \alpha_1 + \gamma_2 \quad (24)$$

$$\gamma_1 = -\frac{\langle \hat{\phi}_B, 1 \rangle_{\Omega_e} - CA_e}{\langle \tilde{\phi}_B, 1 \rangle_{\Omega_e} - CA_e}, \gamma_2 = -\frac{\langle \bar{\phi}_B, 1 \rangle_{\Omega_e} - CA_e}{\langle \tilde{\phi}_B, 1 \rangle_{\Omega_e} - CA_e}$$

Or, $$\gamma_1 = -\frac{\langle \hat{\phi}_B, 1 \rangle_{\Omega_e} A_e^{-1} - C}{\langle \tilde{\phi}_B, 1 \rangle_{\Omega_e} A_e^{-1} - C}, \gamma_2 = -\frac{\langle \bar{\phi}_B, 1 \rangle_{\Omega_e} A_e^{-1} - C}{\langle \tilde{\phi}_B, 1 \rangle_{\Omega_e} A_e^{-1} - C}$$

The following equation (25) containing $\alpha_1$ as an unknown quantity is finally induced by substituting equation (24) for equation (23).

[Equations 16]

$$a\alpha_1^2 + b\alpha_1 + c = 0 \quad (25)$$

$$a = \beta_1 + \beta_2 \gamma_1^2 + \beta_4 \gamma_1, \quad b = 2\beta_2 \gamma_1 \gamma_2 + \beta_4 \gamma_2 + \beta_5 + \beta_6 \gamma_1, \quad c = \beta_2 \gamma_2^2 + \beta_3 + \beta_6 \gamma_2$$

As equation (25) is a quadratic equation for $\alpha_1$, referring to a solution formula, $\alpha_1$ can be obtained by the following equation (26).

[Equations 17]

$$\alpha_1 = \frac{-b \pm \sqrt{b^2 - 4\alpha c}}{2\alpha} \quad (26)$$

<3. Specific Bubble Function Forming Orthogonal Basis>

Figure 5:
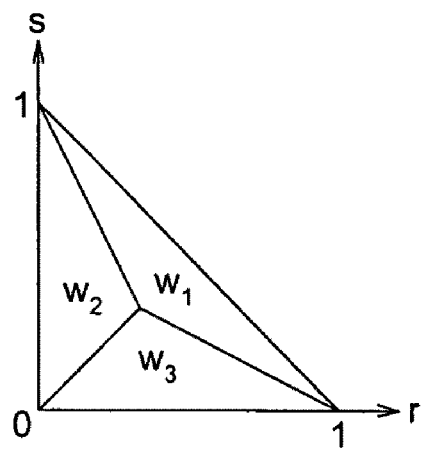
FIG. 5 is a schematic showing a two-dimensional bubble function element.
Figure 6:
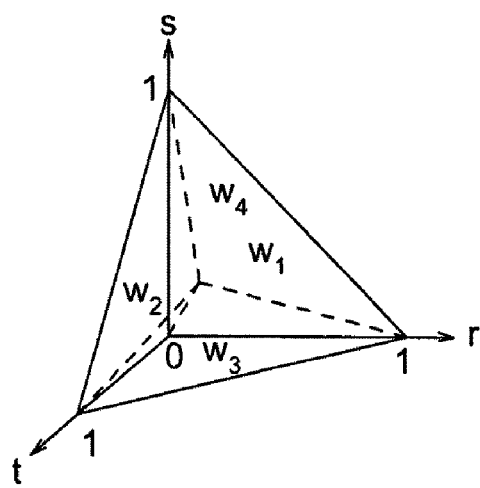
FIG. 6 is a schematic showing a three-dimensional bubble function element.

A specific bubble function forming orthogonal basis is explained. FIGS. 5 and 6 are schematics showing a two-dimensional bubble function element and a three-dimensional bubble function element, respectively.

In order to induce a specific bubble function that forms orthogonal basis, a $\xi$-exponent bubble function ($0 < \xi < \infty$) is adopted that divides the triangular (tetrahedral) element region shown in FIGS. 5 and 6 into three (four) small triangles (tetrahedrons) $w_i$, $i = -1 \ldots N+1$ using the center of gravity point. The $\xi$-exponent bubble function is defined as the following equations (27) and (28) by using an isoparametric coordinate system $\{r, s\}$ ($\{r, s, t\}$) for each small triangle (tetrahedron).

[Equations 18]

Two-dimensions $$\phi_B^\xi = \begin{cases} 3^\xi(1 - r - s)^\xi & \text{in } w_1 \\ 3^\xi r^\xi & \text{in } w_2 \\ 3^\xi s^\xi & \text{in } w_3 \end{cases} \quad (27)$$

Three-dimensions $$\phi_B^\xi = \begin{cases} 4^\xi(1 - r - s - t)^\xi & \text{in } w_1 \\ 4^\xi r^\xi & \text{in } w_2 \\ 4^\xi s^\xi & \text{in } w_3 \\ 4^\xi t^\xi & \text{in } w_4 \end{cases} \quad (28)$$

The integration values for element regions of these bubble functions can be obtained by the following equation (29).

[Equations 19]

$$\langle \phi_B^\xi, 1 \rangle_{\Omega_e} = \frac{N!}{\prod_{\gamma=1}^{N}(\xi + \gamma)} A_e \quad (29)$$

Equation (22) is defined as the following equation (30) by using the $\xi$-exponent bubble function.

[Equations 20]

$$\hat{\phi}_B = \phi_B^{\hat{\xi}}, \tilde{\phi}_B = \phi_B^{\tilde{\xi}}, \overline{\phi}_B = \phi_B^{\overline{\xi}} \quad (30)$$

Where, $\hat{\xi}, \tilde{\xi}, \overline{\xi}$ are exponent values

The $\alpha_1$ and $\alpha_2$ are expressed as the following equations (32) to (35) for a two-dimensional (triangle) and a three-dimensional (tetrahedron) bubble function, respectively, when each exponent value in equation (30) are set as the following equation (31).

[Equations 21]

$$\hat{\xi} = \frac{1}{10}, \tilde{\xi} = \frac{1}{5}, \overline{\xi} = \frac{3}{4} \quad (31)$$

[Equations 22]

Two-dimensions (triangle)

$$\alpha_1 = \frac{-b + \sqrt{b^2 - 4ac}}{2a} = 3.1871016 \ldots, \alpha_2 = -4.5742685 \ldots \quad (32)$$

$$\alpha_1 = \frac{-b - \sqrt{b^2 - 4ac}}{2a} = 3.1457828 \ldots, \alpha_2 = -3.9426812 \ldots \quad (33)$$

Three-dimensions (tetrahedron)

$$\alpha_1 = \frac{-b + \sqrt{b^2 - 4ac}}{2a} = 3.1277974 \ldots, \alpha_2 = -3.8884541 \ldots \quad (34)$$

$$\alpha_1 = \frac{-b - \sqrt{b^2 - 4ac}}{2a} = 2.6785040 \ldots, \alpha_2 = -4.0779944 \ldots \quad (35)$$

The $\alpha_1$ and $\alpha_2$ are expressed as the following equations (37) to (40) for a two-dimensional (triangle) and a three-dimensional (tetrahedron) bubble function, respectively, when each exponent value in equation (30) are set as the following equation (36), (different values from equation (31)).

[Equations 23]

$$\hat{\xi} = 3, \tilde{\xi} = 2, \overline{\xi} = \frac{6}{5} \quad (36)$$

[Equations 24]

Two-dimensions (triangle)

$$\alpha_1 = \frac{-b + \sqrt{b^2 - 4ac}}{2a} = -0.1393869 \ldots, \alpha_2 = -0.6433844 \ldots \quad (37)$$

$$\alpha_1 = \frac{-b - \sqrt{b^2 - 4ac}}{2a} = 1.2696544 \ldots, \alpha_2 = -2.2134591 \ldots \quad (38)$$

Three-dimensions (tetrahedron)

$$\alpha_1 = \frac{-b + \sqrt{b^2 - 4ac}}{2a} = 0.7333511 \ldots, \alpha_2 = -1.6387018 \ldots \quad (39)$$

$$\alpha_1 = \frac{-b - \sqrt{b^2 - 4ac}}{2a} = 1.2578218 \ldots, \alpha_2 = -2.2006346 \ldots \quad (40)$$

Figure 7:
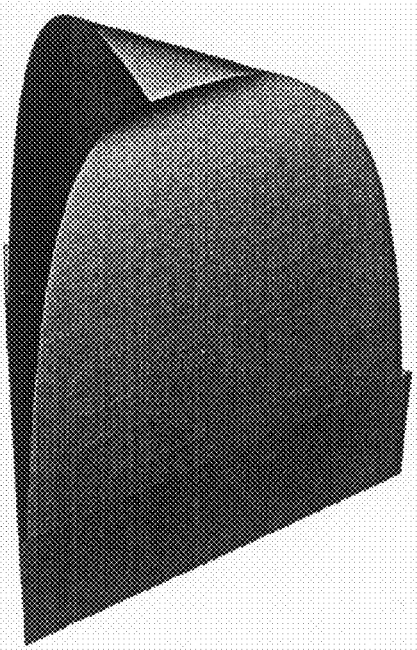
FIG. 7 is a schematic showing the shape $\phi_B$ of a triangular bubble function forming an orthogonal basis.
Figure 8:
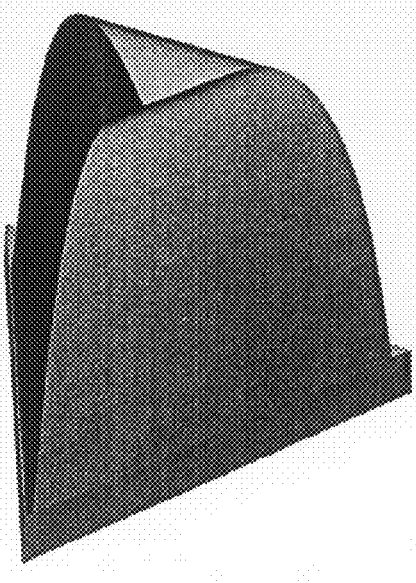
FIG. 8 is a schematic showing the shape $\phi_B^2$ of a triangular bubble function forming an orthogonal basis.
Figure 9:
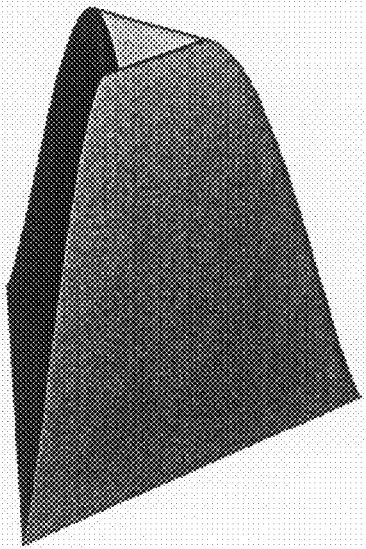
FIG. 9 is a schematic showing the shape $\phi_B$ of a triangular bubble function forming an orthogonal basis.
Figure 10:
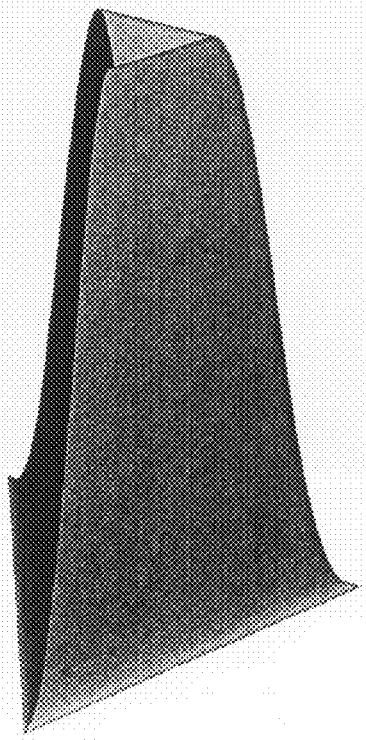
FIG. 10 is a schematic showing the shape $\phi_B^2$ of a triangular bubble function forming an orthogonal basis.

FIG. 7 is a schematic showing the shape $\phi_B$ of a triangular bubble function that forms orthogonal basis using the $\alpha_1$ and $\alpha_2$ in equation (32); FIG. 8 is a schematic showing the shape $\phi_B^2$ of a triangular bubble function that forms orthogonal basis using the $\alpha_1$ and $\alpha_2$ in equation (32). FIG. 9 is a schematic showing the shape $\phi_B$ of a triangular bubble function that forms orthogonal basis using the $\alpha_1$ and $\alpha_2$ in equation (37); FIG. 10 is a schematic showing the shape $\phi_B^2$ of a triangular bubble function that forms orthogonal basis using the $\alpha_1$ and $\alpha_2$ in equation (37).

As expressed in equations (32) and (37) and as shown in FIGS. 7 to 10, bubble functions (shapes) satisfying equation (21) are innumerable, and therefore, specific bubble functions that form orthogonal basis and the shapes thereof have little significance. An essential aspect of the orthogonal basis bubble function element is the invention of the conditional expression (21) for the basis of the bubble function element to be orthogonalized.

<4. Element Level Mass Matrix of Orthogonal Basis Bubble Function Element>

The element level consistent mass matrix, lumped mass matrix of an ordinary bubble function element, and the element level mass matrix (diagonal mass matrix) of an orthogonal basis bubble function element for two dimensions (triangle) and three dimensions (tetrahedron) are expressed in the following equations (41) to (46).

[Equations 25]

Triangular bubble function element

Element level consistent mass matrix $$\langle \Phi, \Phi^T \rangle_{\Omega_e} = M_{ij}^{(e)} = \begin{bmatrix} \frac{A_e}{6} & \frac{A_e}{12} & \frac{A_e}{12} & 0 \\ \frac{A_e}{12} & \frac{A_e}{6} & \frac{A_e}{12} & 0 \\ \frac{A_e}{12} & \frac{A_e}{12} & \frac{A_e}{6} & 0 \\ 0 & 0 & 0 & 0 \end{bmatrix} + \tag{41}$$

$$\frac{1}{9}\langle 1, \phi_B \rangle_{\Omega_e} \begin{bmatrix} -2 & -2 & -2 & 3 \\ -2 & -2 & -2 & 3 \\ -2 & -2 & -2 & 3 \\ 3 & 3 & 3 & 0 \end{bmatrix} + \frac{1}{9}\|\phi_B\|_{\Omega_e}^2 \begin{bmatrix} 1 & 1 & 1 & -3 \\ 1 & 1 & 1 & -3 \\ 1 & 1 & 1 & -3 \\ -3 & -3 & -3 & 9 \end{bmatrix}$$

Element level lumped mass matrix (when lumped)

$$\langle \Phi, \Phi^T \rangle_{\Omega_e} = M_{ij}^{(e)} \approx \text{diag}\left(\sum_{j=1}^{N+2} M_{ij}^e\right) = \tag{42}$$

$$\begin{bmatrix} \frac{A_e}{3} & 0 & 0 & 0 \\ 0 & \frac{A_e}{3} & 0 & 0 \\ 0 & 0 & \frac{A_e}{3} & 0 \\ 0 & 0 & 0 & 0 \end{bmatrix} + \frac{1}{3}\langle 1, \phi_B \rangle_{\Omega_e} \begin{bmatrix} -1 & 0 & 0 & 0 \\ 0 & -1 & 0 & 0 \\ 0 & 0 & -1 & 0 \\ 0 & 0 & 0 & 3 \end{bmatrix}$$

Element level diagonal mass matrix (orthogonal basis bubble function)

$$\langle \Phi, \Phi^T \rangle_{\Omega_e} = M_{ij}^{(e)} = \begin{bmatrix} \frac{A_e}{12} & 0 & 0 & 0 \\ 0 & \frac{A_e}{12} & 0 & 0 \\ 0 & 0 & \frac{A_e}{12} & 0 \\ 0 & 0 & 0 & \frac{3}{4}A_e \end{bmatrix} \tag{43}$$

An element level diagonal mass matrix $M^{(e)}_{ij}$ in the equation (43) is generated by the generating unit 204 by substituting the integration value $CA_e$ of a bubble function $\phi_B$ for the $\langle 1, \phi_B \rangle_{\Omega_e}$ and $\|\phi_B\|^2_{\Omega_e}$ of an element level consistent mass matrix $M^{(e)}_{ij}$ in the equation (41). The diagonal mass matrix M for the entire analysis region can be computed, by the first computing unit 205, by obtaining a sum (superposition) of the element level diagonal mass matrices $M^{(e)}_{ij}$ of each element. The inverse matrix $M^{-1}$ of the diagonal mass matrix M can be computed by the second computing unit 206. Motion of the analysis subject can be analyzed by the analyzing unit 207 by substituting a known analytical physical quantity u, a diagonal mass matrix M, and the inverse matrix $M^{-1}$ for equations (10) to (13).

[Equations 25]

Triangular bubble function element

Element level consistent mass matrix $$\langle \Phi, \Phi^T \rangle_{\Omega_e} = M_{ij}^{(e)} = \begin{bmatrix} \frac{A_e}{10} & \frac{A_e}{20} & \frac{A_e}{20} & \frac{A_e}{20} & 0 \\ \frac{A_e}{20} & \frac{A_e}{10} & \frac{A_e}{20} & \frac{A_e}{20} & 0 \\ \frac{A_e}{20} & \frac{A_e}{20} & \frac{A_e}{10} & \frac{A_e}{20} & 0 \\ \frac{A_e}{20} & \frac{A_e}{20} & \frac{A_e}{20} & \frac{A_e}{10} & 0 \\ 0 & 0 & 0 & 0 & 0 \end{bmatrix} + \tag{44}$$

$$\frac{1}{16}\langle 1, \phi_B \rangle_{\Omega_e} \begin{bmatrix} -2 & -2 & -2 & -2 & 4 \\ -2 & -2 & -2 & -2 & 4 \\ -2 & -2 & -2 & -2 & 4 \\ -2 & -2 & -2 & -2 & 4 \\ 4 & 4 & 4 & 4 & 0 \end{bmatrix} +$$

$$\frac{1}{16}\|\phi_B\|_{\Omega_e}^2 \begin{bmatrix} 1 & 1 & 1 & 1 & -4 \\ 1 & 1 & 1 & 1 & -4 \\ 1 & 1 & 1 & 1 & -4 \\ 1 & 1 & 1 & 1 & -4 \\ -4 & -4 & -4 & -4 & 16 \end{bmatrix}$$

Element level lumped mass matrix (when lumped)

$$\langle \Phi, \Phi^T \rangle_{\Omega_e} = M_{ij}^{(e)} \approx \text{diag}\left(\sum_{j=1}^{N+2} M_{ij}^e\right) = \tag{45}$$

$$\begin{bmatrix} \frac{A_e}{3} & 0 & 0 & 0 \\ 0 & \frac{A_e}{3} & 0 & 0 \\ 0 & 0 & \frac{A_e}{3} & 0 \\ 0 & 0 & 0 & 0 \end{bmatrix} +$$

$$\frac{1}{4}\langle 1, \phi_B \rangle_{\Omega_e} \begin{bmatrix} -1 & 0 & 0 & 0 & 0 \\ 0 & -1 & 0 & 0 & 0 \\ 0 & 0 & -1 & 0 & 0 \\ 0 & 0 & 0 & -1 & 0 \\ 0 & 0 & 0 & 0 & 4 \end{bmatrix}$$

Element level diagonal mass matrix (orthogonal basis bubble function)

$$\langle \Phi, \Phi^T \rangle_{\Omega_e} = M_{ij}^{(e)} = \begin{bmatrix} \frac{A_e}{20} & 0 & 0 & 0 & 0 \\ 0 & \frac{A_e}{20} & 0 & 0 & 0 \\ 0 & 0 & \frac{A_e}{20} & 0 & 0 \\ 0 & 0 & 0 & \frac{A_e}{20} & 0 \\ 0 & 0 & 0 & 0 & \frac{4}{5}A_e \end{bmatrix} \tag{46}$$

An element level diagonal mass matrix in equation (46) is generated by the generating unit 204 by substituting the integration value $CA_e$ of a bubble function $\phi_B$ for the $\langle 1, \Phi_B \rangle \Omega_e$, and $\|\phi_B\|^2 \Omega_e$ of an element level consistent mass matrix in equation (44). The diagonal mass matrix M for the entire analysis region can be computed by the first computing unit 205 by obtaining a sum (superposition) of the element level diagonal mass matrices $M^{(e)}_{ij}$ of each element. The inverse matrix $M^{-1}$ of a diagonal mass matrix M can be computed by the second computing unit 206. Motion of the analysis subject can be analyzed by the analyzing unit 207 by substituting a known analytical physical quantity u, a diagonal mass matrix M, and the inverse matrix $M^1$ for equations (10) to (13).

<5. Bubble Function>

Figure 11:
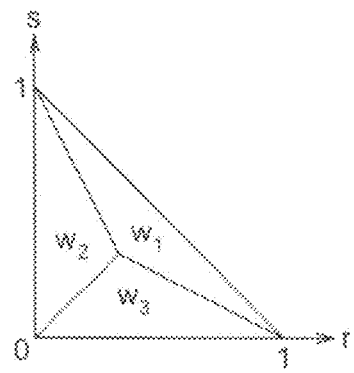
FIG. 11 is a schematic showing a two-dimensional bubble function element.
Figure 12:
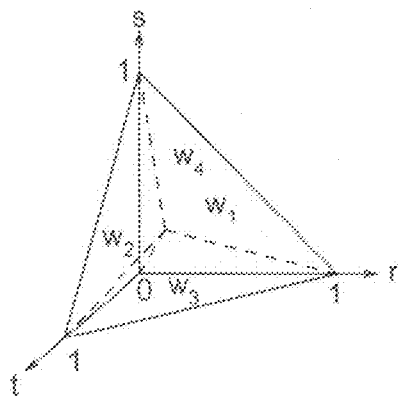
FIG. 12 is a schematic showing a three-dimensional bubble function element.

A bubble function is explained. FIG. 11 is a schematic showing a two-dimensional bubble function, and FIG. 12 is a schematic showing a three-dimensional bubble function. An arbitrary bubble function 4B can be selected provided that the definition of a shape function (a function that produces 1 at the center of gravity point and 0 at other points) is satisfied. In a comparative computation for verification, shown below, the most frequently used two bubble functions and the bubble function that forms orthogonal basis are used. By using an isoparametric coordinate system $\{r, s\}$ ($\{x, s, t\}$) shown in FIGS. 11 and 12, the bubble functions are defined as equations (47) to (52).

[Equations 27]

Two-dimensions (triangle)
Widely used bubble function 1

$$\phi_B = 27(1-r-s)rs, \langle \phi_B, 1 \rangle_{\Omega_e} = \frac{9}{20} A_e, \|\phi_B\|^2_{\Omega_e} = \frac{81}{280} A_e \quad (47)$$

Widely used bubble function 2

$$\phi_B = \begin{cases} 3(1-r-s) & \text{in } w_1 \\ 3r & \text{in } w_2, \langle \phi_B, 1 \rangle_{\Omega_e} = \frac{1}{3} A_e, \|\phi_B\|^2_{\Omega_e} = \frac{1}{6} A_e \\ 3s & \text{in } w_3 \end{cases} \quad (48)$$

Orthogonal basis bubble function $$\phi_B = \frac{\alpha_1 \hat{\phi}_B + \alpha_2 \tilde{\phi}_B + \overline{\phi}_B}{\alpha_1 + \alpha_2 + 1}, \langle \phi_B, 1 \rangle_{\Omega_e} = \frac{3}{4} A_e, \|\phi_B\|^2_{\Omega_e} = \frac{3}{4} A_e \quad (49)$$

[Equations 28]

Three-dimensions (tetrahedron)
Widely used bubble function 1

$$\phi_B = 256(1-r-s-t)rst, \langle \phi_B, 1 \rangle_{\Omega_e} = \frac{32}{105} A_e, \|\phi_B\|^2_{\Omega_e} = \frac{8192}{51975} A_e \quad (50)$$

Widely used bubble function 2

$$\phi_B = \begin{cases} 4(1-r-s-t) & \text{in } w_1 \\ 4r & \text{in } w_2 \\ 4s & \text{in } w_3 \\ 4t & \text{in } w_4 \end{cases}, \langle \phi_B, 1 \rangle_{\Omega_e} = \frac{1}{4} A_e, \|\phi_B\|^2_{\Omega_e} = \frac{1}{10} A_e \quad (51)$$

Orthogonal basis bubble function $$\phi_B = \frac{\alpha_1 \hat{\phi}_B + \alpha_2 \tilde{\phi}_B + \overline{\phi}_B}{\alpha_1 + \alpha_2 + 1}, \langle \phi_B, 1 \rangle_{\Omega_e} = \frac{4}{5} A_e, \|\phi_B\|^2_{\Omega_e} = \frac{4}{5} A_e \quad (52)$$

<6. Rotating Cone Problem>

Figure 13:
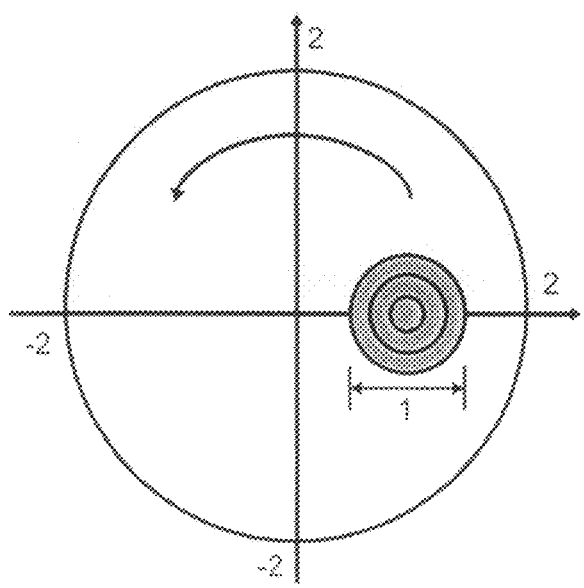
FIG. 13 is a schematic showing a domain size in an analysis of a Rotating Cone problem.
Figure 14:
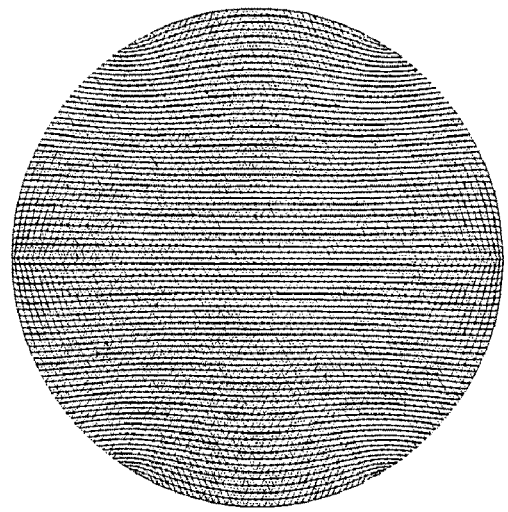
FIG. 14 is a schematic showing a mesh of an analytical model in the analysis of the Rotating Cone problem.
Figure 15:
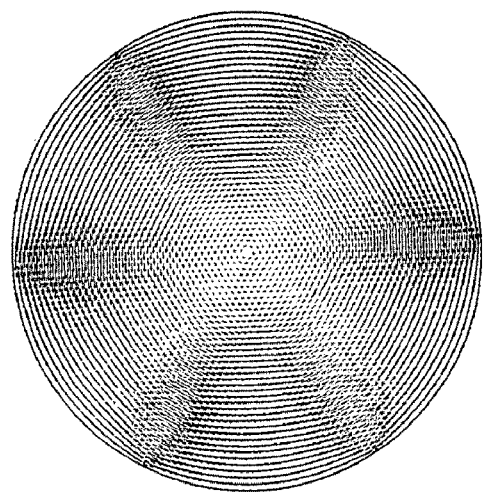
FIG. 15 is a schematic showing a flow velocity (flow condition) of an analytical model used in the analysis of the Rotating Cone problem.

As a validation calculation of the method invented, the Rotating Cone problem (advection problem of substance concentration), a famous bench mark problem for comparison and examination of the performance of numerical analyzing methods, is analyzed (refer to a non-patent document 4). FIG. 13 is a schematic showing the domain size in the analysis of the Rotating Cone problem; FIG. 14 is a schematic showing the mesh (4921 nodes, 9600 elements) of an analytical model in the analysis of the Rotating Cone problem; and FIG. 15 is a schematic showing the flow velocity (flow condition) of the analytical model in the analysis of the Rotating Cone problem.

Figure 16:
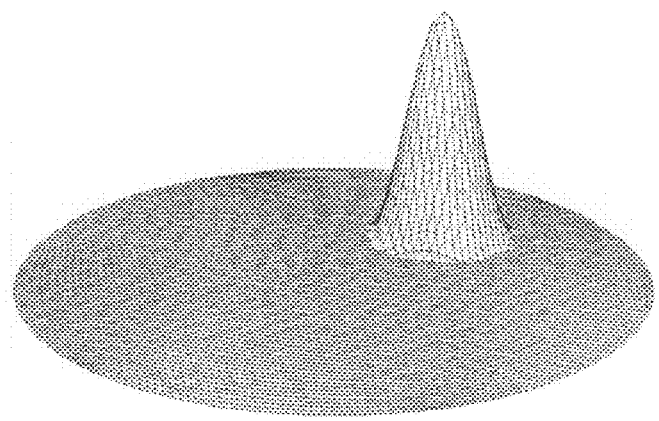
FIG. 16 is a bird's eye view showing an initial condition in the analysis of the Rotating Cone problem.
Figure 17:
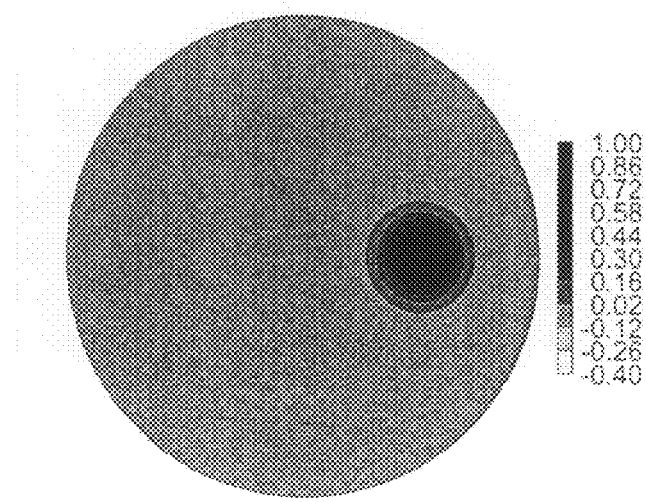
FIG. 17 a schematic showing contours of the initial condition used in the analysis of the Rotating Cone problem.

FIG. 16 is a bird's eye view showing the initial condition (initial distribution of concentration) in the analysis of the Rotating Cone problem, and FIG. 17 a schematic showing the contours of the initial condition (initial distribution of concentration) in the analysis of the Rotating Cone problem. Assuming the steady constant flow velocity (flow condition) shown in FIG. 15 for the mesh shown in FIG. 14, within the region of computation shown in FIG. 13 of an unsteady advection equation, the Rotating Cone problem analyzes the advectional conditions of any physical quantity (such as pollutant concentration) shown in FIGS. 16 and 17.

Although an actual physical quantity (such as pollutant concentration) is transported along the flow while the concentration diffuses, in the case that the computation is executed by eliminating the effect of diffusion (compute an advection equation), because only an advection effect acting on the physical quantity exists, the problem invariably yields the result that the distribution of a physical quantity is ideally identical with the initial distribution when the concentration, carried by the flow, revolves about in a computation region. Numerical analysis using this problem can evaluate the approximation error of a method subject and can verify the computation accuracy thereof.

Figure 18:
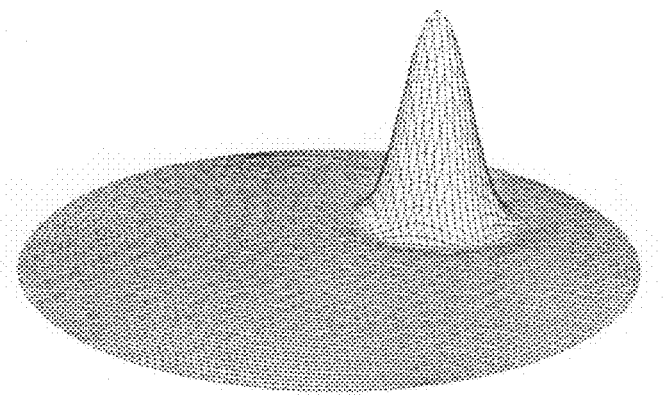
FIG. 18 is a bird's eye view showing the computation result by a bubble function (equation (47)) using a consistent mass matrix.
Figure 19:
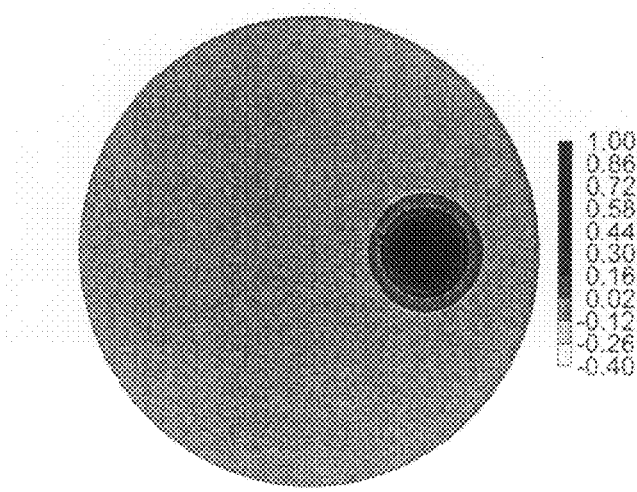
FIG. 19 is a schematic showing contours of the computation result by a bubble function (equation (47)) using a consistent mass matrix.
Figure 20:
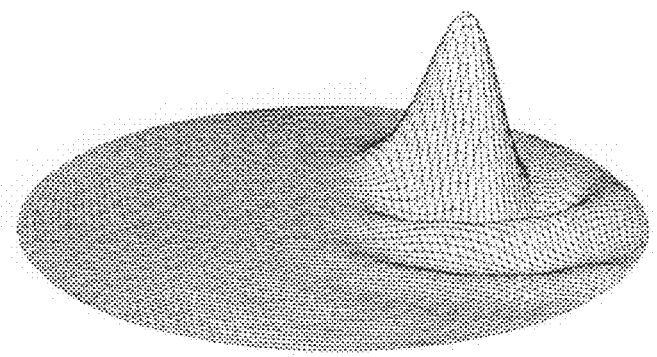
FIG. 20 is a bird's eye view showing the computation result by a bubble function (equation (47)) using a lumped mass matrix.
Figure 21:
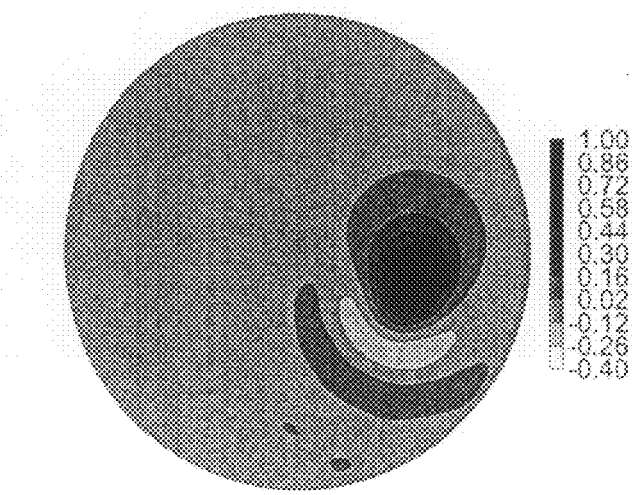
FIG. 21 is a schematic showing contours of the computation result by a bubble function (equation (47)) using a lumped mass matrix.

FIG. 18 is a bird's eye view showing the computation result of a bubble function (equation (47)) using a consistent mass matrix, and FIG. 19 is a schematic showing the contours of the computation result of a bubble function (equation (47)) using a consistent mass matrix. FIG. 20 is a bird's eye view showing the computation result of a bubble function (equation (47)) using a lumped mass matrix, and FIG. 21 is a schematic showing the contours of the computation result of a bubble function (equation (47)) using a lumped mass matrix.

Figure 22:
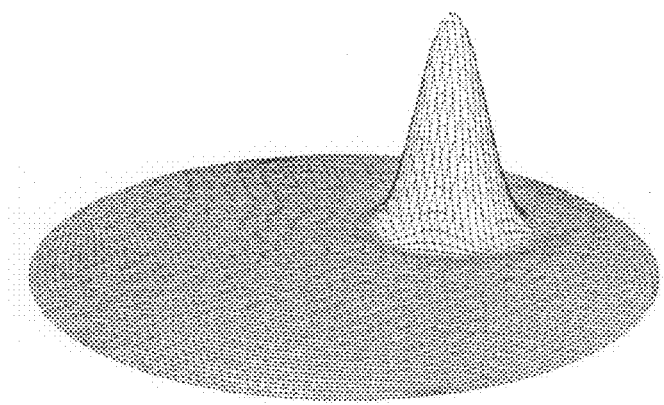
FIG. 22 is a bird's eye view showing the computation result by a bubble function (equation (48)) using a consistent mass matrix.
Figure 23:
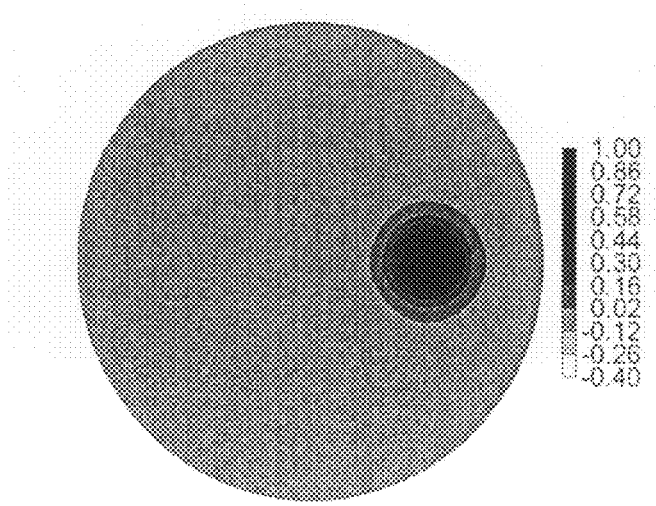
FIG. 23 is a schematic showing contours of the computation result by a bubble function (equation (48)) using a consistent mass matrix.
Figure 24:
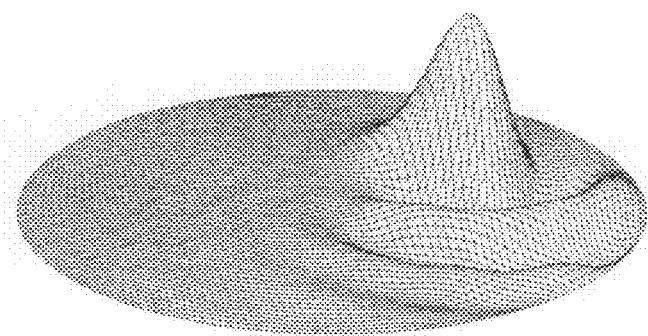
FIG. 24 is a bird's eye view showing the computation result by a bubble function (equation (48)) using a lumped mass matrix.
Figure 25:
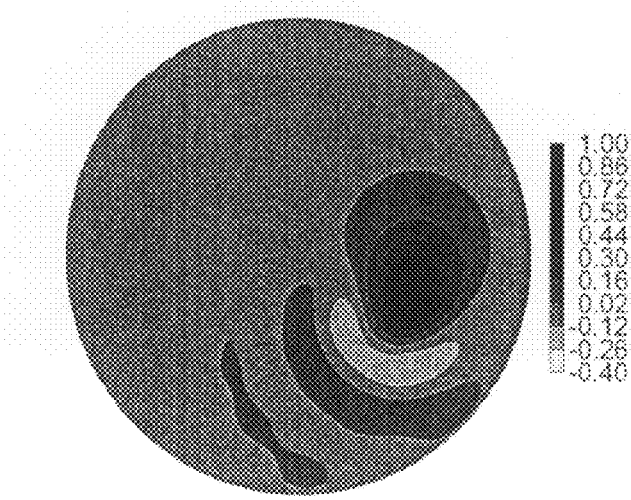
FIG. 25 is a schematic showing contours of the computation result by a bubble function (equation (48)) using a lumped mass matrix.
Figure 26:
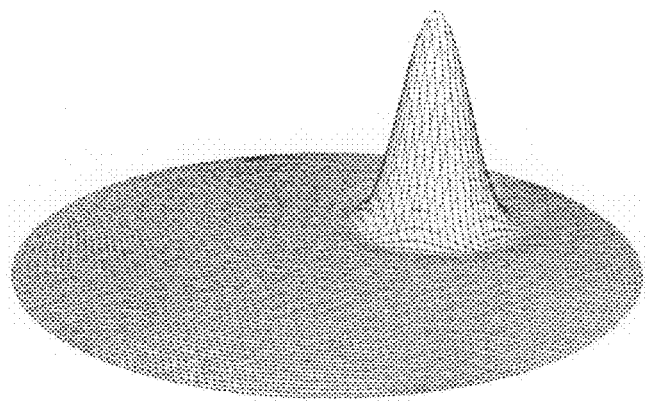
FIG. 26 is a bird's eye view showing the computation result by a bubble function (equation (49)) using a diagonal mass matrix.
Figure 27:
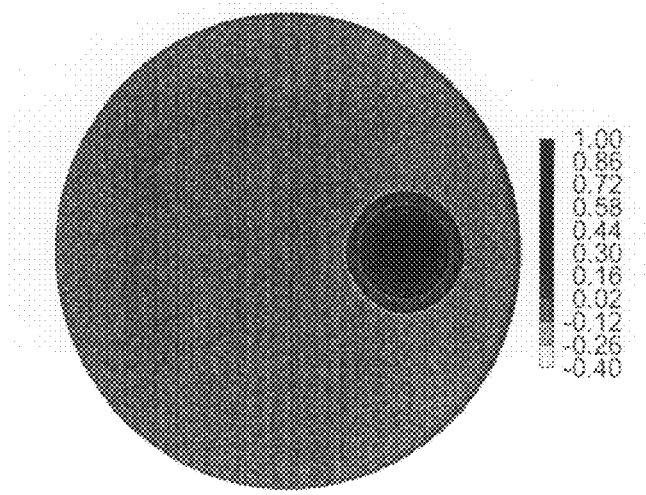
FIG. 27 is a schematic showing the contours of the computation result by a bubble function (equation (49)) using a diagonal mass matrix.

FIG. 22 is a bird's eye view showing the computation result of a bubble function (equation (48)) using a consistent mass matrix, and FIG. 23 is a schematic showing the contours of the computation result of a bubble function (equation (48)) using a consistent mass matrix. FIG. 24 is a bird's eye view showing the computation result of a bubble function (equation (48)) using a lumped mass matrix, and FIG. 25 is a schematic showing the contours of the computation result of a bubble function (equation (48)) using a lumped mass matrix. FIG. 26 is a bird's eye view showing the computation result by a bubble function (equation (49)) using a diagonal mass matrix, and FIG. 27 is a schematic showing the contours of the computation result of a bubble function (equation (49)) using a diagonal mass matrix.

As analyzing methods for the verification of all object bubble functions, a bubble function element stabilizing method (refer to non-patent document 3) is used for spatial discretization considering the stability of numerical analysis, a four-step solution is used for temporal discretization, and $\pi/400$ is adopted for $\Delta t$. FIGS. 18, 19, 22, and 23 illustrate the computation results of bubble functions (equations (47) and (48)) using consistent mass matrices.

In contrast to these computation results, as shown by the computation results of bubble functions (equations (47) and (48)) using the lumped mass matrices illustrated in FIGS. 20, 21, 24, and 25, oscillations are generated on the side opposite to the direction of movement of a physical quantity (cone), and the distribution of the cone is also deformed. These computation results are of low reliability for numerical analysis due to the physically insignificant, conspicuous attenuation and expansion of concentration, and the remarkable shift of the maximum concentration point.

On the other hand, the computation result of a bubble function (equation (49)) using a diagonal mass matrix is accompanied neither by oscillations on the side opposite to the direction of movement of the cone nor by deformation of the distribution pattern, thereby retaining a computation accuracy equivalent to the computation results of bubble functions (equations (47) and (48)) using a consistent mass matrix, and yielding results with high reliability.

<7. Verification of Three-Dimensional Analysis by the Rotating Cone Problem>

Figure 28:
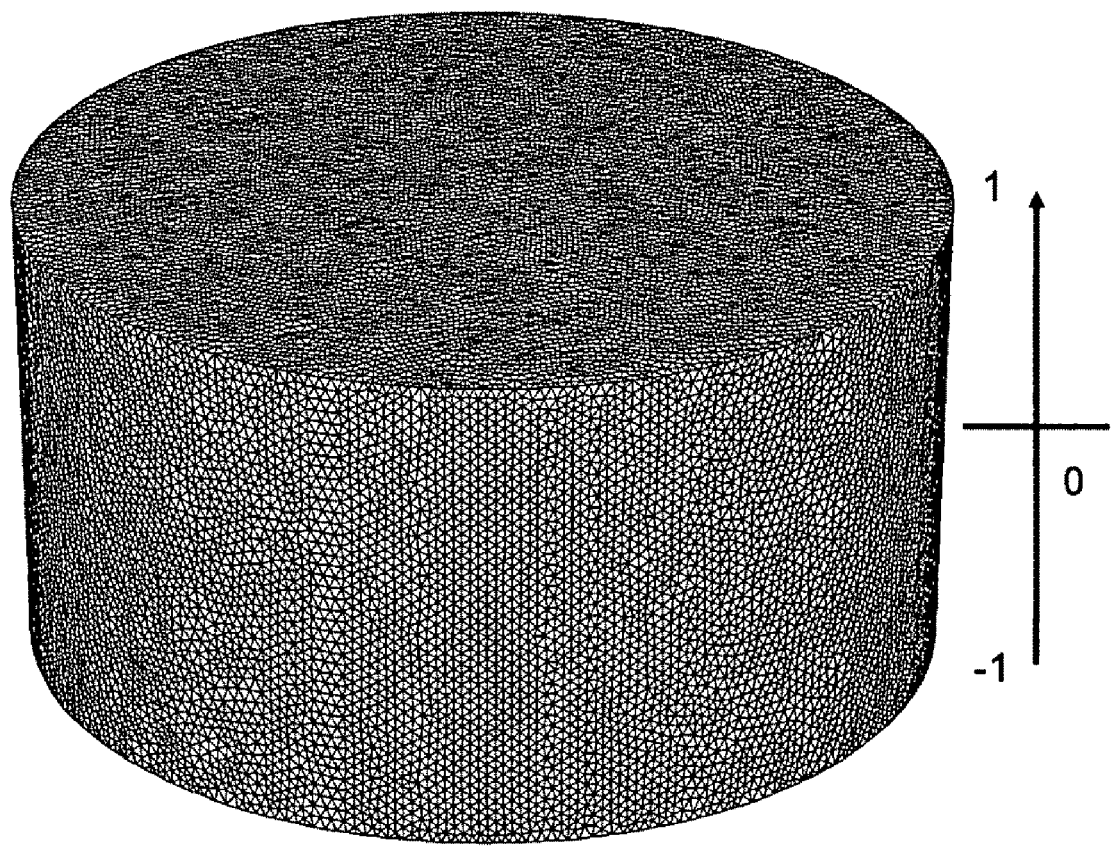
FIG. 28 is a schematic showing a mesh (438413 nodes, 2539200 elements) of an analytical model in the analysis of the Rotating Cone problem.

For verification of three-dimensional analysis by the method invented, the Rotating Cone problem (advection problem of substance concentration) is analyzed (refer to non-patent document 4) in the same manner as two-dimensions. FIG. 28 is a schematic showing the mesh (438413 nodes, 2539200 elements) of an analytical model in the analysis of the Rotating Cone problem. FIG. 28 is a model derived from the two-dimensional analytical model in FIG. 13 by the addition of a perpendicular length-2 (−1 to 1). The flow velocity (flow condition) and the distribution of concentration of the analytical model have no change perpendicularly as in the case of the two-dimensional analytical model.

Figure 29:
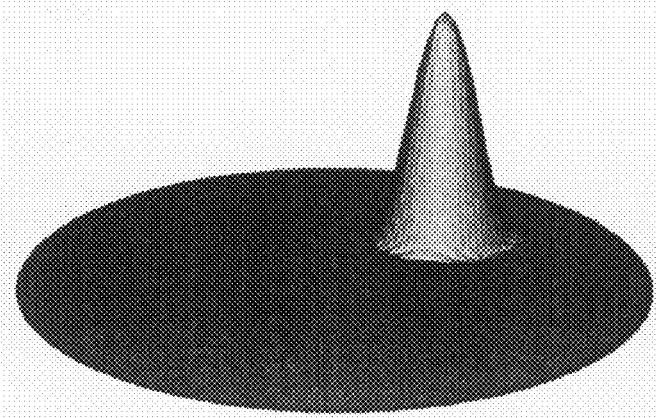
FIG. 29 is a bird's eye view showing the initial condition of a cross-section at the perpendicular position=0 in the analysis of the Rotating Cone problem.
Figure 30:
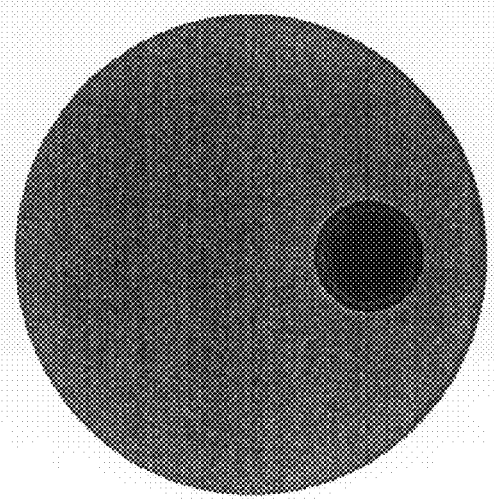
FIG. 30 is a schematic showing the contours of the initial condition at the portion of the perpendicular position=0 in the analysis of the Rotating Cone problem.

FIG. 29 is a bird's eye view showing the initial condition (initial distribution of concentration) of a cross-section at a perpendicular position=0 in the analysis of the Rotating Cone problem, and FIG. 30 is a schematic showing the contours of the initial condition (initial distribution of concentration) at the portion of the perpendicular position=0 in the analysis of the Rotating Cone problem.

Figure 31:
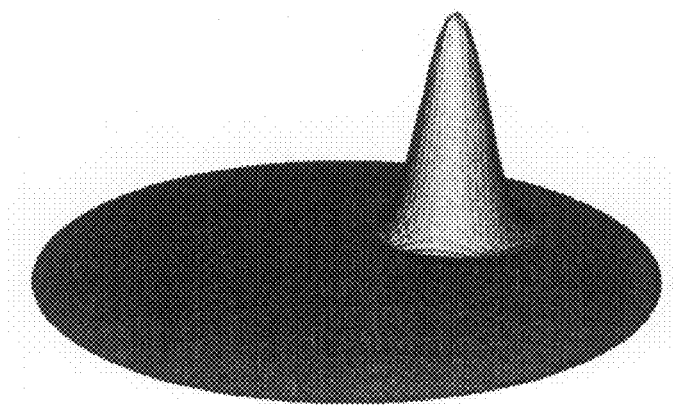
FIG. 31 is a bird's eye view showing the result of the computation at the portion of the perpendicular position=0 by a bubble function (equation (50)) using a consistent mass matrix.
Figure 32:
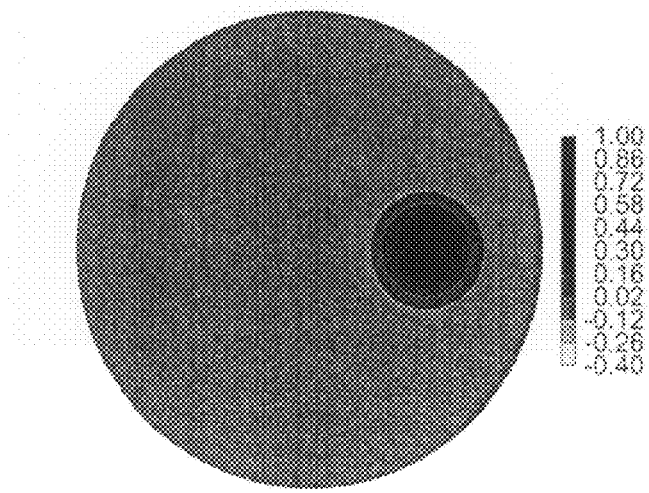
FIG. 32 is a schematic showing the contours of the computation result at the portion of the perpendicular position=0 by a bubble function (equation (50)) using a consistent mass matrix.
Figure 33:
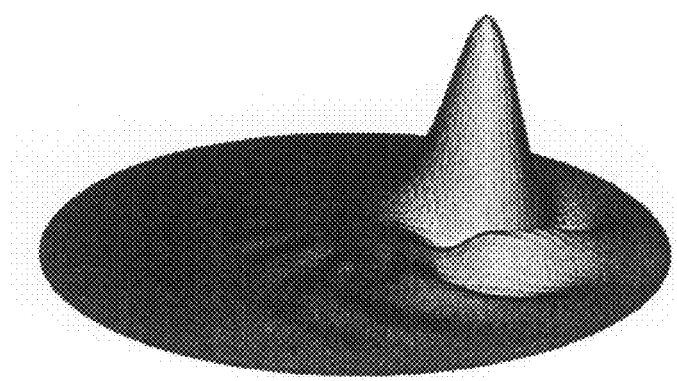
FIG. 33 is a bird's eye view showing the computation result at the portion of the perpendicular position-O by a bubble function (equation (50)) using a lumped mass matrix.
Figure 34:
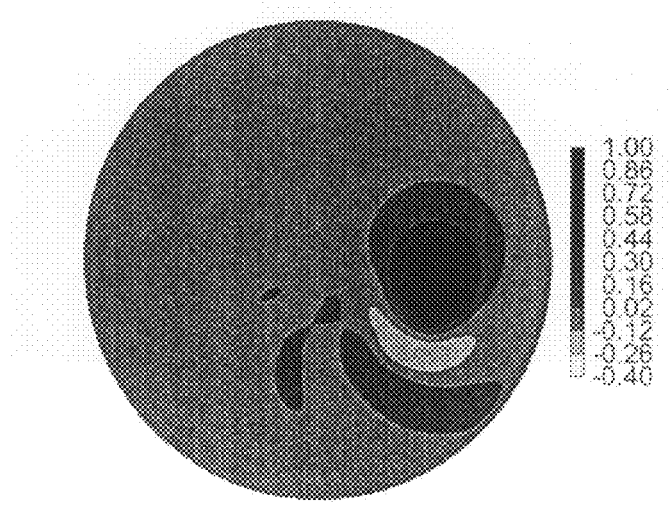
FIG. 34 is a schematic showing the contours of the computation result at the portion of the perpendicular positioned by a bubble function (equation (50)) using a lumped mass matrix.

FIG. 31 is a bird's eye view showing the computation result, of a bubble function (equation (50)) using a consistent mass matrix, at the portion of the perpendicular position=0, and FIG. 32 is a schematic showing the contours of the computation result, of a bubble function (equation (50)) using a consistent mass matrix, at the portion of the perpendicular position=0. FIG. 33 is a bird's eye view showing the computation result, of a bubble function (equation (50)) using a lumped mass matrix, at the portion of the perpendicular position=0, and FIG. 34 is a schematic showing the contours of the computation result, of a bubble function (equation (50)) using a lumped mass matrix, at the portion of the perpendicular position=0.

Figure 35:
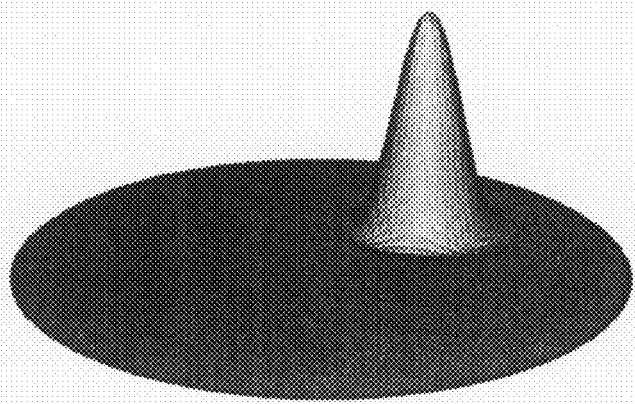
FIG. 35 is a bird's eye view showing the result of the computation at the portion of the perpendicular position-0 by a bubble function (equation (51)) using a consistent mass matrix.
Figure 36:
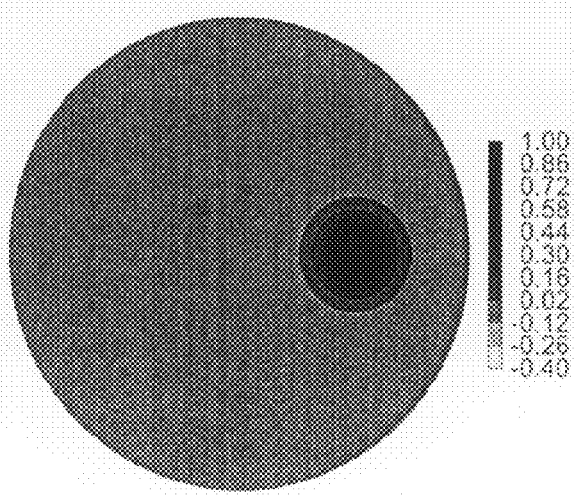
FIG. 36 is a schematic showing the contours of the computation result at the portion of the perpendicular position=0 by a bubble function (equation (51)) using a consistent mass matrix.
Figure 37:
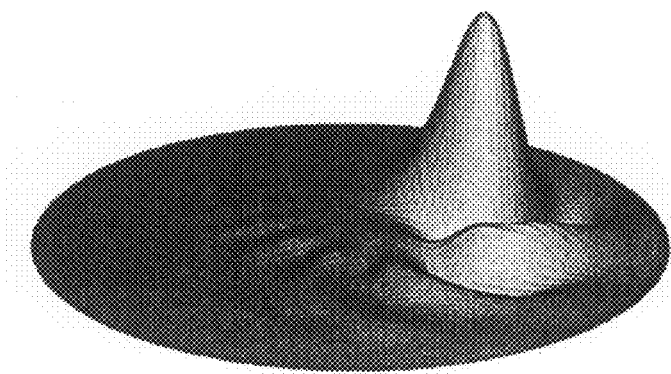
FIG. 37 is a bird's eye view showing the computation result at the portion of the perpendicular position=0 by a bubble function (equation (51)) using a lumped mass matrix.
Figure 38:
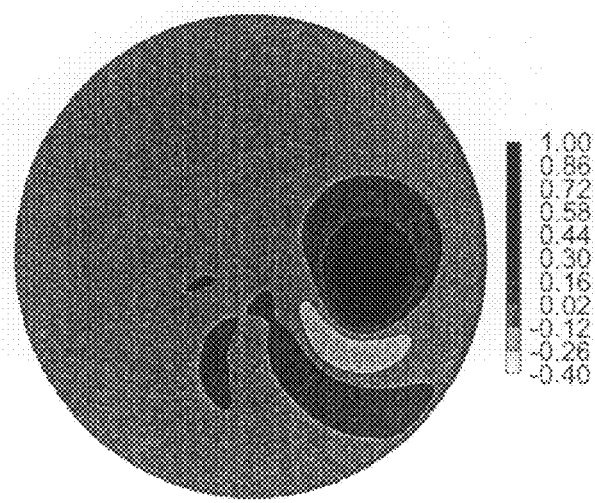
FIG. 38 is a schematic showing the contours of the computation result at the portion of the perpendicular position=0 by a bubble function (equation (51)) using a lumped mass matrix.
Figure 39:
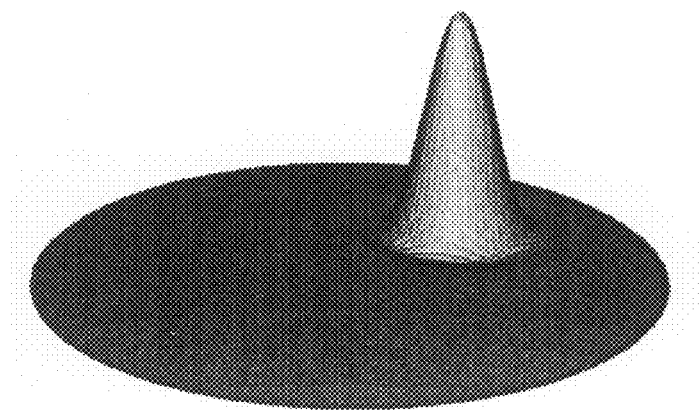
FIG. 39 is a bird's eye view showing the computation result at the portion of the perpendicular position=C by a bubble function (equation (52)) using a diagonal mass matrix.
Figure 40:
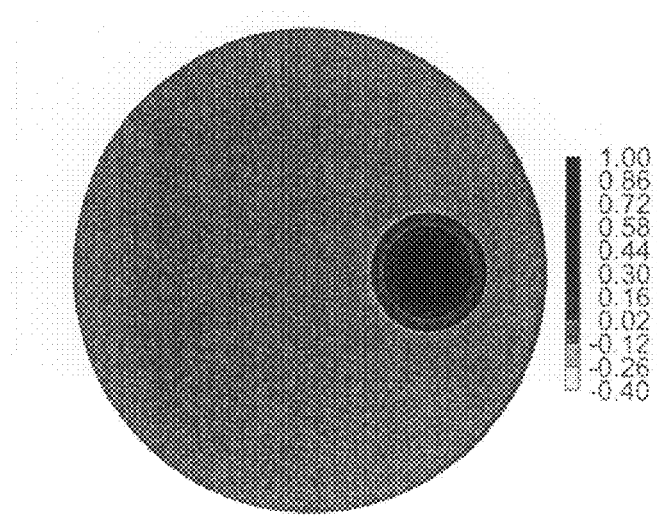
FIG. 40 is a schematic showing the contours of the computation result at the portion of the perpendicular positions=0 by a bubble function (equation (52)) using a diagonal mass matrix.

FIG. 35 is a bird's eye view showing the computation result, of a bubble function (equation (51)) using a consistent mass matrix, at the portion of the perpendicular position=0, and FIG. 36 is a schematic showing the contours of the computation result, of a bubble function (equation (51)) using a consistent mass matrix, at the portion of the perpendicular position=0. FIG. 37 is a bird's eye view showing the computation result, of a bubble function (equation (51)) using a lumped mass matrix, at the portion of the perpendicular position=0, and FIG. 38 is a schematic showing the contours of the computation result, of a bubble function (equation (51)) using a lumped mass matrix, at the portion of the perpendicular position=0. FIG. 39 is a bird's eye view showing the computation result, of a bubble function (equation (52)) using a diagonal mass matrix, at the portion of the perpendicular position=0, and FIG. 40 is a schematic showing the contours of the computation result, of a bubble function (equation (52)) using a diagonal mass matrix, at the portion of the perpendicular position=0.

As analyzing methods for the verification of all bubble function subjects, a bubble function element stabilizing method (refer to non-patent document 3) is used for spatial discretization considering the stability of numerical analysis, a four-step solution is used for temporal discretization, and $\pi/600$ is adopted for $\Delta t$. FIGS. 31, 32, 35, and 36 illustrate the computation results by a bubble functions (equations (50) and (51)) using consistent mass matrices.

In contrast to these computation results, as shown by the computation results of bubble functions (equations (50) and (51)) using lumped mass matrices illustrated in FIGS. 33, 34, 37, and 38, oscillations are generated on the side opposite to the direction of movement of the physical quantity (cone), and the distribution of the cone is also deformed. These computation results are of low reliability for numerical analysis due to the physically insignificant, conspicuous attenuation and expansion of concentration, and the remarkable shift of the maximum concentration point.

On the other hand, the computation result by a bubble function (equation (52)) using an diagonal mass matrix is accompanied neither by oscillations on the side opposite to the direction of movement of the cone nor by the deformation of a distribution pattern, thereby retaining a computation accuracy equivalent to the computation results of bubble function (equations (50) and (51)) using a consistent mass matrix, and yielding results with high reliability.

<8. One-Dimensional Orthogonal Basis Bubble Function Element and Element Level Mass Matrix>

The invention of two- and three-dimensional orthogonal basis bubble function elements and their effectiveness is described above. In numerical computation by a finite element method, although most problems for analysis are practically two- and three-dimensional, the orthogonal basis bubble function element can also be defined in one dimension. Here, a one-dimensional bubble function element and a $\xi$-exponent bubble function are presented, and an orthogonal conditional equation (14) (or equation (21)) is expressed in standardized form using spatial dimension number N that represents one to three dimensions. One-dimensional (linear bubble function element) element level mass matrix is also presented.

Figure 41:
FIG. 41 is a schematic (1) showing an isoparametric coordinate system r.

FIG. 41 is a schematic (1) showing an isoparametric coordinate system r. When the isoparametric coordinate system r shown in FIG. 41 is described by equations (1) and (2), one-dimensional $\Phi^T$, $u^T$, $\psi_\alpha$ are expressed as the following equations (53) to (55).

[Equations 29]
One-Dimension $$\Phi^T=[(\Phi_1 \Phi_2 \phi_B] \tag{53}$$

$$u^T=[u_1 u_2 u_B] \tag{54}$$

$$\Psi_1=1-r, \ \Psi_2=r \tag{55}$$

Figure 42:
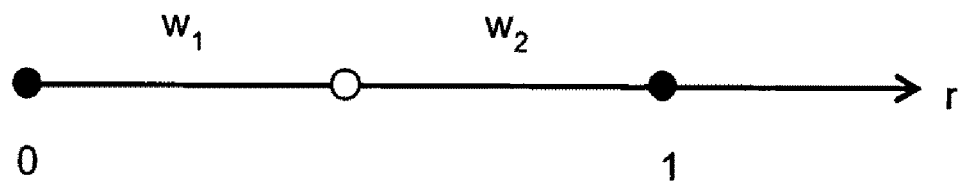
FIG. 42 is a schematic (2) showing an isoparametric coordinate system r.

FIG. 42 is a schematic (2) showing an isoparametric coordinate system r. In the isoparametric coordinate system r shown in FIG. 42, when a linear element region is divided into $w_1$ and $w_2$ using an intermediate point, a one-dimensional $\xi$-exponent bubble function, which produces an integration value for the element region of the bubble function as equation (29), is defined as the following equation (56).

[Equations 30]

One-dimension $$\phi_B^\xi = \begin{cases} 2^\xi(1-r)^\xi & \text{in } w_1 \\ 2^\xi r^\xi & \text{in } w_2 \end{cases} \tag{56}$$

For the $\xi$ ($\eta$)-exponent bubble function (0<$\eta$<∞) equations (56), (27), and (28), integration values obtained by the spatial partial differentiation of bubble functions can also be expressed in a standardized form as shown in the following equation (57), and have integration value relationships as shown by the following equations (58) and (59).

[Equations 31]

$$\left\langle \frac{\partial \phi_B^\xi}{\partial x_k}, \frac{\partial \phi_B^\eta}{\partial x_l} \right\rangle_{\Omega_e} = \frac{(N+1)N!\xi\eta}{\prod_{\gamma=-1}^{N-2}(\xi+\eta+\gamma)} A_e \left( \sum_{\alpha=1}^{N+1} \frac{\partial \Psi_\alpha}{\partial x_k} \frac{\partial \Psi_\alpha}{\partial x_l} \right) \tag{57}$$

$$\langle \Psi_\alpha, \phi_B^\xi \rangle_{\Omega_e} = \frac{1}{N+1} \langle 1, \phi_B^\xi \rangle_{\Omega_e}, \alpha = 1 \ldots N+1 \tag{58}$$

$$\left\langle \Psi_\alpha, \sum_{k_d=1}^{K_D} \alpha_{k_d} \phi_B^{\xi_{k_d}} \right\rangle_{\Omega_e} = \sum_{k_d=1}^{K_D} \alpha_{k_d} \left\langle \Psi_\alpha, \phi_B^{\xi_{k_d}} \right\rangle_{\Omega_e} = \tag{59}$$

$$\frac{1}{N+1}\left(\sum_{k_d=1}^{K_D} \alpha_{k_d} \langle 1, \phi_B^{\xi_{k_d}} \rangle_{\Omega_e}\right) = \frac{1}{N+1}\left\langle 1, \sum_{k_d=1}^{K_D} \alpha_{k_d} \phi_B^{\xi_{k_d}} \right\rangle_{\Omega_e},$$

$$\alpha = 1 \ldots N+1, 0 < \xi_{k_d} < \infty$$

Each of $x_k$ and $x_i = x_1 \ldots x_N$ in equation (57) indicates spatial direction, and $\alpha_{k_d}$ and $K_D$ in equation (59) represent real numbers and positive integers, respectively. Equation (59) is obtained from equation (58). The conditional equation (14) (or equation (21)) of an orthogonal basis bubble function element for one to three dimensions is expressed, in a standardized form, as the following equation (60) using spatial dimension number N, provided that $C=(N+1)/(N+2)$.

[Equations 32]

$$\langle \phi_B, 1 \rangle_{\Omega_e} = \|\phi_B\|_{\Omega_e}^2 = \frac{N+1}{N+2} A_e \tag{60}$$

A consistent mass matrix and a lumped mass matrix at the element level of an ordinary bubble function element of one dimension (line), and the element level mass matrix (diagonal mass matrix) of an orthogonal basis bubble function element are expressed in the following equations (61) to (63).

[Equations 33]

Line bubble function element (61)

Element level consistent mass matrix $$\langle \Phi, \Phi^T \rangle_{\Omega_e} = M_{ij}^{(e)} = \begin{bmatrix} \frac{A_e}{3} & \frac{A_e}{6} & 0 \\ \frac{A_e}{6} & \frac{A_e}{3} & 0 \\ 0 & 0 & 0 \end{bmatrix} + \frac{1}{4}\langle 1, \phi_B \rangle_{\Omega_e} \begin{bmatrix} -2 & -2 & 2 \\ -2 & -2 & 2 \\ 2 & 2 & 0 \end{bmatrix} +$$

$$\frac{1}{4}\|\phi_B\|_{\Omega_e}^2 \begin{bmatrix} 1 & 1 & -2 \\ 1 & 1 & -2 \\ -2 & -2 & 4 \end{bmatrix}$$

Element level lumped mass matrix (when lumped) (62)

$$\langle \Phi, \Phi^T \rangle_{\Omega_e} = M_{ij}^{(e)} \approx diag\left(\sum_{j=1}^{N+2} M_{ij}^{(e)}\right) = \begin{bmatrix} \frac{A_e}{2} & 0 & 0 \\ 0 & \frac{A_e}{2} & 0 \\ 0 & 0 & 0 \end{bmatrix} +$$

$$\frac{1}{2}\langle 1, \phi_B \rangle_{\Omega_e} \begin{bmatrix} -1 & 0 & 0 \\ 0 & -1 & 0 \\ 0 & 0 & 2 \end{bmatrix}$$

Element level diagonal mass (63)

matrix (orthogonal basis bubble function)

$$\langle \Phi, \Phi^T \rangle_{\Omega_e} = M_{ij}^{(e)} = \begin{bmatrix} \frac{A_e}{6} & 0 & 0 \\ 0 & \frac{A_e}{6} & 0 \\ 0 & 0 & \frac{2}{3}A_e \end{bmatrix}$$

<9. Expanded Orthogonal Basis Bubble Function Element>

In general, in the analyses of fluid, structure, and Eigen value using a bubble function element, the integration values of the bubble functions, the following equations (64) to (66), are required in addition to the integration value of a shape function $\psi_\alpha$ as a linear element.

[Equations 34]

$$\langle \Psi_\alpha, \phi_B \rangle_{\Omega_e}, \alpha = 1 \ldots N+1 \tag{64}$$

$$\|\phi_B\|_{\Omega_e}^2 \tag{65}$$

$$\left\langle \frac{\partial \phi_B}{\partial x_k}, \frac{\partial \phi_B}{\partial x_l} \right\rangle_{\Omega_e} \tag{66}$$

A relationship expressed in the following equation (68) is obtained from the following equation (67) and equation (64).

[Equations 35]

$$\sum_{\alpha=1}^{N+1} \Psi_\alpha = 1 \tag{67}$$

$$\langle 1, \phi_B \rangle_{\Omega_e} = \left\langle \sum_{\alpha=1}^{N+1} \Psi_\alpha, \phi_B \right\rangle_{\Omega_e} = \sum_{\alpha=1}^{N+1} \langle \Psi_\alpha, \phi_B \rangle_{\Omega_e} \tag{68}$$

In the case of a bubble function that has a relationship expressed in the following equation (69), among equations (64) to (66) that are required to obtain the integration value of a bubble function, equation (64) can be substituted with equation (70).

[Equations 36]

$$\langle \Psi_\alpha, \phi_B \rangle_{\Omega_e} = \frac{1}{N+1}\langle 1, \phi_B \rangle_{\Omega_e}, \alpha = 1 \ldots N+1 \tag{69}$$

$$\langle \phi_B, 1 \rangle_{\Omega_e} \tag{70}$$

Since the relationship described by equation (69) can be applied to common bubble functions, such as equations (47), (48), (50), and (51), as long as the special bubble functions appearing in a non-patent document 3 are not introduced, the relationship is also applied to equations (17) and (19), which appear in the induction assumption, the orthogonal condition equation (21), and equation (22) is assumed to be the bubble function that satisfies equation (69). In the case equation (30) is adopted as the right side bubble function of equation (22), equation (59) proves that equation (22) satisfies equation (69).

In the case orthogonal basis bubble function element is adopted, among equations (70), (65), and (66), equations (70) and (65) can be proved by equation (60), however, equation (66) can not be determined by an orthogonal condition. In fact, equation (66) is expressed by the following equation (71) in the case orthogonal basis bubble function is established using a $\xi$-exponent bubble functions such as equations (56), (27), and (28).

[Equations 37]

$$\left\langle \frac{\partial \phi_B}{\partial x_k}, \frac{\partial \phi_B}{\partial x_l} \right\rangle_{\Omega_e} = D(\xi_1, \xi_2, \xi_3) A_e \left( \sum_{a=1}^{N+1} \frac{\partial \Psi_a}{\partial x_k} \frac{\partial \Psi_a}{\partial x_l} \right) \quad (71)$$

$$D(\xi_1, \xi_2, \xi_3) = \frac{(N+1)N!}{\left(\sum_{l_d=1}^{3} \alpha_{l_d}\right)^2} \sum_{m_d=1}^{3} \sum_{n_d=1}^{3} \frac{\alpha_{m_d} \alpha_{n_d} \xi_{m_d} \xi_{n_d}}{\prod_{\gamma=-1}^{N-2} (\xi_{m_d} + \xi_{n_d} + \gamma)} \quad (72)$$

$\xi_1 = \hat{\xi}, \xi_2 = \tilde{\xi}, \xi_3 = \bar{\xi}, \alpha_1 = \alpha_1(\xi_1, \xi_2, \xi_3),$
$\alpha_2 = \alpha_2(\xi_1, \xi_2, \xi_3), \alpha_3 = 1,$ $$\alpha_1(\xi_1, \xi_2, \xi_3) = \begin{cases} \alpha_1 + (\xi_1, \xi_2, \xi_3) = \frac{-b(\xi_1, \xi_2, \xi_3) + \sqrt{b^2(\xi_1, \xi_2, \xi_3) - 4\alpha(\xi_1, \xi_2)c(\xi_2, \xi_3)}}{2\alpha(\xi_1, \xi_2)} \\ \alpha_1 - (\xi_1, \xi_2, \xi_3) = \frac{-b(\xi_1, \xi_2, \xi_3) - \sqrt{b^2(\xi_1, \xi_2, \xi_3) - 4\alpha(\xi_1, \xi_2)c(\xi_2, \xi_3)}}{2\alpha(\xi_1, \xi_2)} \end{cases}$$

In equation, (71), the value of D ($\xi_1, \xi_2, \xi_3$) is the function of variables $\xi_1, \xi_2, \xi_3$. Practically, when equation (72) is computed (under the condition of $\alpha_1(\xi_1, \xi_2, \xi_3) = \alpha_{1+}(\xi_1, \xi_2, \xi_3)$) using the values of equations (31) and (36), the values computed differ, as shown in the following equations (73) to (75), depending on variable adopted.

[Equations 38]

One-dimension (73)
$$D\left(\frac{1}{10}, \frac{1}{5}, \frac{3}{4}\right) = 35.0049920 \ldots, D\left(3, 2, \frac{6}{5}\right) = 5.9124806 \ldots$$

Two-dimensions (74)
$$D\left(\frac{1}{10}, \frac{1}{5}, \frac{3}{4}\right) = 982.4790415 \ldots, D\left(3, 2, \frac{6}{5}\right) = 14.3484025 \ldots$$

Three-dimensions (75)
$$D\left(\frac{1}{10}, \frac{1}{5}, \frac{3}{4}\right) = 4347.7594268 \ldots, D\left(3, 2, \frac{6}{5}\right) = 46.818447 \ldots$$

In the present invention, the following equation (76) can determine the integration value of equation (66) using an integration value obtained by the orthogonal conditional equation (60) and is newly defined as the expansion of an orthogonal basis bubble function element.

[Equations 39]

$$\left\langle \frac{\partial \phi_B}{\partial x_k}, \frac{\partial \phi_B}{\partial x_l} \right\rangle_{\Omega_e} := \left\langle \frac{\partial \phi_B}{\partial x_k}, \Phi^T \right\rangle_{\Omega_e} \langle \Phi, \Phi^T \rangle_{\Omega_e}^{-1} \left\langle \Phi, \frac{\partial \phi_B}{\partial x_l} \right\rangle_{\Omega_e} \quad (76)$$

$$= \left( -\langle \phi_B, 1 \rangle_{\Omega_e} \left[ \frac{\partial \Psi^T}{\partial x_k} \; 0 \right] \right) \langle \Phi, \Phi^T \rangle_{\Omega_e}^{-1} \left( -\left[ \frac{\partial \Psi}{\partial x_l} \atop 0 \right] \langle 1, \phi_B \rangle_{\Omega_e} \right)$$

$$= \frac{(N+1)^3}{N+2} A_e \left( \sum_{a=1}^{N+1} \frac{\partial \Psi_a}{\partial x_k} \frac{\partial \Psi_a}{\partial x_l} \right)$$

One-dimension (77)
$$\Psi^T = [\Psi_1 \Psi_2]$$

Two-dimensions (78)
$$\Psi^T = [\Psi_1 \Psi_2 \Psi_3]$$

Three-dimensions (79)
$$\Psi^T = [\Psi_1 \Psi_2 \Psi_3 \Psi_4]$$

The following equation (80) is obtained from equation (60), which defines the orthogonal condition of basis by adding the condition of equation (76), and is defined as the conditional equation of an expanded orthogonal basis bubble function element.

[Equations 40]

$$\langle \phi_B, 1 \rangle_{\Omega_e} = \quad (80)$$

$$\|\phi_B\|_{\Omega_e}^2 = \left\langle \frac{\partial \phi_B}{\partial x_k}, \frac{\partial \phi_B}{\partial x_l} \right\rangle_{\Omega_e} \left\{ (N+1)^2 \left( \sum_{a=1}^{N+1} \frac{\partial \Psi_a}{\partial x_k} \frac{\partial \Psi_a}{\partial x_l} \right) \right\}^{-1} = \frac{N+1}{N+2} A_e$$

<10. Bubble Function Satisfying Expanded Orthogonal Basis Bubble Function Element>

As is obvious from equation (71), the integration value of the orthogonal basis bubble function, equation (66), is established using the $\xi$-exponent bubble functions, equations (56), (27), and (28), and is determined by the values of variables $\xi_1, \xi_2, \xi_3$. In the present patent, variables $\xi_1, \xi_2, \xi_3$ that satisfy the conditional equation (80) of an expanded orthogonal basis bubble function element are examined, and the existence of such the variables is shown. The bubble function that satisfies the condition of an expanded orthogonal basis bubble function element is examined as a problem with a single variable $\xi_1$ by fixing the values of two of the three variables $\xi_1, \xi_2, \xi_3$ as the following equation (81).

[Equations 41]

$$\xi_2 = \tilde{\xi} = \frac{8}{5}, \xi_3 = \bar{\xi} = \frac{2}{5} \quad (81)$$

As a problem with a single-variable $\xi_1$, the following equation (82) is defined.

[Equations 42]

$$f(\xi_1) = (\alpha_1(\xi_1) + \alpha_2(\xi_1) + 1)^2 \left\{ D(\xi_1) - \frac{(N+1)^3}{(N+2)} \right\} \quad (82)$$

$$\alpha_1(\xi_1) = \alpha_1 + \left(\xi_1, \frac{8}{5}, \frac{2}{5}\right),$$

$$\alpha_2(\xi_1) = \alpha_2 + \left(\xi_1, \frac{8}{5}, \frac{2}{5}\right),$$

$$D(\xi_1) = D\left(\xi_1, \frac{8}{5}, \frac{2}{5}\right)$$

The existence of a bubble function that satisfies the condition of an expanded orthogonal basis bubble function element means the existence of a variable that produces $f(\xi_1)=0$ in a set R of real numbers. Subsets S of the set R of real numbers, as in the following equations (83) to (85), are defined.

[Equations 43]

One-Dimension $$1.8310 \leq S \leq 1.8315 \quad (83)$$

Two-Dimensions $$5.2678 \leq S \leq 5.2683 \quad (84)$$

Three-Dimensions $$1.8061 \leq S \leq 1.8066 \quad (85)$$

When $\xi_1 \in S$, the following equation (86) is induced for one to three dimensions.

[Equations 44]

$$b^2(\xi_1) - 4\alpha(\xi_1)c > 0 \quad (86)$$

Therefore, $\alpha_1$ and $\alpha_2$ have values within a real number field. When $\xi_1 \in S$, as the following equations (87) and (88) can be established for one to three dimensions, equation (72) produces bounded values, and equation (82) becomes a function of a real variable.

[Equations 45]

$$\alpha_1(\xi_1) + \alpha_2(\xi_1) + 1 \neq 0 \quad (87)$$

$$\prod_{\gamma=-1}^{N-2} (\xi_{m_d} + \xi_{n_d} + \gamma) \neq 0, \, m_d, n_d = 1,2,3 \quad (88)$$

The following equations (89) to (91) can be obtained using equation (82) and the subsets S.

[Equations 46]

One-dimension (89)

$$f(1.8310) < 0, \, f(1.8315) > 0, \, \frac{df(\xi_{1c})}{d\xi_{1c}} > 0$$

-continued

Two-dimensions (90)

$$f(5.2678) > 0, \, f(5.2683) < 0, \, \frac{df(\xi_{1c})}{d\xi_{1c}} < 0$$

Three-dimensions (91)

$$f(1.8061) > 0, \, f(1.8066) < 0, \, \frac{df(\xi_{1c})}{d\xi_{1c}} < 0$$

For arbitrary $\xi_{1c} \in S$, as the first, second, and third equations of equation (89) are negative, positive, and positive (monotonical increase), respectively for one dimension, and the first, second, and third equations of equations (90) and (91) are positive, negative, and negative (monotonical decrease), respectively for two and three dimensions, the solution of $f(\xi_1)=0$ uniformly exists within the region of the subset S for one to three dimensions.

Practically, when the solution of $f(\xi_1)=0$ is found using a bisection method within the subset S, the values of the following equations (92) to (94) are obtained.

[Equations 47]

One-Dimension $$\xi_1 = \tilde{\xi} = -1.8312889\ldots, \alpha_1 = 20.4651928\ldots, \alpha_2 = -22.5761007\ldots \quad (92)$$

Two-Dimensions $$\xi_1 = \tilde{\xi} = 5.2680399\ldots, \alpha_1 = -26201232\ldots, \alpha_2 = 3.1609628\ldots \quad (93)$$

Three-Dimensions $$\xi_1 = \tilde{\xi} = 1.8063444\ldots, \alpha_1 = -17.3739109\ldots, \alpha_2 = 17.5493578\ldots \quad (94)$$

Figure 43:
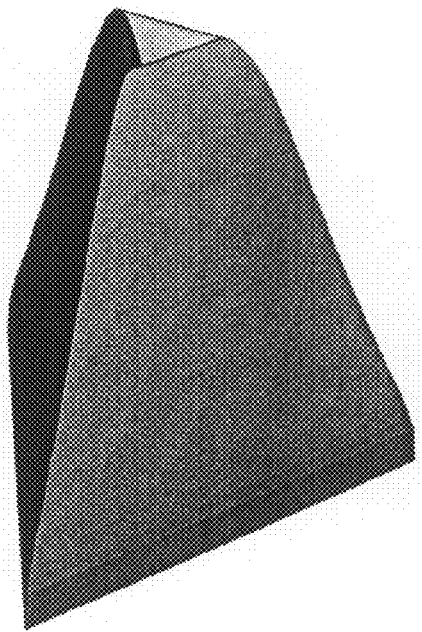
FIG. 43 is a schematic showing the shape $\phi_B$ of a triangular bubble function using equations (81) and (93)
Figure 44:
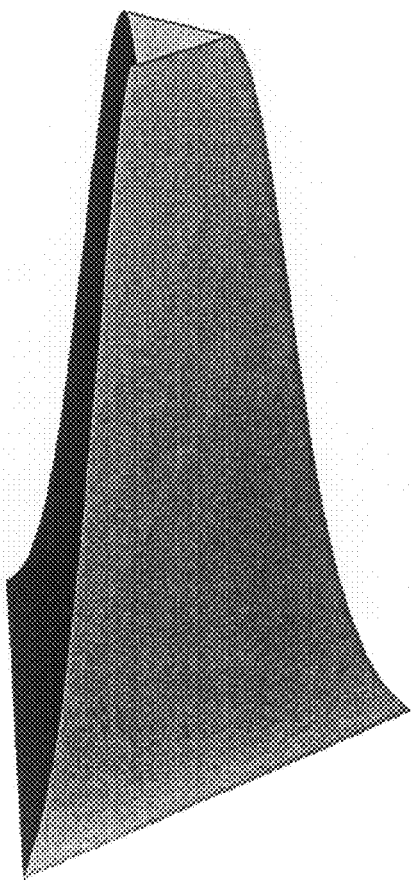
FIG. 44 is a schematic showing the shape $\phi_B{}^2$ of a triangular bubble function using equations (81) and (93)

The shape $\phi_B$ of a triangular bubble function and the shape $\phi_B^2$ of a triangular bubble function using equations (81) and (93) are shown in FIGS. 43 and 44.

The existence of the solution of $f(\xi_1)=0$ can also be proved by the following equations (95) and (96).

[Equations 48]

$$g(\xi_1) = \xi_1 - \frac{f(\xi_1)}{f'(\xi_1)} \quad (95)$$

$$|g'|(\xi_1) = \left|\frac{f(\xi_1)f''(\xi_1)}{(f'(\xi_1))^2}\right| \quad (96)$$

$$f'(\xi_1) = \frac{df(\xi_1)}{d\xi_1}, \, f''(\xi_1) = \frac{d^2 f(\xi_1)}{d\xi_1^2}, \, g'(\xi_1) = \frac{dg(\xi_1)}{d(\xi_1)}$$

For arbitrary $\xi_{1c} \in S$, a result as the following equation (97) is obtained for one to three dimensions by defining the h as a positive constant.

[Equations 49]

$$|g'(\xi_{1c})| < h < 1 \quad (97)$$

The following equation (98) is obtained for arbitrary $\xi_{1a}$, $\xi_{1b} \in S$ by the mean-value theorem.

[Equations 50]

$$|g(\xi_{1a}) - g(\xi_{1b})| = |g'(\xi_{1c})||\xi_{1a} - \xi_{1b}| < h|\xi_{1a} - \xi_{1b}|, \; 0 < h < 1 \quad (98)$$

Therefore, the sequence $\{\xi_1^m\}$ obtained using the following equation (99), which repeatedly executes the sequential computing of equation (95), converges to a uniform solution that satisfies $f(\xi_1)=0$ within the subset S by the contraction mapping principle (theorem).

[Equations 51]

$$\xi_1^{m+1} = \xi_1^m - \frac{f(\xi_1^m)}{f'(\xi_1^m)}, \; m = 0,1,2,3,\ldots \quad (99)$$

In order to prove the existence of expanded orthogonal basis bubble function element, while appropriate bubble functions $\phi_{B1}$, $\phi_{B2}$, and $\phi_{B3}$ are adopted as bubble functions that satisfies the three conditions of equation (80) with the definition of three unknown quantities as $\alpha_1$, $\alpha_2$, and $\xi_1$, as a bubble function $\phi_B$ expressed by the following equation (100), the bubble function that satisfies the conditions of equation (80) can also be obtained by adopting appropriate bubble functions $\phi_{B1}$, $\phi_{B2}$, $\phi_{B3}$, and $\phi_{B4}$ with unknown quantities $\alpha_1$, $\alpha_2$, and $\alpha_3$. Thus the bubble function that satisfies the conditions of expanded orthogonal basis bubble function element is not only one, but many, and therefore, the integration value of a bubble function, which is the condition of equation (80), is significant for an expanded orthogonal basis bubble function element while specific bubble functions and the shapes thereof have little significance.

[Equations 52]

$$\phi_B = \frac{\alpha_1 \phi_{B1} + \alpha_2 + \phi_{B2} + \alpha_3 + \phi_{B3} + \phi_{B4}}{\alpha_1 + \alpha_2 + \alpha_3 + 1} \quad (100)$$

<11. Matrix of the Element Level Viscous Term (Diffusion Term) of Expanded Orthogonal Basis Bubble Function Element>

The matrices of a viscous term (diffusion term) that requires equation (66) for the numerical analysis of an ordinary bubble function element and an orthogonal basis bubble function element are expressed in the following equations (101) to (103).

[Equations 53]

One-dimension (101)

$$\left\langle \frac{\partial \Phi}{\partial x_k}, \frac{\partial \Phi^T}{\partial x_l} \right\rangle \Omega_e = A_e \begin{bmatrix} \frac{\partial \Psi_1}{\partial x_k}\frac{\partial \Psi_1}{\partial x_l} & \frac{\partial \Psi_1}{\partial x_k}\frac{\partial \Psi_2}{\partial x_l} & 0 \\ \frac{\partial \Psi_2}{\partial x_k}\frac{\partial \Psi_1}{\partial x_l} & \frac{\partial \Psi_2}{\partial x_k}\frac{\partial \Psi_2}{\partial x_l} & 0 \\ 0 & 0 & 0 \end{bmatrix} +$$

$$\left\langle \frac{\partial \phi_B}{\partial x_k}, \frac{\partial \phi_B}{\partial x_l} \right\rangle_{\Omega_e} \frac{1}{4} \begin{bmatrix} 1 & 1 & -2 \\ 1 & 1 & -2 \\ -2 & -2 & 4 \end{bmatrix}$$

Two-dimensions (102)

$$\left\langle \frac{\partial \Phi}{\partial x_k}, \frac{\partial \Phi^T}{\partial x_l} \right\rangle \Omega_e = A_e \begin{bmatrix} \frac{\partial \Psi_1}{\partial x_k}\frac{\partial \Psi_1}{\partial x_l} & \frac{\partial \Psi_1}{\partial x_k}\frac{\partial \Psi_2}{\partial x_l} & \frac{\partial \Psi_1}{\partial x_k}\frac{\partial \Psi_3}{\partial x_l} & 0 \\ \frac{\partial \Psi_2}{\partial x_k}\frac{\partial \Psi_1}{\partial x_l} & \frac{\partial \Psi_2}{\partial x_k}\frac{\partial \Psi_2}{\partial x_l} & \frac{\partial \Psi_2}{\partial x_k}\frac{\partial \Psi_3}{\partial x_l} & 0 \\ \frac{\partial \Psi_3}{\partial x_k}\frac{\partial \Psi_1}{\partial x_l} & \frac{\partial \Psi_3}{\partial x_k}\frac{\partial \Psi_2}{\partial x_l} & \frac{\partial \Psi_3}{\partial x_k}\frac{\partial \Psi_3}{\partial x_l} & 0 \\ 0 & 0 & 0 & 0 \end{bmatrix} +$$

$$\left\langle \frac{\partial \phi_B}{\partial x_k}, \frac{\partial \phi_B}{\partial x_l} \right\rangle_{\Omega_e} \frac{1}{9} \begin{bmatrix} 1 & 1 & 1 & -3 \\ 1 & 1 & 1 & -3 \\ 1 & 1 & 1 & -3 \\ -3 & -3 & -3 & 9 \end{bmatrix}$$

Three-dimensions (103)

$$\left\langle \frac{\partial \Phi}{\partial x_k}, \frac{\partial \Phi^T}{\partial x_l} \right\rangle \Omega_e =$$

$$A_e \begin{bmatrix} \frac{\partial \Psi_1}{\partial x_k}\frac{\partial \Psi_1}{\partial x_l} & \frac{\partial \Psi_1}{\partial x_k}\frac{\partial \Psi_2}{\partial x_l} & \frac{\partial \Psi_1}{\partial x_k}\frac{\partial \Psi_3}{\partial x_l} & \frac{\partial \Psi_1}{\partial x_k}\frac{\partial \Psi_4}{\partial x_l} & 0 \\ \frac{\partial \Psi_2}{\partial x_k}\frac{\partial \Psi_1}{\partial x_l} & \frac{\partial \Psi_2}{\partial x_k}\frac{\partial \Psi_2}{\partial x_l} & \frac{\partial \Psi_2}{\partial x_k}\frac{\partial \Psi_3}{\partial x_l} & \frac{\partial \Psi_2}{\partial x_k}\frac{\partial \Psi_4}{\partial x_l} & 0 \\ \frac{\partial \Psi_3}{\partial x_k}\frac{\partial \Psi_1}{\partial x_l} & \frac{\partial \Psi_3}{\partial x_k}\frac{\partial \Psi_2}{\partial x_l} & \frac{\partial \Psi_3}{\partial x_k}\frac{\partial \Psi_3}{\partial x_l} & \frac{\partial \Psi_3}{\partial x_k}\frac{\partial \Psi_4}{\partial x_l} & 0 \\ \frac{\partial \Psi_4}{\partial x_k}\frac{\partial \Psi_1}{\partial x_l} & \frac{\partial \Psi_4}{\partial x_k}\frac{\partial \Psi_2}{\partial x_l} & \frac{\partial \Psi_4}{\partial x_k}\frac{\partial \Psi_3}{\partial x_l} & \frac{\partial \Psi_4}{\partial x_k}\frac{\partial \Psi_4}{\partial x_l} & 0 \\ 0 & 0 & 0 & 0 & 0 \end{bmatrix} +$$

$$\left\langle \frac{\partial \phi_B}{\partial x_k}, \frac{\partial \phi_B}{\partial x_l} \right\rangle_{\Omega_e} \frac{1}{16} \begin{bmatrix} 1 & 1 & 1 & 1 & -4 \\ 1 & 1 & 1 & 1 & -4 \\ 1 & 1 & 1 & 1 & -4 \\ 1 & 1 & 1 & 1 & -4 \\ -4 & -4 & -4 & -4 & 16 \end{bmatrix}$$

The matrices of the element level viscous term (diffusion term) of an expanded orthogonal basis bubble function element are arranged by substituting equation (76) for equations (101) to (103) and are expressed in the following equations (104) to (106).

[Equations 54]

One-dimension (104)

$$\left\langle \frac{\partial \Phi}{\partial x_k}, \frac{\partial \Phi^T}{\partial x_l} \right\rangle \Omega_e = A_e \begin{bmatrix} \frac{\partial \Psi_1}{\partial x_k}\frac{\partial \Psi_1}{\partial x_l} & \frac{\partial \Psi_1}{\partial x_k}\frac{\partial \Psi_2}{\partial x_l} & 0 \\ \frac{\partial \Psi_2}{\partial x_k}\frac{\partial \Psi_1}{\partial x_l} & \frac{\partial \Psi_2}{\partial x_k}\frac{\partial \Psi_2}{\partial x_l} & 0 \\ 0 & 0 & 0 \end{bmatrix} +$$

$$\frac{2}{3} A_e \left( \sum_{\alpha=1}^{N+1} \frac{\partial \Psi_\alpha}{\partial x_k} \frac{\partial \Psi_\alpha}{\partial x_l} \right) \begin{bmatrix} 1 & 1 & -2 \\ 1 & 1 & -2 \\ -2 & -2 & 4 \end{bmatrix}$$

-continued

Two-dimensions (105)

$$\left\langle \frac{\partial \Phi}{\partial x_k}, \frac{\partial \Phi^T}{\partial x_l} \right\rangle \Omega_e = A_e \begin{bmatrix} \frac{\partial \Psi_1}{\partial x_k}\frac{\partial \Psi_1}{\partial x_l} & \frac{\partial \Psi_1}{\partial x_k}\frac{\partial \Psi_2}{\partial x_l} & \frac{\partial \Psi_1}{\partial x_k}\frac{\partial \Psi_3}{\partial x_l} & 0 \\ \frac{\partial \Psi_2}{\partial x_k}\frac{\partial \Psi_1}{\partial x_l} & \frac{\partial \Psi_2}{\partial x_k}\frac{\partial \Psi_2}{\partial x_l} & \frac{\partial \Psi_2}{\partial x_k}\frac{\partial \Psi_3}{\partial x_l} & 0 \\ \frac{\partial \Psi_3}{\partial x_k}\frac{\partial \Psi_1}{\partial x_l} & \frac{\partial \Psi_3}{\partial x_k}\frac{\partial \Psi_2}{\partial x_l} & \frac{\partial \Psi_3}{\partial x_k}\frac{\partial \Psi_3}{\partial x_l} & 0 \\ 0 & 0 & 0 & 0 \end{bmatrix} +$$

$$\frac{3}{4} A_e \left( \sum_{\alpha=1}^{N+1} \frac{\partial \Psi_\alpha}{\partial x_k} \frac{\partial \Psi_\alpha}{\partial x_l} \right) \begin{bmatrix} 1 & 1 & 1 & -3 \\ 1 & 1 & 1 & -3 \\ 1 & 1 & 1 & -3 \\ -3 & -3 & -3 & 9 \end{bmatrix}$$

Three-dimensions (106)

$$\left\langle \frac{\partial \Phi}{\partial x_k}, \frac{\partial \Phi^T}{\partial x_l} \right\rangle \Omega_e =$$

$$A_e \begin{bmatrix} \frac{\partial \Psi_1}{\partial x_k}\frac{\partial \Psi_1}{\partial x_l} & \frac{\partial \Psi_1}{\partial x_k}\frac{\partial \Psi_2}{\partial x_l} & \frac{\partial \Psi_1}{\partial x_k}\frac{\partial \Psi_3}{\partial x_l} & \frac{\partial \Psi_1}{\partial x_k}\frac{\partial \Psi_4}{\partial x_l} & 0 \\ \frac{\partial \Psi_2}{\partial x_k}\frac{\partial \Psi_1}{\partial x_l} & \frac{\partial \Psi_2}{\partial x_k}\frac{\partial \Psi_2}{\partial x_l} & \frac{\partial \Psi_2}{\partial x_k}\frac{\partial \Psi_3}{\partial x_l} & \frac{\partial \Psi_2}{\partial x_k}\frac{\partial \Psi_4}{\partial x_l} & 0 \\ \frac{\partial \Psi_3}{\partial x_k}\frac{\partial \Psi_1}{\partial x_l} & \frac{\partial \Psi_3}{\partial x_k}\frac{\partial \Psi_2}{\partial x_l} & \frac{\partial \Psi_3}{\partial x_k}\frac{\partial \Psi_3}{\partial x_l} & \frac{\partial \Psi_3}{\partial x_k}\frac{\partial \Psi_4}{\partial x_l} & 0 \\ \frac{\partial \Psi_4}{\partial x_k}\frac{\partial \Psi_1}{\partial x_l} & \frac{\partial \Psi_4}{\partial x_k}\frac{\partial \Psi_2}{\partial x_l} & \frac{\partial \Psi_4}{\partial x_k}\frac{\partial \Psi_3}{\partial x_l} & \frac{\partial \Psi_4}{\partial x_k}\frac{\partial \Psi_4}{\partial x_l} & 0 \\ 0 & 0 & 0 & 0 & 0 \end{bmatrix} +$$

$$\frac{4}{5} A_e \left( \sum_{\alpha=1}^{N+1} \frac{\partial \Psi_\alpha}{\partial x_k} \frac{\partial \Psi_\alpha}{\partial x_l} \right) \begin{bmatrix} 1 & 1 & 1 & 1 & -4 \\ 1 & 1 & 1 & 1 & -4 \\ 1 & 1 & 1 & 1 & -4 \\ 1 & 1 & 1 & 1 & -4 \\ -4 & -4 & -4 & -4 & 16 \end{bmatrix}$$

While the matrices (104) to (106) of the element level viscous term (diffusion term) of an expanded orthogonal basis bubble function element are shown above, in a formulation and a program related to the present invention, the matrices (101) to (103) and equation (76) can be used as they are without substitution of equation (76) for the matrices (101) to (103).

<12. Orthogonal Basis Bubble Function Element and Scaled Bubble Function>

Equation (1) can be modified as the following equations (107) and (108).

[Equations 55]

$$u_h | \Omega_e = \sum_{\alpha=1}^{N+1} \Psi_\alpha u_\alpha + \phi_B u'_B \quad (107)$$

$$= \sum_{\alpha=1}^{N+1} \Psi_\alpha u_\alpha + \phi_S u'_S \quad (108)$$

$$u'_B = u_B - \frac{1}{N+1} \left( \sum_{\alpha=1}^{N+1} u_\alpha \right), \quad u'_S = \frac{\langle 1, \phi_B \rangle_{\Omega_e}}{A_e} u'_B = \frac{N+1}{N+2} u'_B \quad (109)$$

$$\phi_S = \frac{A_e}{\langle 1, \phi_B \rangle_{\Omega_e}} \phi_B = \frac{N+2}{N+1} \phi_B \quad (110)$$

Equation (108) is a modified equation using a bubble function that produces $A_e$ (line, area, and volume of each element for one, two, and three dimensions, respectively) as the integration value of the bubble function itself, and equation (110) is referred to as a scaled bubble function. In an orthogonal basis bubble function element, formulation, programming, and computation can be done using the expressions of equations (107) and (108) in addition to the use of expression of equation (1). In a finite element equation (variational equation) obtained by using the expressions of equations (1), (107), and (108), the degree-of-freedom $u_B$, $u_B'$, $u_s'$ of the center of gravity point for each element can be eliminated by an operation called static condensation, and formulation, programming, and computation can be executed using the finite element equation (variational equation) that has eliminated the degree-of-freedom of the center of gravity point. The integration value that uses a scaled bubble function as the bubble function of orthogonal basis bubble function element is expressed by the following equations (111) and (112).

[Equations 56]

$$\langle 1, \phi_S \rangle_{\Omega_e} = \frac{N+2}{N+1} \langle 1, \phi_B \rangle_{\Omega_e} A_e \quad (111)$$

$$\|\phi_S\|^2_{\Omega_2} = \frac{(N+2)^2}{(N+1)^2} \|\phi_B\|^2_{\Omega_2} = \frac{N+2}{N+1} A_e \quad (112)$$

The following equation (113) is obtained for an expanded orthogonal basis bubble function element.

[Equations 57]

$$\left\langle \frac{\partial \phi_S}{\partial x_k}, \frac{\partial \phi_S}{\partial x_l} \right\rangle_{\Omega_e} = \quad (113)$$

$$\frac{(N+2)^2}{(N+1)^2} \left\langle \frac{\partial \phi_B}{\partial x_k}, \frac{\partial \phi_B}{\partial x_l} \right\rangle_{\Omega_e} = (N+1)(N+2) A_e \left( \sum_{\alpha=1}^{N+1} \frac{\partial \Psi_\alpha}{\partial x_k} \frac{\partial \Psi_\alpha}{\partial x_l} \right)$$

<13. Orthogonal Basis Bubble Function Element and Stabilized Operator Control Term>

In order to moderate the numerical instability included in a bubble function element, a method that improves analyzing accuracy using the viscous term (stabilized operator control term) of a bubble function is expressed as the following equation (114).

[Equations 58]

$$v' \left\langle \frac{\partial \phi_B}{\partial x_k}, \frac{\partial \phi_B}{\partial x_l} \right\rangle \Omega_e u'_B \quad (114)$$

The stabilized operator control parameter v' ($-\infty < v' < \infty$) of equation (114) is a parameter possessing the dimension of viscosity (dimensionless in the case a variable equivalent to viscosity is non-dimensionalized), and a solution with high accuracy is realized by determining the appropriate value of the stabilized operator control parameter v'. In this method, while the ordinary Galerkin method has previously been used for a bubble function element by adding the viscous term (stabilized operator control term) solely of the center of gravity point to an obtained finite element equation (refer to J. Matsumoto and T. Umetsu, "A Consideration on Finite Element Method Analysis of Incompressible Fluid Using Bubble Function", Annual Conference of the Japan Society for Industrial and Applied Mathematics, 1996, pp. 46-47; J. Matsumoto, T. Umetsu and M. Kawahara, "Incompressible Viscous Flow Analysis and Adaptive Finite Element Method Using Linear Bubble Function", Journal of Applied Mechanics (Japan Society of Civil Engineers), Vol. 2, August 1999, pp. 223-232), presently, the viscous term (stabilized operator control term) solely of the center of gravity point is introduced by adopting another bubble function (three-level bubble function) in relation to a weighted function (refer to J. Matsumoto and M. Kawahara, "Shape Identification for Fluid-Structure Interaction Problem Using Improved Bubble Element", International Journal of Computational Fluid Dynamics, Vol. 15, 2001, pp. 33-45, non-patent document 3). The three-level bubble function is the bubble function that satisfies the following equations (115) to (117).

[Equations 59]

$$(\psi_\alpha, \phi_B)\Omega_e = 0, \alpha = 1 \ldots N+1 \quad (115)$$

Where, $\phi_B$ is a 3 level bubble function $$\langle \phi_B, \varphi_B \rangle_{\Omega_e} = 0 \quad (116)$$

$$\nu \left\langle \frac{\partial \phi_B}{\partial x_k}, \frac{\partial \varphi_B}{\partial x_l} \right\rangle \Omega_e = \nu' \left\langle \frac{\partial \phi_B}{\partial x_k}, \frac{\partial \phi_B}{\partial x_l} \right\rangle \Omega_e \quad (117)$$

The following equation (118) is obtained from equations (67) and (115).

[Equations 60]

$$\langle 1, \varphi_B \rangle_{\Omega_e} = \left\langle \sum_{\alpha=1}^{N+1} \Psi_\alpha, \varphi_B \right\rangle_{\Omega_e} = \sum_{\alpha=1}^{N+1} \langle \Psi_\alpha, \varphi_B \rangle_{\Omega_e} = 0 \quad (118)$$

In the case of a three-level bubble function that has the relationship of the following equation (119), equation (120) can be substituted for equation (115) of the conditional equations (115) to (117).

[Equations 61]

$$\langle \Psi_\alpha, \varphi_B \rangle_{\Omega_e} = \frac{1}{N+1} \langle 1, \varphi_B \rangle_{\Omega_e}, \alpha = 1 \ldots N+1 \quad (119)$$

$$\langle 1, \varphi_B \rangle_{\Omega_e} = 0 \quad (120)$$

Assuming a three-level bubble function that has the relationship of equation (119), the following equation (121) is used as a specific three-level function that satisfies the conditional equations (120), (116), and (117).

[Equations 62]

$$\varphi_B = \frac{\nu'}{\nu} \frac{\delta_1 \varphi_{B1} + \delta_2 \varphi_{B2} + \delta_3 \varphi_{B3} + \varphi_{B4}}{\delta_1 + \delta_2 + \delta_3 + 1} \quad (121)$$

The $\nu$ in the equation is a viscosity coefficient (diffusion coefficient). The following equation (122) is obtained by substituting equation (121) for and by arranging equations (120), (116), and (117).

[Equations 63]

$$\begin{bmatrix} \delta_1 \\ \delta_2 \\ \delta_3 \end{bmatrix} = \begin{bmatrix} a_{11} & a_{12} & a_{13} \\ a_{21} & a_{22} & a_{23} \\ a_{31} & a_{32} & a_{33} \end{bmatrix}^{-1} \begin{bmatrix} b_1 \\ b_2 \\ b_3 \end{bmatrix} \quad (122)$$

$a_{11} = \langle 1, \varphi_{B1} \rangle_{\Omega_e}, a_{12} = \langle 1, \varphi_{B2} \rangle_{\Omega_e}, a_{13} = \langle 1, \varphi_{B3} \rangle_{\Omega_e},$ $a_{21} = \langle \phi_B, \varphi_{B1} \rangle_{\Omega_e}, a_{22} = \langle \phi_B, \varphi_{B2} \rangle_{\Omega_e}, a_{23} = \langle \phi_B, \varphi_{B3} \rangle_{\Omega_e},$ $a_{31} = \left\langle \frac{\partial \phi_B}{\partial x_k}, \frac{\partial \varphi_{B1}}{\partial x_l} \right\rangle \Omega_e - \left\langle \frac{\partial \phi_B}{\partial x_k}, \frac{\partial \phi_B}{\partial x_l} \right\rangle \Omega_e,$ $a_{32} = \left\langle \frac{\partial \phi_B}{\partial x_k}, \frac{\partial \varphi_{B2}}{\partial x_l} \right\rangle \Omega_e - \left\langle \frac{\partial \phi_B}{\partial x_k}, \frac{\partial \phi_B}{\partial x_l} \right\rangle \Omega_e,$ $a_{33} = \left\langle \frac{\partial \phi_B}{\partial x_k}, \frac{\partial \varphi_{B3}}{\partial x_l} \right\rangle \Omega_e - \left\langle \frac{\partial \phi_B}{\partial x_k}, \frac{\partial \phi_B}{\partial x_l} \right\rangle \Omega_e,$ $b_1 = -\langle 1, \varphi_{B4} \rangle_{\Omega_e}, b_2 = \langle \phi_B, \varphi_{B4} \rangle_{\Omega_e},$ $b_3 = \left( -\left\langle \frac{\partial \phi_B}{\partial x_k}, \frac{\partial \varphi_{B4}}{\partial x_l} \right\rangle \Omega_e - \left\langle \frac{\partial \phi_B}{\partial x_k}, \frac{\partial \phi_B}{\partial x_l} \right\rangle \Omega_e \right)$ Or, $a_{11} = \langle 1, \varphi_{B1} \rangle_{\Omega_e} A_e^{-1}, a_{12} = \langle 1, \varphi_{B2} \rangle_{\Omega_e} A_e^{-1}, a_{13} = \langle 1, \varphi_{B3} \rangle_{\Omega_e} A_e^{-1},$ $a_{21} = \langle \phi_B, \varphi_{B1} \rangle_{\Omega_e} A_e^{-1}, a_{22} \langle \phi_B, \varphi_{B2} \rangle_{\Omega_e} A_e^{-1},$ $a_{23} = \langle \phi_B, \varphi_{B3} \rangle_{\Omega_e} A_e^{-1},$ $a_{31} =$ $\left( \left\langle \frac{\partial \phi_B}{\partial x_k}, \frac{\partial \varphi_{B1}}{\partial x_l} \right\rangle \Omega_e - \left\langle \frac{\partial \phi_B}{\partial x_k}, \frac{\partial \phi_B}{\partial x_l} \right\rangle \Omega_e \right) \left\{ A_e \left( \sum_{\alpha=1}^{N+1} \frac{\partial \Psi_\alpha}{\partial x_k} \frac{\partial \Psi_\alpha}{\partial x_l} \right) \right\}^{-1},$ $a_{32} = \left( \left\langle \frac{\partial \phi_B}{\partial x_k}, \frac{\partial \varphi_{B2}}{\partial x_l} \right\rangle \Omega_e - \left\langle \frac{\partial \phi_B}{\partial x_k}, \frac{\partial \phi_B}{\partial x_l} \right\rangle \Omega_e \right)$ $\left\{ A_e \left( \sum_{\alpha=1}^{N+1} \frac{\partial \Psi_\alpha}{\partial x_k} \frac{\partial \Psi_\alpha}{\partial x_l} \right) \right\}^{-1},$ $a_{33} = \left( \left\langle \frac{\partial \phi_B}{\partial x_k}, \frac{\partial \varphi_{B3}}{\partial x_l} \right\rangle \Omega_e - \left\langle \frac{\partial \phi_B}{\partial x_k}, \frac{\partial \phi_B}{\partial x_l} \right\rangle \Omega_e \right)$ $\left\{ A_e \left( \sum_{\alpha=1}^{N+1} \frac{\partial \Psi_\alpha}{\partial x_k} \frac{\partial \Psi_\alpha}{\partial x_l} \right) \right\}^{-1},$ $b_1 = -\langle 1, \varphi_{B4} \rangle \Omega_e A_e^{-1}, b_2 = -\langle \phi_B, \varphi_{B4} \rangle \Omega_e A_e^{-1},$ $b_3 = -\left( \left\langle \frac{\partial \phi_B}{\partial x_k}, \frac{\partial \varphi_{B4}}{\partial x_l} \right\rangle \Omega_e - \left\langle \frac{\partial \phi_B}{\partial x_k}, \frac{\partial \phi_B}{\partial x_l} \right\rangle \Omega_e \right)$ $\left\{ A_e \left( \sum_{\alpha=1}^{N+1} \frac{\partial \Psi_\alpha}{\partial x_k} \frac{\partial \Psi_\alpha}{\partial x_l} \right) \right\}^{-1},$ The four bubble functions on the right side of equation (121) are specifically defined as the following equation (123).

[Equations 64]

$$\phi B1 = \phi_B^{\eta_1}, \phi B2 = \phi_B^{\eta_2}, \phi B3 = \phi_B^{\eta_3}, \phi B4 = \phi_B^{\eta_4} \quad (123)$$

Equations (123) and (59) prove that equation (121) satisfies equation (119). The variables of equation (123) are defined as the following equation (124).

[Equations 65]

$$\eta_1 = 4, \eta_2 = 3, \eta_3 = 2, \eta_4 = 1 \quad (124)$$

When defining $\alpha_1(\xi_1, \xi_2, \xi_3) = \alpha_{1+}(\xi_1, \xi_2, \xi_3)$ the following equations (125) to (127) are obtained from equation (122) using the variables of equation (31).

[Equations 66]
One-Dimension $\delta_1 = 7.4533261 \ldots, \delta_2 = 13.9037038 \ldots,$
$\delta_3 = -7.4557822 \ldots \quad (125)$ Two-Dimensions $$\delta_1 = -12.8855927\ldots, \delta_2 = 21.8201295\ldots,$$
$$\delta_3 = -9.9378406\ldots \quad (126)$$

Three-Dimensions $$\delta_1 = 73.7388138\ldots, \delta_2 = -102.3508563\ldots,$$
$$\delta_3 = 27.6071956\ldots \quad (127)$$

When defining $\alpha_1(\xi_1, \xi_2, \xi_3) = \alpha_{1+}(\xi_1, \xi_2, \xi_3)$, the following equations (128) to (130) are obtained from equation (122) using the variables of equation (36).

[Equations 67]
One-Dimension $$\delta_1 = -5.2897450\ldots, \delta_2 = 10.5097066\ldots,$$
$$\delta_3 = -6.2084329\ldots \quad (128)$$

Two-Dimensions $$\delta_1 = -9.2351821\ldots, \delta_2 = 16.2678560\ldots,$$
$$\delta_3 = -8.0666407\ldots \quad (129)$$

Three-Dimensions $$\delta_1 = -24.4550047\ldots, \delta_2 = 37.6758731\ldots,$$
$$\delta_3 = -14.3507923\ldots \quad (130)$$

When defining $\alpha_1(\xi_1, \xi_2, \xi_3) = \alpha_{1+}(\xi_1, \xi_2, \xi_3)$, the following equations (131) to (133) are obtained from equation (122) using equations (92) to (94) and the variables of equation (81).

[Equations 68]
One-Dimension $$\delta_1 = -6.8577197\ldots, \beta_2 = 12.6283403\ldots,$$
$$\delta_3 = -6.8566234\ldots \quad (131)$$

Two-Dimensions $$\delta_1 = -7.0364016\ldots, \delta_2 = 13.3033720\ldots,$$
$$\delta_3 = -7.1674625\ldots \quad (132)$$

Three-Dimensions $$\delta_1 = -12.0454679\ldots, \delta_2 = 20.3290654\ldots,$$
$$\delta_3 = -9.2229704\ldots \quad (133)$$

Figure 45:
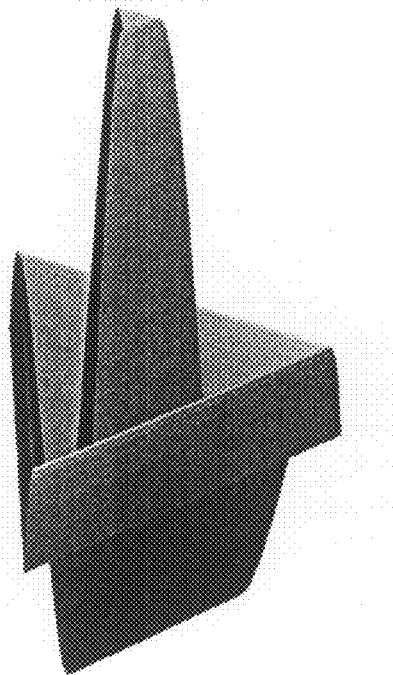
FIG. 45 is a schematic showing the shape of a triangular three-level bubble function using equation (132)
Figure 46:
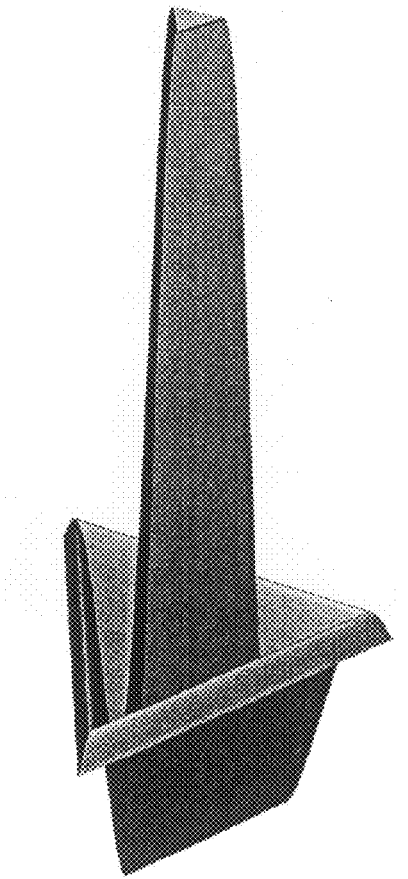
FIG. 46 is a schematic showing the shape of the product of a triangular bubble function using equations (81) and (93) and a triangular three-level bubble function using equation (132)
Figure 47:
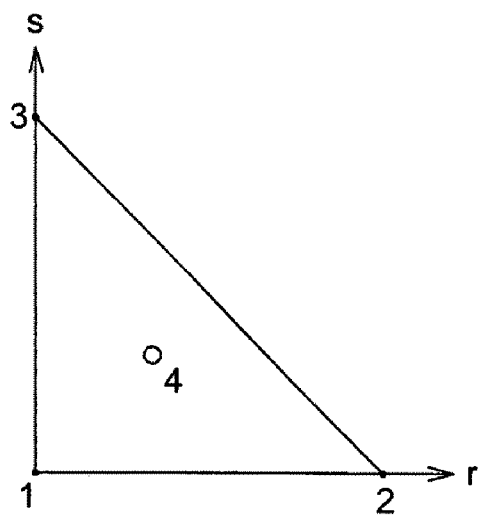
FIG. 47 is a schematic showing a conventional two-dimensional bubble function element.
Figure 48:
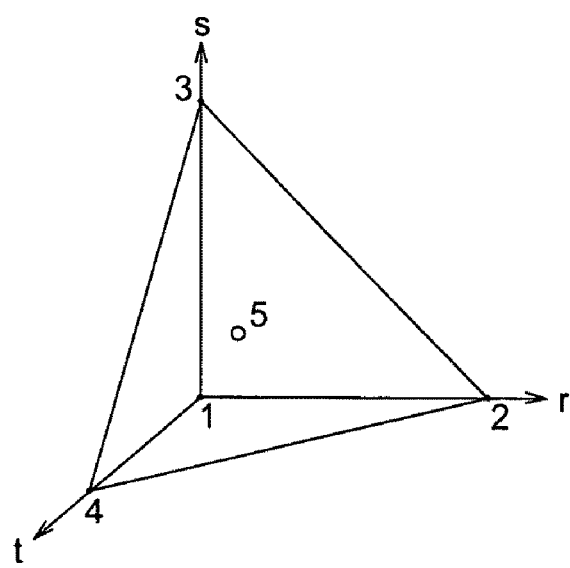
FIG. 48 is a schematic showing a conventional three-dimensional bubble function element.
Figure 49:
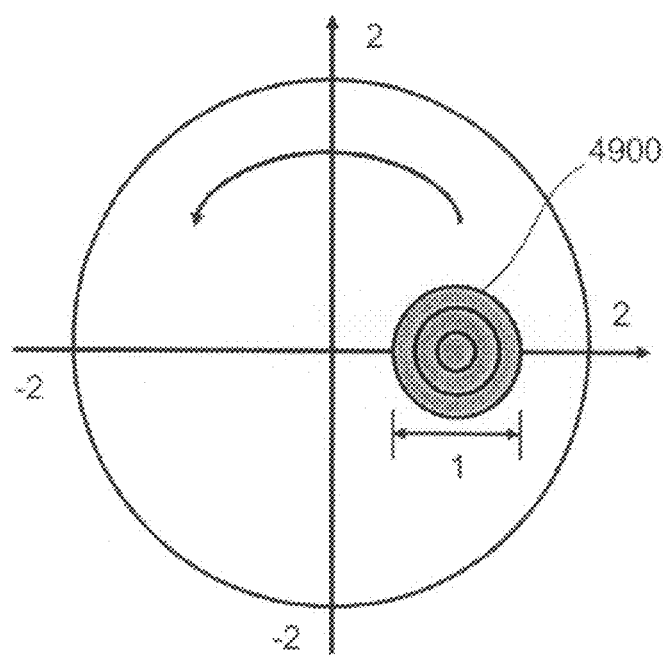
FIG. 49 is a schematic showing an analytical model used in the analysis of the conventional Rotating Cone problem.
Figure 50:
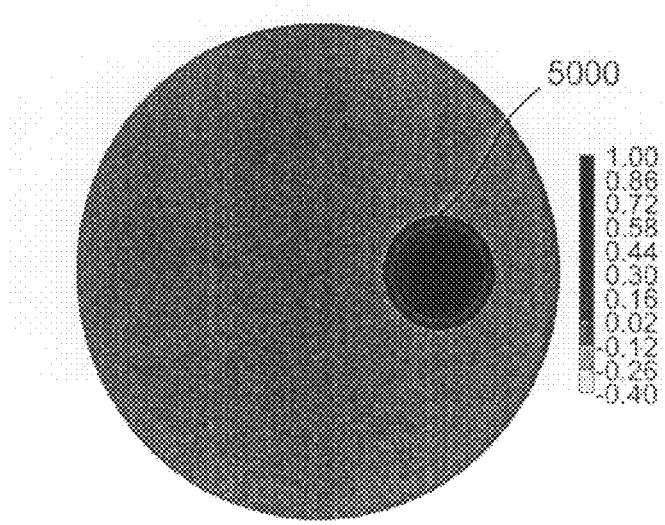
FIG. 50 a schematic showing contours of the initial condition used in the analysis of the conventional Rotating Cone problem.
Figure 51:
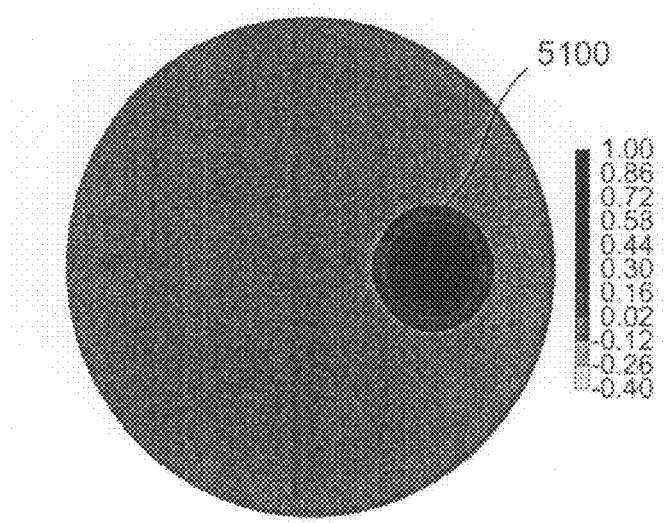
FIG. 51 is a schematic showing the contours of the analytical result of the Rotating Cone problem computed by using a conventional consistent mass matrix.
Figure 52:
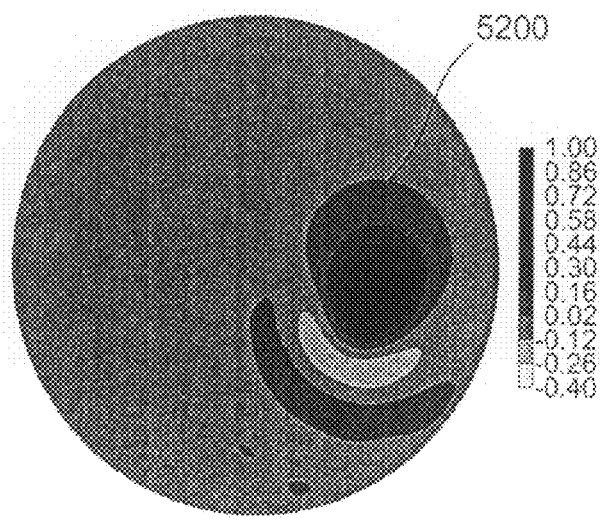
FIG. 52 is a schematic showing the contours of the analytical result of the Rotating Cone problem computed by using a conventional lumped mass matrix.

The shape (v'=v) of a triangular three-level bubble function that uses equation (132), and the shape (v'=v) of the product of a triangular bubble function that uses equations (93) and (81) and a triangular three-level bubble function that uses equation (132) are illustrated in FIGS. 45 and 46, respectively. From the results above, the three-level bubble functions that satisfy equations (120) (or (115)), (116), and (117) also exist when an orthogonal basis bubble function element is adopted, and thus the stabilized operator control term (114) can be introduced.

In order to prove the existence of a three-level bubble function, while a three-level bubble function (121) that has three unknown quantities $\delta_1$, $\delta_2$, $\delta_3$ and four appropriate bubble functions that satisfy the three conditions of equations (120), (116), and (117) is adopted, by defining unknown quantities as $\delta_1$, $\delta_2$, and by adopting three appropriate bubble functions for the right side of equation (134), a three-level bubble function that satisfies the condition of equations (120) and (116) can be obtained as the following equation (134) by introducing a parameter that has the same dimension as a stabilized operator control parameter v'. By defining a stabilized operator control parameter v' as the following equation (135), equation (117) can also be induced, and thus it is possible to prove the existence of a three-level bubble function that satisfies equations (120) (or (115)), (116), and (117). The bubble function that satisfies the conditional equation of a three-level bubble function is not only one, but many, and therefore, the conditions of equations (120) (or (115)), (116), and (117) that are required to induce a stabilized operator control term are significant for three-level bubble function while specific bubble functions and their shapes have little significance.

[Equations 69]

$$\varphi_B = \frac{v_\varphi}{v} \frac{\varphi \delta_1 \varphi_{B1} + \delta_2 \varphi_{B2} + \varphi_{B3}}{\delta_1 + \delta_2 + 1} \quad (134)$$

Where,
$v_\varphi(-\infty < v_\varphi < \infty)$ is a parameter having the same dimension as $v'$ $$v' = \frac{\frac{v_\varphi}{\delta_1 + \delta_2 + 1}\left\langle \frac{\partial \phi_B}{\partial x_k}, \frac{\partial(\delta_1\varphi_{B1} + \delta_2\varphi_{B2} + \varphi_{B3})}{\partial x_l}\right\rangle_{\Omega_e}}{\left\langle \frac{\partial \phi_B}{\partial x_k}, \frac{\partial \phi_B}{\partial x_l}\right\rangle_{\Omega_e}} \quad (135)$$

<14. Orthogonal Basis Bubble Function Element and Stabilized Operator Control Term for Scaled Bubble Function>

In the case that a scaled bubble function is adopted, stabilized operator control term can also be introduced, and is expressed by the following equation (136).

[Equations 70]

$$v'\left\langle \frac{\partial \phi_S}{\partial x_k}, \frac{\partial \phi_S}{\partial x_l}\right\rangle_{\Omega_e} u'_S \quad (136)$$

In the case that a scaled bubble function is adopted as a bubble function used in an orthogonal basis bubble function element, a three-level bubble function can be defined as the following equation (137), and the integration value thereof can be expressed as the following equations (138) to (142).

[Equations 71]

$$\varphi_S = \frac{A_e}{\langle 1, \phi_B \rangle_{\Omega_e}} \varphi_B \quad (137)$$

$$\langle \Psi_\alpha, \varphi_S \rangle_{\Omega_e} = \frac{A_e^2}{\langle 1, \phi_B \rangle_{\Omega_e}^2}\langle \Psi_\alpha, \varphi_B \rangle_{\Omega_e} = 0, \alpha = 1 \ldots N+1 \quad (138)$$

$$\langle \phi_S, \varphi_S \rangle_{\Omega_e} = \frac{A_e^2}{\langle 1, \phi_B \rangle_{\Omega_e}^2}\langle \phi_B, \varphi_B \rangle_{\Omega_e} = 0 \quad (139)$$

$$v\left\langle \frac{\partial \phi_S}{\partial x_k}, \frac{\partial \varphi_S}{\partial x_l}\right\rangle_{\Omega_e} = \frac{A_e^2}{\langle 1, \phi_B \rangle_{\Omega_e}^2}v\left\langle \frac{\partial \phi_B}{\partial x_k}, \frac{\partial \phi_B}{\partial x_l}\right\rangle_{\Omega_e} = \quad (140)$$

$$v'\left\langle \frac{\partial \phi_S}{\partial x_k}, \frac{\partial \varphi_S}{\partial x_l}\right\rangle_{\Omega_e} = \frac{A_e^2}{\langle 1, \phi_B \rangle_{\Omega_e}^2}v'\left\langle \frac{\partial \phi_B}{\partial x_k}, \frac{\partial \phi_B}{\partial x_l}\right\rangle_{\Omega_e}$$

$$\langle \Psi_\alpha, \varphi_S \rangle_{\Omega_e} = \frac{A_e}{\langle 1, \phi_B \rangle_{\Omega_e}}\langle \Psi_\alpha, \varphi_B \rangle_{\Omega_e} = \quad (141)$$

$$\frac{1}{N+1}\langle 1, \varphi_S \rangle_{\Omega_e} = \frac{A_e}{\langle 1, \phi_B \rangle_{\Omega_e}}\frac{1}{N+1}\langle 1, \varphi_B \rangle_{\Omega_e}, \alpha = 1 \ldots N+1$$

$$\langle 1, \varphi_S \rangle_{\Omega_e} = \frac{A_e}{\langle 1, \phi_B \rangle_{\Omega_e}}\langle 1, \varphi_B \rangle_{\Omega_e} = 0 \quad (142)$$

In the case that the existence of a three-level bubble function that satisfies equations (115) to (117), (119), and (120) is proved by equations (138) to (142), equations (138) to (142) are also satisfied automatically, and the simultaneous existence of a three-level bubble function is also proved.

<15. Orthogonal Basis Bubble Function Element and a Stabilizing Effect Matrix for a Bubble Function>

The degree-of-freedom of the center of gravity point $u_B{}'$ of a bubble function element that is expressed by equation (107) can be eliminated per element by an operation called static condensation. A finite element equation obtained as the result of the operation has a close relationship with a finite element equation induced by a stabilized finite element method (refer to non-patent document 2). A stabilizing effect matrix for a bubble function obtained by static condensation is generally expressed in the form of the following equation (143).

[Equations 72]

$$\tilde{\tau}_{eB} = \tilde{K}(v')_B^{-1} \frac{\langle 1, \phi_B \rangle^2}{A_e} \tag{143}$$

$$\tilde{K}(v')_B = \tilde{K}(v')_{Bmn} = \begin{bmatrix} \tilde{K}(v')_{B11} & \cdots & \tilde{K}(v')_{B1L} \\ \vdots & \ddots & \vdots \\ \tilde{K}(v')_{BL1} & \cdots & \tilde{K}(v')_{BLL} \end{bmatrix}, m, n = 1 \ldots L \tag{144}$$

The L is the number of unknown analytical physical quantities to be analyzed. Equation (144) is a matrix consists of the integration values of the bubble function expressed by equations (70), (65), and (66) on condition that a bubble function that satisfies equation (69) is adopted. A stabilized operator control parameter v' is determined so that the relationship of the following equation (145) is satisfied.

[Equations 73]

$$\tilde{\tau}_{eB} u'_B \approx \tilde{\tau}_{eR} u'_B \tag{145}$$

$$\tilde{\tau}_{eR} = \tilde{\tau}_{eRmn} = \begin{bmatrix} \tilde{\tau}_{eR11} & \cdots & \tilde{\tau}_{eR1L} \\ \vdots & \ddots & \vdots \\ \tilde{\tau}_{eRL1} & \cdots & \tilde{\tau}_{eRLL} \end{bmatrix} \tag{146}$$

$$u'^T_B = [u'_{B1} \cdots u'_{BL}] \tag{147}$$

Equation (146) is a stabilizing matrix that has the potential to improve analytical accuracy. In order to obtain a stabilized operator control parameter v' that satisfies the relationship of equation (145), a problem for determining a stabilized operator control parameter v' that minimizes the performance index of the following equation (148) is considered.

[Equations 74]

$$J = \frac{1}{2} \upsilon(v')_B^T \upsilon(v')_B \tag{148}$$

$$\upsilon(v')_B = \left[ \tilde{K}(v')_B \tilde{\tau}_{eR} u'_B - \frac{\langle 1, \phi_B \rangle^2}{A_e} u'_B \right] \tag{149}$$

To determine a stabilized operator control parameter v' that minimizes equation (148), a stabilized operator control parameter v' is obtained by the relationship expressed by the following equation (150), which is the stationary condition of equation (148).

[Equations 75]

$$\frac{\partial J}{\partial v'} = \left[\frac{\partial \upsilon(v')_B}{\partial v'}\right]^T \upsilon(v')_B = 0 \tag{150}$$

As a three-level bubble function is introduced in a weighted function, different three-level bubble functions can be used for each partial differential equation of unknown analytical physical quantities to be analyzed. Therefore, concerning the stabilized operator control parameter v', it is possible to define as many stabilized operator control parameters $v_m{}'$ as the number L of unknown analytical physical quantities to be obtained using the three-level bubble function of the following equation (151).

[Equations 76]

$$\varphi_B = \frac{v'_m}{v} \frac{\delta_1 \varphi_{B1} + \delta_2 \varphi_{B2} + \delta_3 \varphi_{B3} + \varphi_{B4}}{\delta_1 + \delta_2 + \delta_3 + 1}, m = 1 \ldots L \tag{151}$$

The coefficient $\delta_1$, $\delta_2$, $\delta_3$ of equation (151) can be determined by equation (122), and equation (151) satisfies equations (120) and (116). The stabilized operator control term of the following equation (152) is obtained in place of equation (117).

[Equations 77]

$$v \left\langle \frac{\partial \phi_B}{\partial x_k}, \frac{\partial \phi_B}{\partial x_l} \right\rangle \Omega_e = v'_m \left\langle \frac{\partial \phi_B}{\partial x_k}, \frac{\partial \phi_B}{\partial x_l} \right\rangle \Omega_e \tag{152}$$

In the case that the stabilized operator control term of the following equation (152) is adopted, equation (144) is modified as the following equation (153).

[Equations 78]

$$\tilde{K}(v'_m)_B = \tilde{K}(v'_m)_{Bmn} = \begin{bmatrix} \tilde{K}(v'_1)_{B11} & \cdots & \tilde{K}(v'_1)_{B1L} \\ \vdots & \ddots & \vdots \\ \tilde{K}(v'_L)_{BL1} & \cdots & \tilde{K}(v'_L)_{BLL} \end{bmatrix} \tag{153}$$

In order to obtain a stabilized operator control parameter $v_m{}'$ that satisfies the relationship of equation (145), a problem for determining a stabilized operator control parameter $v_m{}'$ that minimizes the performance index of the following equation (154) is considered.

[Equations 79]

$$J = \frac{1}{2} \upsilon(v'_m)_B^T \upsilon(v'_m)_B, m = 1 \ldots L \tag{154}$$

$$\upsilon(v'_m)_B = \left[ \tilde{K}(v'_m)_B \tilde{\tau}_{eR} u'_B - \frac{\langle 1, \phi_B \rangle^2}{A_e} u'_B \right] \tag{155}$$

To determine a stabilized operator control parameter $v_m{}'$ that minimizes equation (154), a stabilized operator control parameter $v_m'$ is obtained by the relationship expressed by the following equation (156), which is the stationary condition of equation (154).

[Equations 80]

$$\frac{\partial J}{\partial v_m'} = \left[\frac{\partial v(v_m')_B}{\partial v_m'}\right]^T v(v_m')_B = 0 \tag{156}$$

Equation (155) is a vector, and the components of the vector are expressed as the following equation (157).

[Equations 81]

$$v(v_m')_B^T = [\, v(v_1')_{B1} \;\; \ldots \;\; v(v_L')_{BL} \,] \tag{157}$$

Since stabilized operator control parameters $v_m'$ are independently defined by individual sets of vector components as indicated by equation (157), a minimizing problem using the performance index of the following equation (158) can be considered for each of the components m of equation (157) as a problem for determining stabilized operator control parameters $v_m'$ that satisfy the relationship of equation (145).

[Equations 82]

$$J = \frac{1}{2}\{v(v_m')_{Bm}\}^2, m = 1 \ldots L \tag{158}$$

To determine a stabilized operator control parameter $v_m'$ that minimizes equation (158), a stabilized operator control parameter $v_m'$ is obtained by the relation expressed by the following equation (159), which is the stationary condition of equation (158).

[Equations 83]

$$\frac{\partial J}{\partial v_m'} = \left[\frac{\partial v(v_m')_{Bm}}{\partial v_{Bm}'}\right] v(v_m')_m = 0 \tag{159}$$

As stabilized operator control parameters $v_m'$ for equation (157) are independently defined by individual sets of vector components, equations (156) and (159) for obtaining stabilized operator control parameters $v_m'$ induced from the stationary condition of equations (154) and (158), consequently become the same equations.

For an alternative method, a problem for determining a stabilized operator control parameters $v'$ so as to satisfy the relationship of the following equation (160) can also be considered.

[Equations 84]

$$\tilde{\tau}_{eB}^{-1} u_B' \approx \tilde{\tau}_{eR}^{-1} u_B' \tag{160}$$

In order to obtain a stabilized operator control parameter $v'$ that satisfies the relationship of equation (160), a problem for determining a stabilized operator control parameter $v'$ that minimizes the performance index of the following equation (161) is considered.

[Equations 85]

$$J = \frac{1}{2}w(v')_B^T w(v')_B \tag{161}$$

$$w(v')_B = \left[\tilde{K}(v')_B u_B' - \frac{\langle 1, \phi_B \rangle^2}{A_e} \tilde{\tau}_{eR}^{-1} u_B'\right] \tag{162}$$

To determine a stabilized operator control parameter $v'$ that minimizes equation (161), a stabilized operator control parameter $v'$ is obtained by the relation expressed by the following equation (163), which is the stationary condition of equation (161).

[Equations 86]

$$\frac{\partial J}{\partial v'} = \left[\frac{\partial w(v')B}{\partial v'}\right]^T w(v')_B = 0 \tag{163}$$

Concerning the stabilized operator control parameter $v'$, the stabilized operator control term of equation (152) is induced using the three-level bubble function of the following equation (151), and it is possible to define as many stabilized operator control parameters $v_m'$ as the number L of unknown analytical physical quantities to be obtained. In order to obtain a stabilized operator control parameter $v_m'$ that satisfies the relationship of equation (160), a problem for determining a stabilized operator control parameter $v_m'$ that minimizes the performance index of the following equation (164) is considered.

[Equations 87]

$$J = \frac{1}{2}w(v_m')_B^T w(v_m')_B, m = 1 \ldots L \tag{164}$$

$$w(v_m')_B = \left[\tilde{K}(v_m')_B u_B' - \frac{\langle 1, \phi_B \rangle^2}{A_e} \tilde{\tau}_{eR}^{-1} u_B'\right] \tag{165}$$

To determine a stabilized operator control parameter $v_m'$ that minimizes equation (164), a stabilized operator control parameter $v_m'$ is obtained by the relation expressed by the following equation (166), which is the stationary condition of equation (164).

[Equations 88]

$$\frac{\partial J}{\partial v_m'} = \left[\frac{\partial w(v_m')_B}{\partial v_m'}\right]^T w(v_m')_B = 0 \tag{166}$$

Equation (165) is a vector, and the components of the vector are expressed as the following equation (167).

[Equations 89]

$$w(v_m')_B^T = [w(v_1')_{B1} \ldots w(v_L')_{BL}] \tag{167}$$

Since stabilized operator control parameters $v_m'$ are independently defined by individual sets of vector components as indicated by equation (167), a minimizing problem using the performance index of the following equation (168) can be considered for each of the components m of equation (167) as a problem for determining stabilized operator control parameters $v_m'$ that satisfy the relationship of equation (160).

[Equations 90]

$$J = \frac{1}{2}\{w(v_m')_{Bm}\}^2, m = 1 \ldots L \tag{168}$$

To determine a stabilized operator control parameter $v_m'$ that minimizes equation (168), a stabilized operator control parameter $v_m'$ is obtained by the relation expressed by the following equation (169), which is the stationary condition of equation (168).

[Equations 91]

$$\frac{\partial J}{\partial v_m'} = \left[\frac{\partial w(v_m')_{Bm}}{\partial v_m'}\right] w(v_m')_{Bm} = 0 \tag{169}$$

As stabilized operator control parameters $v_m'$ for equation (167) are independently defined by individual sets of vector components, equations (166) and (169) for obtaining stabilized operator control parameters $v_m'$ induced from the stationary condition of equations (164) and (168), consequently become the same equations.

<16. Orthogonal Basis Bubble Function Element and a Stabilizing Effect Matrix for a Scaled Bubble Function>

The degree-of-freedom of the center of gravity point $u_s'$ of bubble function element that is expressed by equation (108) can be eliminated per element by an operation called static condensation. A stabilizing effect matrix for a scaled bubble function obtained by static condensation is generally expressed in the form of the following equation (170).

[Equations 92]

$$\tilde{\tau}_{eS} = \tilde{K}(v')_S^{-1}\frac{\langle 1, \phi_S\rangle^2_{\Omega_e}}{A_e} = \tilde{K}(v')_B^{-1}\frac{\langle 1, \phi_B\rangle^2_{\Omega_e}}{A_e} = \tilde{\tau}_{eB} \tag{170}$$

$$\tilde{K}(v')_S = \tilde{K}(v')_B \frac{A_e^2}{\langle 1, \phi_B\rangle^2_{\Omega_e}} \tag{171}$$

The second term of equation (170) is a matrix consists of the integration values of the scaled bubble function expressed by the first term of each of equations (111) to (113) on the condition that a bubble function that satisfies equation (141) is adopted, and it is expressed as the third term in the case that equations (70), (65), and (66) are adopted. A stabilized operator control parameter $v'$ is determined so that the relationship of the following equation (172) is satisfied.

[Equations 93]

$$\tilde{\tau}_{eS} u_S' \approx \tilde{\tau}_{eR} u_S' \tag{172}$$

$$u_S' = \frac{\langle 1, \phi_B\rangle_{\Omega_e}}{A_e} u_B' \tag{173}$$

In order to obtain a stabilized operator control parameter $v'$ that satisfies the relationship of equation (172), a problem for determining a stabilized operator control parameter $v'$ that minimizes the performance index of the following equation (174) is considered.

[Equations 94]

$$J = \frac{1}{2}v(v')_S^T v(v')_S \tag{174}$$

$$v(v')_S = \left[\tilde{K}(v')_S \tilde{\tau}_{eR} u_S' - \frac{\langle 1, \phi_S\rangle^2}{A_e} u_S'\right] \tag{175}$$

To determine a stabilized operator control parameter $v'$ that minimizes equation (174), a stabilized operator control parameter $v'$ is obtained by the relation expressed by the following equation (176), which is the stationary condition of equation (174).

[Equations 95]

$$\frac{\partial J}{\partial v'} = \left[\frac{\partial v(v')_S}{\partial v'}\right]^T v(v')_S = 0 \tag{176}$$

As a three-level scaled bubble function is introduced in a weighted function, different three-level scaled bubble functions can be used for each partial differential equation of unknown analytical physical quantities to be analyzed. Therefore, concerning the stabilized operator control parameter $v'$, it is possible to define as many stabilized operator control parameters $v_m'$ as the number L of unknown analytical physical quantities to be obtained using the three-level scaled bubble function of the following equation (177).

[Equations 96]

$$\varphi_S = \frac{A_e}{\langle 1, \phi_B\rangle_{\Omega_e}} \varphi_B, \tag{177}$$

$$\varphi_B = \frac{v_m'}{v} \frac{\delta_1 \varphi_{B1} + \delta_2 \varphi_{B2} + \delta_3 \varphi_{B3} + \varphi_{B4}}{\delta_1 + \delta_2 + \delta_3 + 1}, m = 1 \ldots L$$

The coefficient $\delta_1$, $\delta_2$, $\delta_3$ of equation (177) can be determined by equation (122), and equation (177) satisfies equations (142) and (139). The stabilized operator control term of the following equation (178) is obtained in place of equation (140).

[Equations 97]

$$v\left\langle\frac{\partial \phi_S}{\partial x_k}, \frac{\partial \varphi_S}{\partial x_l}\right\rangle\Omega_e = v_m'\left\langle\frac{\partial \phi_S}{\partial x_k}, \frac{\partial \phi_S}{\partial x_l}\right\rangle\Omega_e \tag{178}$$

In the case that the stabilized operator control term of the following equation (178) is adopted, equation (171) is modified as the following equation (179).

[Equations 98]

$$\tilde{K}(v_m')_S = \tilde{K}(v_m')_B \frac{A_e^2}{\langle 1, \phi_B\rangle^2_{\Omega_e}} \tag{179}$$

The first term of equation (179) is a matrix consisting of the integration values of the scaled bubble function expressed by the first term of each of equations (111) to (113), and can be expressed as the second term in the case that equations (70), (65), and (66) are adopted. In order to obtain a stabilized operator control parameter $v_m'$ that satisfies the relationship of equation (172), a problem for determining a stabilized operator control parameter $v_m'$ that minimizes the performance index of the following equation (180) is considered.

[Equations 99]

$$J = \frac{1}{2} \upsilon(v_m')_S^T \upsilon(v_m')_S, m = 1 \ldots L \quad (180)$$

$$\upsilon(v_m')_S = \left[ \tilde{K}(v_m')_S \tilde{\tau}_{eR} u_S' - \frac{\langle 1, \phi_S \rangle^2}{A_e} u_S' \right] \quad (181)$$

To determine a stabilized operator control parameter $v_m'$ that minimizes equation (180), a stabilized operator control parameter $v_m'$ is obtained by the relation expressed by the following equation (182), which is the stationary condition of equation (180).

[Equations 100]

$$\frac{\partial J}{\partial v_m'} = \left[ \frac{\partial \upsilon(v_m')_S}{\partial v_m'} \right]^T \upsilon(v_m')_S = 0 \quad (182)$$

Equation (181) is a vector, and the components of the vector are expressed as the following equation (183).

[Equations 101]

$$\upsilon(v_m')_S^T = [\upsilon(v_1')_{S1} \ldots \upsilon(v_L')_{SL}] \quad (183)$$

Since stabilized operator control parameters $v_m'$ are independently defined by individual sets of vector components as indicated by equation (183), a minimizing problem using the performance index of the following equation (184) can be considered for each of the components m of equation (183) as a problem to determine stabilized operator control parameters $v_m'$ that satisfy the relationship of equation (172).

[Equations 102]

$$J = \frac{1}{2} \{\upsilon(v_m')_{Sm}\}^2, m = 1 \ldots L \quad (184)$$

To determine a stabilized operator control parameter $v_m'$ that minimizes equation (184), a stabilized operator control parameter $v_m'$ is obtained by the relationship expressed by the following equation (185), which is the stationary condition of equation (184).

[Equations 103]

$$\frac{\partial J}{\partial v_m'} = \left[ \frac{\partial \upsilon(v_m')_{Sm}}{\partial (v_m')} \right] \upsilon(v_m')_{Sm} = 0 \quad (185)$$

As stabilized operator control parameters $v_m'$ for equation (183) are independently defined by individual sets of vector components, equations (182) and (185) for obtaining stabilized operator control parameters $v_m'$ induced from the stationary condition of equations (180) and (184), consequently become the same equations.

For an alternative method, a problem for determining a stabilized operator control parameters $v'$ so as to satisfy the relationship of the following equation (186) can also be considered.

[Equations 104]

$$\tilde{\tau}_{eS}^{-1} u_S^{-1} \approx \tilde{\tau}'_{eR} u_S' \quad (186)$$

In order to obtain a stabilized operator control parameter $v'$ that satisfies the relationship of equation (186), a problem for determining a stabilized operator control parameter $v'$ that minimizes the performance index of the following equation (187) is considered.

[Equations 105]

$$J = \frac{1}{2} w(v')_S^T w(v')_S \quad (187)$$

$$w(v')_S = \left[ \tilde{K}(v')_S u_S' - \frac{\langle 1, \phi_S \rangle^2}{A_e} \tilde{\tau}_{eR}^{-1} u_S' \right] \quad (188)$$

To determine a stabilized operator control parameter $v'$ that minimizes equation (187), a stabilized operator control parameter $v'$ is obtained by the relationship expressed by the following equation (189), which is the stationary condition of equation (187).

[Equations 106]

$$\frac{\partial J}{\partial v'} = \left[ \frac{\partial w(v')_S}{\partial v'} \right]^T w(v')_S = 0 \quad (189)$$

Concerning the stabilized operator control parameter $v'$, the stabilized operator control term of equation (178) is induced using the three-level scaled bubble function of the following equation (177), and it is possible to define as many stabilized operator control parameters $v_m'$ as the number L of unknown analytical physical quantities to be obtained. In order to obtain a stabilized operator control parameter $v_m'$ that satisfies the relationship of equation (186), a problem for determining a stabilized operator control parameter $v_m'$ that minimizes the performance index of the following equation (190) is considered.

[Equations 107]

$$J = \frac{1}{2} w(v_m')_S^T w(v_m')_S \quad (190)$$

$$w(v_m')_S = \left[ \tilde{K}(v_m')_S u_S' - \frac{\langle 1, \phi_S \rangle^2}{A_e} \tilde{\tau}_{eR}^{-1} u_S' \right] \quad (191)$$

To determine a stabilized operator control parameter $v_m'$ that minimizes equation (190), a stabilized operator control parameter $v_m'$ is obtained by the relationship expressed by the following equation (192), which is the stationary condition of equation (190).

[Equations 108]

$$\frac{\partial J}{\partial v'_m} = \left[\frac{\partial w(v'_m)_S}{\partial v'_m}\right]^T w(v'_m)_S = 0 \qquad (192)$$

Equation (191) is a vector, and the components of the vector are expressed as the following equation (193).

[Equations 109]

$$w(v_m')_S^T = [w(v_1')_{S1} \ldots w(v_L')_{SL}] \qquad (193)$$

Since stabilized operator control parameters $v_m'$ are independently defined by individual sets of vector components as indicated by equation (193), a minimizing problem using the performance index of the following equation (194) can be considered for each of the components m of equation (193) as a problem for determining stabilized operator control parameters $v_m'$ that satisfy the relationship of equation (186).

[Equations 110]

$$J = \frac{1}{2}\{w(v'_m)_{Sm}\}^2, m = 1 \ldots L \qquad (194)$$

To determine a stabilized operator control parameter $v_m'$ that minimizes equation (194), a stabilized operator control parameter $v_m'$ is obtained by the relationship expressed by the following equation (195), which is the stationary condition of equation (194).

[Equations 111]

$$\frac{\partial J}{\partial v'_m} = \left[\frac{\partial w(v'_m)_{Sm}}{\partial v'_m}\right] w(v'_m)_{Sm} = 0 \qquad (195)$$

As stabilized operator control parameters $v_m'$ for equation (193) are independently defined by individual sets of vector components, equations (192) and (195) for obtaining stabilized operator control parameters $v_m'$ induced from the stationary condition of equations (190) and (194), consequently become the same equations.

<17. Relationship of Stabilized Operator Control Parameters Between Bubble Function and Scaled Bubble Function>

For an orthogonal basis bubble function element, stabilized operator control parameters can be computed by using the integrations of equations (70), (65), and (66) and by adopting any of equations (150), (156), (159), (163), (166), (169) in the case that the expressions of equations (1) and (107) are adopted, and by using the integrations of the first term of each of equations (111) to (113) and by adopting any of equations (176), (182), (185), (189), (192), (195) in the case that the expression of equations (108) is adopted. Equations (176), (182), (185), (189), (192), (195) are expressed as the following equations (196) to (201) by using the integrations of equations (70), (65), and (66).

[Equations 112]

$$\left[\frac{\partial v(v')_S}{\partial v'}\right]^T v(v')_S = \frac{A_e^2}{\langle 1, \phi_B\rangle_{\Omega_e}^2}\left[\frac{\partial v(v')_B}{\partial v'}\right]^T v(v')_B = 0 \qquad (196)$$

-continued $$\left[\frac{\partial v(v'_m)_S}{\partial v'_m}\right]^T v(v'_m)_S = \frac{A_e^2}{\langle 1, \phi_B\rangle_{\Omega_e}^2}\left[\frac{\partial v(v'_m)_B}{\partial v'_m}\right]^T v(v'_m)_B = 0 \qquad (197)$$

$$\left[\frac{\partial v(v'_m)_{Sm}}{\partial v'_m}\right]^T v(v'_m)_{Sm} = \frac{A_e^2}{\langle 1, \phi_B\rangle_{\Omega_e}^2}\left[\frac{\partial v(v'_m)_{Bm}}{\partial v'_m}\right] v(v'_m)_{Bm} = 0 \qquad (198)$$

$$\left[\frac{\partial w(v')_S}{\partial v'}\right]^T w(v')_S = \frac{A_e^2}{\langle 1, \phi_B\rangle_{\Omega_e}^2}\left[\frac{\partial w(v')_B}{\partial v'}\right]^T w(v')_B = 0 \qquad (199)$$

$$\left[\frac{\partial w(v'_m)_S}{\partial v'_m}\right]^T w(v'_m)_S = \frac{A_e^2}{\langle 1, \phi_B\rangle_{\Omega_e}^2}\left[\frac{\partial w(v'_m)_B}{\partial v'_m}\right]^T w(v'_m)_B = 0 \qquad (200)$$

$$\left[\frac{\partial w(v'_m)_{Sm}}{\partial v'_m}\right] w(v'_m)_{Sm} = \frac{A_e^2}{\langle 1, \phi_B\rangle_{\Omega_e}^2}\left[\frac{\partial w(v'_m)_{Bm}}{\partial v'_m}\right] w(v'_m)_{Bm} = 0 \qquad (201)$$

It is indicated by the second terms of equations (196) to (201), which use the integration of equations (70), (65), and (66), that relation equations to obtain stabilized operator control parameters are the same as (equivalent to) relation equations to obtain the stabilized operator control parameters for equations (150), (156), (159), (163), (166), and (169). Therefore, it is proved that stabilized operator control parameters obtained from equations (150), (156), (159), (163), (166), (169) that use the integration of bubble functions of equations (70), (65), and (66) and those obtained from equations (176), (182), (185), (189), (192), (195) that use the integration of scaled bubble functions of the first terms of equations (111) to (113) are the same values (equivalent values).

From the above, it is indicated that the integration values of bubble functions of equations (70), (65), and (66) and the integration values of scaled bubble functions of the first terms of equations (111) to (113) are required for the formulation and programming of 1) a bubble function, a scaled bubble function that produces the integration value of bubble function itself as $A_e$, 2) a stabilized operator control term that is introduced to moderate numerical instability included in bubble functions, a three-level bubble function, a three-level scaled bubble function, and 3) a stabilizing effect matrix used for the computation of a stabilized operator control parameter. As all integration Values required are given in advance (without complicated integration) by equation (80) for an expanded orthogonal basis bubble function element, the series of procedures necessary for the induction of a diagonal mass matrix that possesses analytical accuracy equivalent to a consistent mass matrix and for the introduction of a stabilized operator control term that moderates numerical instability included in a bubble function, can be processed highly rationally.

As indicated by the analytical results of two and three dimensions, an orthogonal basis bubble function element can give reliable results while it adopts a solution (four-step solution for example) that is efficient in memory capacity and computing time. As the conditional equation (80) of an expanded orthogonal basis bubble function element can rationally and uniformly deal with the integration values of bubble function elements required not only for the analyses of the motion of the liquid droplets of inkjets, of floods in cities and of rivers, and of tsunami's generated by earthquakes, but also for the analyses of the stresses on structures and of the eigen vibrations of car engines, and with the process necessary to moderate numerical instability being included in bubble functions, the advantageous effect of an orthogonal basis bubble function element being easily applicable to the diverse numerical analyses mentioned above is facilitated.

As explained above, by the present embodiment, an analytical solution (orthogonal basis bubble function element numerical analysis method) that is efficient in memory capacity and computing time can be realized through numerical analysis using a bubble function element.

The orthogonal basis bubble function element numerical analysis method described in the present embodiment can be realized by operating a program prepared on computers such as personal computers, work stations, PC clusters, and super computers. The program is recorded on computer-readable recording media such as a hard disk, flexible disk, CD-ROM, MO, or DVD, and is read out and executed by a a0 computer. The program may be a transmittable medium that can be distributed via networks such as the internet.

INDUSTRIAL APPLICABILITY

As described above, an orthogonal basis bubble function element numerical analysis method, an orthogonal basis bubble function element numerical analysis program, and an orthogonal basis bubble function element numerical analyzing apparatus according to the present invention are useful in numerical analysis based on a finite element method that uses the meshes of line, triangular, and tetrahedral shapes.

The invention claimed is:

1. A numerical analysis method, comprising:
acquiring a consistent mass matrix of each element of a subject;
generating, based on a bubble function of each element, a first diagonal mass matrix of each element, the first diagonal mass matrix being the consistent mass matrix that is diagonalized;
analyzing a motion of the subject based on a known physical quantity of the subject and the first diagonal mass matrix; and
computing a second diagonal mass matrix of an entire analysis region based on the first diagonal mass matrix, wherein the generating includes generating the first diagonal mass matrix by substituting an integration value of the bubble function of each element into the consistent mass matrix, wherein the integration value is found by employing the following equations:

$$\langle \phi_B, 1 \rangle_{\Omega_e} = \|\phi_B\|^2_{\Omega_e} = CA_e$$

Two – dimensions $$C = \frac{3}{4}$$

Three – dimensions $$C = \frac{4}{5}$$

$$\langle \phi_B, 1 \rangle_{\Omega_e} = \int_{\Omega_e} \phi_B \, d\Omega$$

$$\|\phi_B\|^2_{\Omega_e} = \langle \phi_B, \phi_B \rangle_{\Omega_e} = \langle \phi_B^2, 1 \rangle_{\Omega_e} = \int_{\Omega_e} \phi_B^2 \, d\Omega$$

$$A_e = \int_{\Omega_e} d\Omega.$$

2. A numerical analysis method, comprising:
acquiring a consistent mass matrix of each element of a subject;
generating, based on a bubble function of each element, a first diagonal mass matrix of each element, the first diagonal mass matrix being the consistent mass matrix that is diagonalized; and
analyzing a motion of the subject based on a known physical quantity of the subject and the first diagonal mass matrix, further comprising:
computing a second diagonal mass matrix of an entire analysis region based on the first diagonal mass matrix; and
computing an inverse matrix of the second diagonal mass matrix, wherein
the analyzing includes analyzing the motion based on the known physical quantity, the second diagonal mass matrix, and the inverse matrix, wherein the generating includes generating the first diagonal mass matrix by substituting an integration value of the bubble function of each element into the consistent mass matrix, wherein the integration value is found by employing the following equations:

$$\langle \phi_B, 1 \rangle_{\Omega_e} = \|\phi_B\|^2_{\Omega_e} = CA_e$$

Two – dimensions $$C = \frac{3}{4}$$

Three – dimensions $$C = \frac{4}{5}$$

$$\langle \phi_B, 1 \rangle_{\Omega_e} = \int_{\Omega_e} \phi_B \, d\Omega$$

$$\|\phi_B\|^2_{\Omega_e} = \langle \phi_B, \phi_B \rangle_{\Omega_e} = \langle \phi_B^2, 1 \rangle_{\Omega_e} = \int_{\Omega_e} \phi_B^2 \, d\Omega$$

$$A_e = \int_{\Omega_e} d\Omega.$$

3. A numerical analysis apparatus, comprising:
an acquiring unit that acquires a consistent mass matrix of each element of a subject;
a generating unit that, based on a bubble function of each element, generates a first diagonal mass matrix of each element, the first diagonal mass matrix being the consistent mass matrix that is diagonalized; and
an analyzing unit that analyzes a motion of the subject based on a known physical quantity of the subject and the first diagonal mass matrix, further comprising:
a first computing unit that computes a second diagonal mass matrix of the entire subject based on the first diagonal mass matrix; and
a second computing unit that computes an inverse matrix of the second diagonal mass matrix, wherein
the analyzing unit analyzes the motion based on the known physical quantity, the second diagonal mass matrix, and the inverse matrix, wherein the generating includes generating the first diagonal mass matrix by substituting an integration value of the bubble function of each element into the consistent mass matrix, wherein the integration value is found by employing the following equations:

$$\langle \phi_B, 1 \rangle_{\Omega_e} = \|\phi_B\|^2_{\Omega_e} = CA_e$$

Two – dimensions $$C = \frac{3}{4}$$

Three – dimensions $$C - \frac{4}{5}$$

$$\langle \phi_B, 1 \rangle_{\Omega_e} = \int_{\Omega_e} \phi_B \, d\Omega$$

$$\|\phi_B\|^2_{\Omega_e} = \langle \phi_B, \phi_B \rangle_{\Omega_e} = \langle \phi_B^2, 1 \rangle_{\Omega_e} = \int_{\Omega_e} \phi_B^2 \, d\Omega$$

$$A_e = \int_{\Omega_e} d\Omega.$$

* * * * *

UNITED STATES PATENT AND TRADEMARK OFFICE
CERTIFICATE OF CORRECTION

PATENT NO.        : 7,881,912 B2
APPLICATION NO.   : 11/791659
DATED             : February 1, 2011
INVENTOR(S)       : Junichi Matsumoto It is certified that error appears in the above-identified patent and that said Letters Patent is hereby corrected as shown below:

In column 4, on line 42, " $\langle \phi_B, 1 \rangle_{\Omega_e} = \|\phi_B\|^2_{\Omega_e} = CA_2$ " should read -- $\langle \phi_B, 1 \rangle_{\Omega_e} = \|\phi_B\|^2_{\Omega_e} = CA_e$ --.

In column 4, on line 47 "Three-dimensions (15-1)" should read -- Three-dimensions --.

In column 4, on line 51 " $\langle \phi_B, 1 \rangle_{\Omega_e} = \int_{\Omega_e} \phi_B \, d\Omega$ " should read -- $\langle \phi_B, 1 \rangle_{\Omega_e} = \int_{\Omega_e} \phi_B \, d\Omega$ (15-1) --.

In column 4, on line 53 " $\|\phi_B\|^2_{\Omega_e} = \langle \phi_B, \phi_B \rangle_{\Omega_e} = \langle \phi_B^2, 1 \rangle = \int_{\Omega_e} \phi_B^2 \, d\Omega$ " should read -- $\|\phi_B\|^2_{\Omega_e} = \langle \phi_B, \phi_B \rangle_{\Omega_e} = \langle \phi_B^2, 1 \rangle_{\Omega_e} = \int_{\Omega_e} \phi_B^2 \, d\Omega$ --.

In column 6, on line 46 "position-O" should read -- position=0 --.

In column 6, on line 49 "positioned" should read -- position=0 --.

In column 6, on line 53 "position-0" should read -- position=0 --.

In column 7, on line 2 "position=C" should read -- position=0 --.

In column 7, on line 5 "positions=0" should read -- position=0 --.

In column 8, on line 2 "display 109" should read -- display 108 --.

In column 8, on line 10 "ED 105" should read -- HD 105 --.

Signed and Sealed this
Twenty-third Day of August, 2011

David J. Kappos
*Director of the United States Patent and Trademark Office*

CERTIFICATE OF CORRECTION (continued)
U.S. Pat. No. 7,881,912 B2

In column 10, on line 28 "RPM" should read -- RAM --.

In column 10, on line 59 "step S01" should read -- step S401 --.

In column 11, on line 19 "elements N" should read -- elements $N_e$ --.

In column 11, on line 35 "$\langle \Phi_a, \Phi_B \rangle_{\Omega_e} = \frac{1}{N+1}\langle 1, \phi_B \rangle_{\Omega_e} - \frac{1}{N+1}\|\phi_B\|^2_{\Omega_e} = 0, a = 1 \ldots N+1$" should read -- $\langle \Phi_\alpha, \phi_B \rangle_{\Omega_e} = \frac{1}{N+1}\langle 1, \phi_B \rangle_{\Omega_e} - \frac{1}{N+1}\|\phi_B\|^2_{\Omega_e} = 0, \alpha = 1 \cdots N+1$ --.

In column 11, on line 44 "$\langle \Phi_\alpha, \Phi_\beta \rangle_{\Omega_e} = \langle \Psi_\alpha, \Psi_\beta \rangle_{\Omega_e} - \frac{1}{(N+1)^2}\langle 1, \phi_B \rangle_{\Omega_e} = 0,$" should read -- $\langle \Phi_\alpha, \Phi_\beta \rangle_{\Omega_e} = \langle \Psi_\alpha, \Psi_\beta \rangle_{\Omega_e} - \frac{1}{(N+1)^2}\langle 1, \phi_B \rangle_{\Omega_e} = 0$ --.

In column 11, on line 50 "$\langle 1, \phi_B \rangle_{\Omega_e} = (N+1)^2 \langle \Psi_\alpha, \Psi_\beta \rangle_{\Omega_e}$" should read -- $\langle 1, \phi_B \rangle_{\Omega_e} = (N+1)^2 \langle \Psi_\alpha, \Psi_\beta \rangle_{\Omega_e}$ --.

In column 11, on line 59 "$C = \frac{1}{A_e}(N+1)^2 \langle \Psi_\alpha, \Psi_\beta \rangle_{\Omega_e}, \alpha \neq \beta$" should read -- $C = \frac{1}{A_e}(N+1)^2 \langle \Psi_\alpha, \Psi_\beta \rangle_{\Omega_e}, \alpha \neq \beta$ --.

In column 12, on line 64 "$a\alpha_1^2 b\alpha_1 + c = 0$" should read -- $a\alpha_1^2 + b\alpha_1 + c = 0$ --.

In column 12, on line 65 "$\alpha = \beta_1 + \beta_2\gamma_1^2 + \beta_4\gamma_1$," should read -- $a = \beta_1 + \beta_2\gamma_1^2 + \beta_4\gamma_1$ , --.

In column 13, on lines 8-9 "$\alpha_1 = \frac{-b \pm \sqrt{b^2 - 4\alpha c}}{2\alpha}$" should read -- $\alpha_1 = \frac{-b \pm \sqrt{b^2 - 4ac}}{2a}$ --.

In column 13, on line 22 "$w_i$, i = −1" should read -- $w_i$, i = 1 --.

CERTIFICATE OF CORRECTION (continued)
U.S. Pat. No. 7,881,912 B2

In column 15, on lines 35-49 "
$$\langle \Phi, \Phi^T \rangle_{\Omega_e} = M_{ij}^{(e)} \approx \text{diag}\left(\sum_{j=1}^{N+2} M_{ij}^e\right) =$$

$$\begin{bmatrix} \frac{A_e}{3} & 0 & 0 & 0 \\ 0 & \frac{A_e}{3} & 0 & 0 \\ 0 & 0 & \frac{A_e}{3} & 0 \\ 0 & 0 & 0 & 0 \end{bmatrix} + \frac{1}{3}\langle 1, \phi_B \rangle_{\Omega_e} \begin{bmatrix} -1 & 0 & 0 & 0 \\ 0 & -1 & 0 & 0 \\ 0 & 0 & -1 & 0 \\ 0 & 0 & 0 & 3 \end{bmatrix}$$
"

should read --
$$\langle \Phi, \Phi^T \rangle_{\Omega_e} = M_{ij}^{(e)} \approx \text{diag}\left(\sum_{j=1}^{N+2} M_{ij}^{(e)}\right)$$

$$= \begin{bmatrix} \frac{A_e}{3} & 0 & 0 & 0 \\ 0 & \frac{A_e}{3} & 0 & 0 \\ 0 & 0 & \frac{A_e}{3} & 0 \\ 0 & 0 & 0 & 0 \end{bmatrix} + \frac{1}{3}\langle 1, \phi_B \rangle_{\Omega_e} \begin{bmatrix} -1 & 0 & 0 & 0 \\ 0 & -1 & 0 & 0 \\ 0 & 0 & -1 & 0 \\ 0 & 0 & 0 & 3 \end{bmatrix}$$
--.

In column 16, on line 12 "[Equations 25]" should read -- [Equations 26] --.

In column 16, on lines 41-47 "
$$\langle \Phi, \Phi^T \rangle_{\Omega_e} = M_{ij}^{(e)} \approx \text{diag}\left(\sum_{j=1}^{N+2} M_{ij}^e\right) = \quad (45)$$

$$\begin{bmatrix} \frac{A_e}{3} & 0 & 0 & 0 \\ 0 & \frac{A_e}{3} & 0 & 0 \\ 0 & 0 & \frac{A_e}{3} & 0 \\ 0 & 0 & 0 & 0 \end{bmatrix} +$$

$$\frac{1}{4}\langle 1, \phi_B \rangle_{\Omega_e} \begin{bmatrix} -1 & 0 & 0 & 0 & 0 \\ 0 & -1 & 0 & 0 & 0 \\ 0 & 0 & -1 & 0 & 0 \\ 0 & 0 & 0 & -1 & 0 \\ 0 & 0 & 0 & 0 & 4 \end{bmatrix}$$
" should read $$\langle \Phi, \Phi^T \rangle_{\Omega_e} = M_{ij}^{(e)} \approx \text{diag}\left(\sum_{j=1}^{N+2} M_{ij}^{(e)}\right)$$

$$= \begin{bmatrix} \frac{A_e}{4} & 0 & 0 & 0 & 0 \\ 0 & \frac{A_e}{4} & 0 & 0 & 0 \\ 0 & 0 & \frac{A_e}{4} & 0 & 0 \\ 0 & 0 & 0 & \frac{A_e}{4} & 0 \\ 0 & 0 & 0 & 0 & 0 \end{bmatrix} + \frac{1}{4}\langle 1, \phi_B \rangle_{\Omega_e} \begin{bmatrix} -1 & 0 & 0 & 0 & 0 \\ 0 & -1 & 0 & 0 & 0 \\ 0 & 0 & -1 & 0 & 0 \\ 0 & 0 & 0 & -1 & 0 \\ 0 & 0 & 0 & 0 & 4 \end{bmatrix} \quad (45)$$

-- --.

In column 17, on line 18 "4B" should read -- $\phi_B$ --.

In column 17, on line 24 "({x, s, t})" should read -- ({r, s, t}) --.

In column 19, on line 24 "length-2" should read -- length=2 --.

In column 20, on line 46 " $\Phi^T = [(\Phi_1 \Phi_2 \phi_B]$ " should read -- $\Phi^T = [\Phi_1\ \Phi_2\ \phi_B]$ --.

In column 21, on line 53 "Line bubble function element (61)" should read -- Line bubble function element --.

In column 21, on lines 56-65 "
$$\langle \Phi, \Phi^T \rangle_{\Omega_e} = M_{ij}^{(e)} = \begin{bmatrix} \frac{A_e}{3} & \frac{A_e}{6} & 0 \\ \frac{A_e}{6} & \frac{A_e}{3} & 0 \\ 0 & 0 & 0 \end{bmatrix} + \frac{1}{4}\langle 1, \phi_B \rangle_{\Omega_e} \begin{bmatrix} -2 & -2 & 2 \\ -2 & -2 & 2 \\ 2 & 2 & 0 \end{bmatrix} +$$

$$\frac{1}{4}\|\phi_B\|^2_{\Omega_e} \begin{bmatrix} 1 & 1 & -2 \\ 1 & 1 & -2 \\ -2 & -2 & 4 \end{bmatrix}$$
"

should read --
$$\langle \Phi, \Phi^T \rangle_{\Omega_e} = M_{ij}^{(e)} = \begin{bmatrix} \frac{A_e}{3} & \frac{A_e}{6} & 0 \\ \frac{A_e}{6} & \frac{A_e}{3} & 0 \\ 0 & 0 & 0 \end{bmatrix} + \frac{1}{4}\langle 1, \phi_B \rangle_{\Omega_e} \begin{bmatrix} -2 & -2 & 2 \\ -2 & -2 & 2 \\ 2 & 2 & 0 \end{bmatrix} +$$

$$\frac{1}{4}\|\phi_B\|^2_{\Omega_e} \begin{bmatrix} 1 & 1 & -2 \\ 1 & 1 & -2 \\ -2 & -2 & 4 \end{bmatrix} \quad (61)$$
--.

In column 22, on line 3 "Element level lumped mass matrix (when lumped) (62)" should read -- Element level lumped mass matrix (when lumped) --.

CERTIFICATE OF CORRECTION (continued)
U.S. Pat. No. 7,881,912 B2

In column 22, on line 10 " $\frac{1}{2}\langle 1, \phi_B \rangle_{\Omega_e} \begin{bmatrix} -1 & 0 & 0 \\ 0 & -1 & 0 \\ 0 & 0 & 2 \end{bmatrix}$ " should read -- $\frac{1}{2}\langle 1, \phi_B \rangle_{\Omega_e} \begin{bmatrix} -1 & 0 & 0 \\ 0 & -1 & 0 \\ 0 & 0 & 2 \end{bmatrix}$ (62) --.

In column 22, on line 14 "Element level diagonal mass (63)" should read -- Element level diagonal mass --.

In column 22, on lines 18-23 " $\langle \Phi, \Phi^T \rangle_{\Omega_e} = M_{ij}^{(e)} = \begin{bmatrix} \frac{A_e}{6} & 0 & 0 \\ 0 & \frac{A_e}{6} & 0 \\ 0 & 0 & \frac{2}{3}A_e \end{bmatrix}$ "

should read -- $\langle \Phi, \Phi^T \rangle_{\Omega_e} = M_{ij}^{(e)} = \begin{bmatrix} \frac{A_e}{6} & 0 & 0 \\ 0 & \frac{A_e}{6} & 0 \\ 0 & 0 & \frac{2}{3}A_e \end{bmatrix}$ (63) --.

In column 23, on lines 32-44 " $\alpha_1(\xi_1, \xi_2, \xi_3) = \begin{cases} \alpha_1+(\xi_1, \xi_2, \xi_3) = \dfrac{-b(\xi_1, \xi_2, \xi_3) + \sqrt{b^2(\xi_1, \xi_2, \xi_3) - 4a(\xi_1, \xi_2)c(\xi_2, \xi_3)}}{2a(\xi_1, \xi_2)} \\ \alpha_1-(\xi_1, \xi_2, \xi_3) = \dfrac{-b(\xi_1, \xi_2, \xi_3) - \sqrt{b^2(\xi_1, \xi_2, \xi_3) - 4a(\xi_1, \xi_2)c(\xi_2, \xi_3)}}{2a(\xi_1, \xi_2)} \end{cases}$ "

should read -- $\alpha_1(\xi_1, \xi_2, \xi_3) = \begin{cases} \alpha_{1+}(\xi_1, \xi_2, \xi_3) = \dfrac{-b(\xi_1,\xi_2,\xi_3)+\sqrt{b^2(\xi_1,\xi_2,\xi_3)-4\,a(\xi_1,\xi_2)\,c(\xi_2,\xi_3)}}{2\,a(\xi_1,\xi_2)} \\ \alpha_{1-}(\xi_1, \xi_2, \xi_3) = \dfrac{-b(\xi_1,\xi_2,\xi_3)-\sqrt{b^2(\xi_1,\xi_2,\xi_3)-4\,a(\xi_1,\xi_2)\,c(\xi_2,\xi_3)}}{2\,a(\xi_1,\xi_2)} \end{cases}$ --.

In column 23, on lines 58-59 " $D\left(\frac{1}{10}, \frac{1}{5}, \frac{3}{4}\right) = 35.0049920\ldots$ , $D\left(3, 2, \frac{6}{5}\right) = 5.9124806\ldots$ "

should read -- $D\left(\frac{1}{10}, \frac{1}{5}, \frac{3}{4}\right) = 325.0049920\cdots$ , $D\left(3, 2, \frac{6}{5}\right) = 5.9124806\cdots$ --.

CERTIFICATE OF CORRECTION (continued)
U.S. Pat. No. 7,881,912 B2

In column 25, on lines 9-15 "
$$\alpha_1(\xi_1) = \alpha_1 + \left(\xi_1, \frac{8}{5}, \frac{2}{5}\right),$$
$$\alpha_2(\xi_1) = \alpha_2 + \left(\xi_1, \frac{8}{5}, \frac{2}{5}\right),$$
$$D(\xi_1) = D\left(\xi_1, \frac{8}{5}, \frac{2}{5}\right)$$
" should read -- $\alpha_1(\xi_1) = \alpha_{1+} \left(\xi_1, \frac{8}{5}, \frac{2}{5}\right)$ , $\alpha_2(\xi_1) = \alpha_2 \left(\xi_1, \frac{8}{5}, \frac{2}{5}\right)$ , $D(\xi_1) = D\left(\xi_1, \frac{8}{5}, \frac{2}{5}\right)$ --.

In column 25, on line 25 "1.8310≦S≦1.8315" should read -- $1.8310 \leq S \leq 1.8315$ --.

In column 25, on line 28 "5.2678≦S≦5.2683" should read -- $5.2678 \leq S \leq 5.2683$ --.

In column 25, on line 32 "1.806≦S≦1.8066" should read -- $1.8061 \leq S \leq 1.8066$ --.

In column 25, on line 37 " $b^2(\xi_1) - 4\alpha(\xi_1)c > 0$ " should read -- $b^2(\xi_1) - 4\,a(\xi_1)\,c > 0$ --.

In column 26, on line 30 " $\xi_1 = \hat{\xi} = -1.8312889\ldots, \alpha_1 = 20.4651928\ldots, \alpha_2 = -22.5761007\ldots$ " should read -- $\xi_1 = \hat{\xi} = 1.8312889\cdots$ , $\alpha_1 = 20.4651928\cdots$ , $\alpha_2 = -22.5761007\cdots$ --.

In column 26, on line 34 " $\xi_1 = \hat{\xi} = 5.2680399\ldots, \alpha_1 = -26201232\ldots, \alpha_2 = 3.1609628\ldots$ " should read -- $\xi_1 = \hat{\xi} = 5.2680399\cdots$ , $\alpha_1 = -2.6201232\cdots$ , $\alpha_2 = 3.1609628\cdots$ --.

In column 27, on lines 39-40 " $$\phi_B = \frac{\alpha_1 \phi_{B1} + \alpha_2 + \phi_{B2} + \alpha_3 + \phi_{B3} + \phi_{B4}}{\alpha_1 + \alpha_2 + \alpha_3 + 1}$$ " should read -- $$\phi_B = \frac{\alpha_1 \phi_{B1} + \alpha_2 \phi_{B2} + \alpha_3 \phi_{B3} + \phi_{B4}}{\alpha_1 + \alpha_2 + \alpha_3 + 1}$$ --.

CERTIFICATE OF CORRECTION (continued)
U.S. Pat. No. 7,881,912 B2

In column 27, on lines 58-66 "
$$\langle \frac{\partial \Phi}{\partial x_k}, \frac{\partial \Phi^T}{\partial x_l}\rangle \Omega_e = A_e \begin{bmatrix} \frac{\partial \Psi_1}{\partial x_k}\frac{\partial \Psi_1}{\partial x_l} & \frac{\partial \Psi_1}{\partial x_k}\frac{\partial \Psi_2}{\partial x_l} & 0 \\ \frac{\partial \Psi_2}{\partial x_k}\frac{\partial \Psi_1}{\partial x_l} & \frac{\partial \Psi_2}{\partial x_k}\frac{\partial \Psi_2}{\partial x_l} & 0 \\ 0 & 0 & 0 \end{bmatrix} +$$

$$\langle \frac{\partial \phi_B}{\partial x_k}, \frac{\partial \phi_B}{\partial x_l}\rangle \Omega_e \frac{1}{4}\begin{bmatrix} 1 & 1 & -2 \\ 1 & 1 & -2 \\ -2 & -2 & 4 \end{bmatrix}$$
" should read $$\langle \frac{\partial \Phi}{\partial x_k}, \frac{\partial \Phi^T}{\partial x_l}\rangle \Omega_e = A_e \begin{bmatrix} \frac{\partial \Psi_1}{\partial x_k}\frac{\partial \Psi_1}{\partial x_l} & \frac{\partial \Psi_1}{\partial x_k}\frac{\partial \Psi_2}{\partial x_l} & 0 \\ \frac{\partial \Psi_2}{\partial x_k}\frac{\partial \Psi_1}{\partial x_l} & \frac{\partial \Psi_2}{\partial x_k}\frac{\partial \Psi_2}{\partial x_l} & 0 \\ 0 & 0 & 0 \end{bmatrix}$$

$$+\langle \frac{\partial \phi_B}{\partial x_k}, \frac{\partial \phi_B}{\partial x_l}\rangle \Omega_e \frac{1}{4}\begin{bmatrix} 1 & 1 & -2 \\ 1 & 1 & -2 \\ -2 & -2 & 4 \end{bmatrix}$$
--.

In column 28, on lines 7-18 "
$$\langle \frac{\partial \Phi}{\partial x_k}, \frac{\partial \Phi^T}{\partial x_l}\rangle \Omega_e = A_e \begin{bmatrix} \frac{\partial \Psi_1}{\partial x_k}\frac{\partial \Psi_1}{\partial x_l} & \frac{\partial \Psi_1}{\partial x_k}\frac{\partial \Psi_2}{\partial x_l} & \frac{\partial \Psi_1}{\partial x_k}\frac{\partial \Psi_3}{\partial x_l} & 0 \\ \frac{\partial \Psi_2}{\partial x_k}\frac{\partial \Psi_1}{\partial x_l} & \frac{\partial \Psi_2}{\partial x_k}\frac{\partial \Psi_2}{\partial x_l} & \frac{\partial \Psi_2}{\partial x_k}\frac{\partial \Psi_3}{\partial x_l} & 0 \\ \frac{\partial \Psi_3}{\partial x_k}\frac{\partial \Psi_1}{\partial x_l} & \frac{\partial \Psi_3}{\partial x_k}\frac{\partial \Psi_2}{\partial x_l} & \frac{\partial \Psi_3}{\partial x_k}\frac{\partial \Psi_3}{\partial x_l} & 0 \\ 0 & 0 & 0 & 0 \end{bmatrix} +$$

$$\langle \frac{\partial \phi_B}{\partial x_k}, \frac{\partial \phi_B}{\partial x_l}\rangle \Omega_e \frac{1}{9}\begin{bmatrix} 1 & 1 & 1 & -3 \\ 1 & 1 & 1 & -3 \\ 1 & 1 & 1 & -3 \\ -3 & -3 & -3 & 9 \end{bmatrix}$$
"

should read --
$$\langle \frac{\partial \Phi}{\partial x_k}, \frac{\partial \Phi^T}{\partial x_l}\rangle \Omega_e = A_e \begin{bmatrix} \frac{\partial \Psi_1}{\partial x_k}\frac{\partial \Psi_1}{\partial x_l} & \frac{\partial \Psi_1}{\partial x_k}\frac{\partial \Psi_2}{\partial x_l} & \frac{\partial \Psi_1}{\partial x_k}\frac{\partial \Psi_3}{\partial x_l} & 0 \\ \frac{\partial \Psi_2}{\partial x_k}\frac{\partial \Psi_1}{\partial x_l} & \frac{\partial \Psi_2}{\partial x_k}\frac{\partial \Psi_2}{\partial x_l} & \frac{\partial \Psi_2}{\partial x_k}\frac{\partial \Psi_3}{\partial x_l} & 0 \\ \frac{\partial \Psi_3}{\partial x_k}\frac{\partial \Psi_1}{\partial x_l} & \frac{\partial \Psi_3}{\partial x_k}\frac{\partial \Psi_2}{\partial x_l} & \frac{\partial \Psi_3}{\partial x_k}\frac{\partial \Psi_3}{\partial x_l} & 0 \\ 0 & 0 & 0 & 0 \end{bmatrix}$$

$$+\langle \frac{\partial \phi_B}{\partial x_k}, \frac{\partial \phi_B}{\partial x_l}\rangle \Omega_e \frac{1}{9}\begin{bmatrix} 1 & 1 & 1 & -3 \\ 1 & 1 & 1 & -3 \\ 1 & 1 & 1 & -3 \\ -3 & -3 & -3 & 9 \end{bmatrix}$$
--.

In column 28, on lines 22-40 "

$$\langle \frac{\partial \Phi}{\partial x_k}, \frac{\partial \Phi^T}{\partial x_l} \rangle \Omega_e =$$

$$A_e \begin{bmatrix} \frac{\partial \Psi_1}{\partial x_k}\frac{\partial \Psi_1}{\partial x_l} & \frac{\partial \Psi_1}{\partial x_k}\frac{\partial \Psi_2}{\partial x_l} & \frac{\partial \Psi_1}{\partial x_k}\frac{\partial \Psi_3}{\partial x_l} & \frac{\partial \Psi_1}{\partial x_k}\frac{\partial \Psi_4}{\partial x_l} & 0 \\ \frac{\partial \Psi_2}{\partial x_k}\frac{\partial \Psi_1}{\partial x_l} & \frac{\partial \Psi_2}{\partial x_k}\frac{\partial \Psi_2}{\partial x_l} & \frac{\partial \Psi_2}{\partial x_k}\frac{\partial \Psi_3}{\partial x_l} & \frac{\partial \Psi_2}{\partial x_k}\frac{\partial \Psi_4}{\partial x_l} & 0 \\ \frac{\partial \Psi_3}{\partial x_k}\frac{\partial \Psi_1}{\partial x_l} & \frac{\partial \Psi_3}{\partial x_k}\frac{\partial \Psi_2}{\partial x_l} & \frac{\partial \Psi_3}{\partial x_k}\frac{\partial \Psi_3}{\partial x_l} & \frac{\partial \Psi_3}{\partial x_k}\frac{\partial \Psi_4}{\partial x_l} & 0 \\ \frac{\partial \Psi_4}{\partial x_k}\frac{\partial \Psi_1}{\partial x_l} & \frac{\partial \Psi_4}{\partial x_k}\frac{\partial \Psi_2}{\partial x_l} & \frac{\partial \Psi_4}{\partial x_k}\frac{\partial \Psi_3}{\partial x_l} & \frac{\partial \Psi_4}{\partial x_k}\frac{\partial \Psi_4}{\partial x_l} & 0 \\ 0 & 0 & 0 & 0 & 0 \end{bmatrix} +$$

$$\langle \frac{\partial \phi_B}{\partial x_k}, \frac{\partial \phi_B}{\partial x_l} \rangle_{\Omega_e} \frac{1}{16} \begin{bmatrix} 1 & 1 & 1 & 1 & -4 \\ 1 & 1 & 1 & 1 & -4 \\ 1 & 1 & 1 & 1 & -4 \\ 1 & 1 & 1 & 1 & -4 \\ -4 & -4 & -4 & -4 & 16 \end{bmatrix}$$

"

should read --

$$\langle \frac{\partial \Phi}{\partial x_k}, \frac{\partial \Phi^T}{\partial x_l} \rangle \Omega_e = A_e \begin{bmatrix} \frac{\partial \Psi_1}{\partial x_k}\frac{\partial \Psi_1}{\partial x_l} & \frac{\partial \Psi_1}{\partial x_k}\frac{\partial \Psi_2}{\partial x_l} & \frac{\partial \Psi_1}{\partial x_k}\frac{\partial \Psi_3}{\partial x_l} & \frac{\partial \Psi_1}{\partial x_k}\frac{\partial \Psi_4}{\partial x_l} & 0 \\ \frac{\partial \Psi_2}{\partial x_k}\frac{\partial \Psi_1}{\partial x_l} & \frac{\partial \Psi_2}{\partial x_k}\frac{\partial \Psi_2}{\partial x_l} & \frac{\partial \Psi_2}{\partial x_k}\frac{\partial \Psi_3}{\partial x_l} & \frac{\partial \Psi_2}{\partial x_k}\frac{\partial \Psi_4}{\partial x_l} & 0 \\ \frac{\partial \Psi_3}{\partial x_k}\frac{\partial \Psi_1}{\partial x_l} & \frac{\partial \Psi_3}{\partial x_k}\frac{\partial \Psi_2}{\partial x_l} & \frac{\partial \Psi_3}{\partial x_k}\frac{\partial \Psi_3}{\partial x_l} & \frac{\partial \Psi_3}{\partial x_k}\frac{\partial \Psi_4}{\partial x_l} & 0 \\ \frac{\partial \Psi_4}{\partial x_k}\frac{\partial \Psi_1}{\partial x_l} & \frac{\partial \Psi_4}{\partial x_k}\frac{\partial \Psi_2}{\partial x_l} & \frac{\partial \Psi_4}{\partial x_k}\frac{\partial \Psi_3}{\partial x_l} & \frac{\partial \Psi_4}{\partial x_k}\frac{\partial \Psi_4}{\partial x_l} & 0 \\ 0 & 0 & 0 & 0 & 0 \end{bmatrix}$$

$$+ \langle \frac{\partial \phi_B}{\partial x_k}, \frac{\partial \phi_B}{\partial x_l} \rangle \Omega_e \frac{1}{16} \begin{bmatrix} 1 & 1 & 1 & 1 & -4 \\ 1 & 1 & 1 & 1 & -4 \\ 1 & 1 & 1 & 1 & -4 \\ 1 & 1 & 1 & 1 & -4 \\ -4 & -4 & -4 & -4 & 16 \end{bmatrix}$$

--.

In column 28, on lines 58-67 "

$$\langle \frac{\partial \Phi}{\partial x_k}, \frac{\partial \Phi^T}{\partial x_l} \rangle \Omega_e = A_e \begin{bmatrix} \frac{\partial \Psi_1}{\partial x_k}\frac{\partial \Psi_1}{\partial x_l} & \frac{\partial \Psi_1}{\partial x_k}\frac{\partial \Psi_2}{\partial x_l} & 0 \\ \frac{\partial \Psi_2}{\partial x_k}\frac{\partial \Psi_1}{\partial x_l} & \frac{\partial \Psi_2}{\partial x_k}\frac{\partial \Psi_2}{\partial x_l} & 0 \\ 0 & 0 & 0 \end{bmatrix} + \frac{2}{3}A_e \left( \sum_{\alpha=1}^{N+1} \frac{\partial \Psi_\alpha}{\partial x_k}\frac{\partial \Psi_\alpha}{\partial x_l} \right) \begin{bmatrix} 1 & 1 & -2 \\ 1 & 1 & -2 \\ -2 & -2 & 4 \end{bmatrix}$$

" should read

--

$$\langle \frac{\partial \Phi}{\partial x_k}, \frac{\partial \Phi^T}{\partial x_l} \rangle \Omega_e = A_e \begin{bmatrix} \frac{\partial \Psi_1}{\partial x_k}\frac{\partial \Psi_1}{\partial x_l} & \frac{\partial \Psi_1}{\partial x_k}\frac{\partial \Psi_2}{\partial x_l} & 0 \\ \frac{\partial \Psi_2}{\partial x_k}\frac{\partial \Psi_1}{\partial x_l} & \frac{\partial \Psi_2}{\partial x_k}\frac{\partial \Psi_2}{\partial x_l} & 0 \\ 0 & 0 & 0 \end{bmatrix}$$

$$+ \frac{2}{3}A_e \left( \sum_{\alpha=1}^{N+1} \frac{\partial \Psi_\alpha}{\partial x_k}\frac{\partial \Psi_\alpha}{\partial x_l} \right) \begin{bmatrix} 1 & 1 & -2 \\ 1 & 1 & -2 \\ -2 & -2 & 4 \end{bmatrix}$$

--.

In column 29, on lines 5-17 "

$$\langle \frac{\partial \Phi}{\partial x_k}, \frac{\partial \Phi^T}{\partial x_l} \rangle \Omega_e = A_e \begin{bmatrix} \frac{\partial \Psi_1}{\partial x_k}\frac{\partial \Psi_1}{\partial x_l} & \frac{\partial \Psi_1}{\partial x_k}\frac{\partial \Psi_2}{\partial x_l} & \frac{\partial \Psi_1}{\partial x_k}\frac{\partial \Psi_3}{\partial x_l} & 0 \\ \frac{\partial \Psi_2}{\partial x_k}\frac{\partial \Psi_1}{\partial x_l} & \frac{\partial \Psi_2}{\partial x_k}\frac{\partial \Psi_2}{\partial x_l} & \frac{\partial \Psi_2}{\partial x_k}\frac{\partial \Psi_3}{\partial x_l} & 0 \\ \frac{\partial \Psi_3}{\partial x_k}\frac{\partial \Psi_1}{\partial x_l} & \frac{\partial \Psi_3}{\partial x_k}\frac{\partial \Psi_2}{\partial x_l} & \frac{\partial \Psi_3}{\partial x_k}\frac{\partial \Psi_3}{\partial x_l} & 0 \\ 0 & 0 & 0 & 0 \end{bmatrix} + \frac{3}{4}A_e \left( \sum_{\alpha=1}^{N+1} \frac{\partial \Psi_\alpha}{\partial x_k}\frac{\partial \Psi_\alpha}{\partial x_l} \right) \begin{bmatrix} 1 & 1 & 1 & -3 \\ 1 & 1 & 1 & -3 \\ 1 & 1 & 1 & -3 \\ -3 & -3 & -3 & 9 \end{bmatrix}$$

" should read --

$$\langle \frac{\partial \Phi}{\partial x_k}, \frac{\partial \Phi^T}{\partial x_l} \rangle \Omega_e = A_e \begin{bmatrix} \frac{\partial \Psi_1}{\partial x_k}\frac{\partial \Psi_1}{\partial x_l} & \frac{\partial \Psi_1}{\partial x_k}\frac{\partial \Psi_2}{\partial x_l} & \frac{\partial \Psi_1}{\partial x_k}\frac{\partial \Psi_3}{\partial x_l} & 0 \\ \frac{\partial \Psi_2}{\partial x_k}\frac{\partial \Psi_1}{\partial x_l} & \frac{\partial \Psi_2}{\partial x_k}\frac{\partial \Psi_2}{\partial x_l} & \frac{\partial \Psi_2}{\partial x_k}\frac{\partial \Psi_3}{\partial x_l} & 0 \\ \frac{\partial \Psi_3}{\partial x_k}\frac{\partial \Psi_1}{\partial x_l} & \frac{\partial \Psi_3}{\partial x_k}\frac{\partial \Psi_2}{\partial x_l} & \frac{\partial \Psi_3}{\partial x_k}\frac{\partial \Psi_3}{\partial x_l} & 0 \\ 0 & 0 & 0 & 0 \end{bmatrix}$$

$$+ \frac{3}{4}A_e \left( \sum_{\alpha=1}^{N+1} \frac{\partial \Psi_\alpha}{\partial x_k}\frac{\partial \Psi_\alpha}{\partial x_l} \right) \begin{bmatrix} 1 & 1 & 1 & -3 \\ 1 & 1 & 1 & -3 \\ 1 & 1 & 1 & -3 \\ -3 & -3 & -3 & 9 \end{bmatrix}$$

--.

In column 29, on lines 19-37 "

$$\left\langle \frac{\partial \Phi}{\partial x_k}, \frac{\partial \Phi^T}{\partial x_l} \right\rangle \Omega_e =$$

$$A_e \begin{bmatrix} \frac{\partial \Psi_1}{\partial x_k}\frac{\partial \Psi_1}{\partial x_l} & \frac{\partial \Psi_1}{\partial x_k}\frac{\partial \Psi_2}{\partial x_l} & \frac{\partial \Psi_1}{\partial x_k}\frac{\partial \Psi_3}{\partial x_l} & \frac{\partial \Psi_1}{\partial x_k}\frac{\partial \Psi_4}{\partial x_l} & 0 \\ \frac{\partial \Psi_2}{\partial x_k}\frac{\partial \Psi_1}{\partial x_l} & \frac{\partial \Psi_2}{\partial x_k}\frac{\partial \Psi_2}{\partial x_l} & \frac{\partial \Psi_2}{\partial x_k}\frac{\partial \Psi_3}{\partial x_l} & \frac{\partial \Psi_2}{\partial x_k}\frac{\partial \Psi_4}{\partial x_l} & 0 \\ \frac{\partial \Psi_3}{\partial x_k}\frac{\partial \Psi_1}{\partial x_l} & \frac{\partial \Psi_3}{\partial x_k}\frac{\partial \Psi_2}{\partial x_l} & \frac{\partial \Psi_3}{\partial x_k}\frac{\partial \Psi_3}{\partial x_l} & \frac{\partial \Psi_3}{\partial x_k}\frac{\partial \Psi_4}{\partial x_l} & 0 \\ \frac{\partial \Psi_4}{\partial x_k}\frac{\partial \Psi_1}{\partial x_l} & \frac{\partial \Psi_4}{\partial x_k}\frac{\partial \Psi_2}{\partial x_l} & \frac{\partial \Psi_4}{\partial x_k}\frac{\partial \Psi_3}{\partial x_l} & \frac{\partial \Psi_4}{\partial x_k}\frac{\partial \Psi_4}{\partial x_l} & 0 \\ 0 & 0 & 0 & 0 & 0 \end{bmatrix} +$$

$$\frac{4}{5}A_e \left( \sum_{\alpha=1}^{N+1} \frac{\partial \Psi_\alpha}{\partial x_k}\frac{\partial \Psi_\alpha}{\partial x_l} \right) \begin{bmatrix} 1 & 1 & 1 & 1 & -4 \\ 1 & 1 & 1 & 1 & -4 \\ 1 & 1 & 1 & 1 & -4 \\ 1 & 1 & 1 & 1 & -4 \\ -4 & -4 & -4 & -4 & 16 \end{bmatrix}$$

"

should read --

$$\left\langle \frac{\partial \Phi}{\partial x_k}, \frac{\partial \Phi^T}{\partial x_l} \right\rangle \Omega_e = A_e \begin{bmatrix} \frac{\partial \Psi_1}{\partial x_k}\frac{\partial \Psi_1}{\partial x_l} & \frac{\partial \Psi_1}{\partial x_k}\frac{\partial \Psi_2}{\partial x_l} & \frac{\partial \Psi_1}{\partial x_k}\frac{\partial \Psi_3}{\partial x_l} & \frac{\partial \Psi_1}{\partial x_k}\frac{\partial \Psi_4}{\partial x_l} & 0 \\ \frac{\partial \Psi_2}{\partial x_k}\frac{\partial \Psi_1}{\partial x_l} & \frac{\partial \Psi_2}{\partial x_k}\frac{\partial \Psi_2}{\partial x_l} & \frac{\partial \Psi_2}{\partial x_k}\frac{\partial \Psi_3}{\partial x_l} & \frac{\partial \Psi_2}{\partial x_k}\frac{\partial \Psi_4}{\partial x_l} & 0 \\ \frac{\partial \Psi_3}{\partial x_k}\frac{\partial \Psi_1}{\partial x_l} & \frac{\partial \Psi_3}{\partial x_k}\frac{\partial \Psi_2}{\partial x_l} & \frac{\partial \Psi_3}{\partial x_k}\frac{\partial \Psi_3}{\partial x_l} & \frac{\partial \Psi_3}{\partial x_k}\frac{\partial \Psi_4}{\partial x_l} & 0 \\ \frac{\partial \Psi_4}{\partial x_k}\frac{\partial \Psi_1}{\partial x_l} & \frac{\partial \Psi_4}{\partial x_k}\frac{\partial \Psi_2}{\partial x_l} & \frac{\partial \Psi_4}{\partial x_k}\frac{\partial \Psi_3}{\partial x_l} & \frac{\partial \Psi_4}{\partial x_k}\frac{\partial \Psi_4}{\partial x_l} & 0 \\ 0 & 0 & 0 & 0 & 0 \end{bmatrix}$$

$$+\frac{4}{5}A_e \left( \sum_{\alpha=1}^{N+1} \frac{\partial \Psi_\alpha}{\partial x_k}\frac{\partial \Psi_\alpha}{\partial x_l} \right) \begin{bmatrix} 1 & 1 & 1 & 1 & -4 \\ 1 & 1 & 1 & 1 & -4 \\ 1 & 1 & 1 & 1 & -4 \\ 1 & 1 & 1 & 1 & -4 \\ -4 & -4 & -4 & -4 & 16 \end{bmatrix}$$

--.

In column 30, on lines 22-23 " $\langle 1, \phi_S \rangle_{\Omega_e} = \frac{N+2}{N+1} \langle 1, \phi_B \rangle_{\Omega_e} A_e$ " should read -- $\langle 1, \phi_S \rangle_{\Omega_e} = \frac{N+2}{N+1} \langle 1, \phi_B \rangle_{\Omega_e} = A_e$ --.

In column 30, on lines 51-52 " $\nu' \left\langle \frac{\partial \phi_B}{\partial x_k}, \frac{\partial \phi_B}{\partial x_l} \right\rangle_{\Omega_e} u'_B$ " should read -- $\nu' \langle \frac{\partial \phi_B}{\partial x_k}, \frac{\partial \phi_B}{\partial x_l} \rangle_{\Omega_e} u'_B$ --.

In column 31, on line 18 "$(\Psi_\alpha, \phi_B)\Omega_e=0, \alpha=1\ldots N+1$" should read
-- $\langle \Psi_\alpha, \varphi_B \rangle_{\Omega_e} = 0, \; \alpha = 1 \cdots N+1$ --.

In column 31, on line 20 "$\phi_B$ is a 3 level bubble function" should read
-- $\varphi_B$ is a 3 level bubble function --.

In column 31, on lines 25-26 "$\nu \left\langle \frac{\partial \phi_B}{\partial x_k}, \frac{\partial \varphi_B}{\partial x_l} \right\rangle \Omega_e = \nu' \left\langle \frac{\partial \phi_B}{\partial x_k}, \frac{\partial \phi_B}{\partial x_l} \right\rangle \Omega_e$"
should read -- $\nu \langle \frac{\partial \phi_B}{\partial x_k}, \frac{\partial \varphi_B}{\partial x_l} \rangle_{\Omega_e} = \nu' \langle \frac{\partial \phi_B}{\partial x_k}, \frac{\partial \phi_B}{\partial x_l} \rangle_{\Omega_e}$ --.

In column 32, on lines 11-21 "
$$a_{31} = \left\langle \frac{\partial \phi_B}{\partial x_k}, \frac{\partial \varphi_{B1}}{\partial x_l} \right\rangle \Omega_e - \left\langle \frac{\partial \phi_B}{\partial x_k}, \frac{\partial \phi_B}{\partial x_l} \right\rangle \Omega_e,$$
$$a_{32} = \left\langle \frac{\partial \phi_B}{\partial x_k}, \frac{\partial \varphi_{B2}}{\partial x_l} \right\rangle \Omega_e - \left\langle \frac{\partial \phi_B}{\partial x_k}, \frac{\partial \phi_B}{\partial x_l} \right\rangle \Omega_e,$$
$$a_{33} = \left\langle \frac{\partial \phi_B}{\partial x_k}, \frac{\partial \varphi_{B3}}{\partial x_l} \right\rangle \Omega_e - \left\langle \frac{\partial \phi_B}{\partial x_k}, \frac{\partial \phi_B}{\partial x_l} \right\rangle \Omega_e,$$
$$b_1 = -\langle 1, \varphi_{B4} \rangle_{\Omega_e}, \; b_2 = \langle \phi_B, \varphi_{B4} \rangle_{\Omega_e},$$
$$b_3 = \left( -\left\langle \frac{\partial \phi_B}{\partial x_k}, \frac{\partial \varphi_{B4}}{\partial x_l} \right\rangle \Omega_e - \left\langle \frac{\partial \phi_B}{\partial x_k}, \frac{\partial \phi_B}{\partial x_l} \right\rangle \Omega_e, \right)$$
" should read --
$$a_{31} = \langle \frac{\partial \phi_B}{\partial x_k}, \frac{\partial \varphi_{B1}}{\partial x_l} \rangle_{\Omega_e} - \langle \frac{\partial \phi_B}{\partial x_k}, \frac{\partial \phi_B}{\partial x_l} \rangle_{\Omega_e},$$
$$a_{32} = \langle \frac{\partial \phi_B}{\partial x_k}, \frac{\partial \varphi_{B2}}{\partial x_l} \rangle_{\Omega_e} - \langle \frac{\partial \phi_B}{\partial x_k}, \frac{\partial \phi_B}{\partial x_l} \rangle_{\Omega_e},$$
$$a_{33} = \langle \frac{\partial \phi_B}{\partial x_k}, \frac{\partial \varphi_{B3}}{\partial x_l} \rangle_{\Omega_e} - \langle \frac{\partial \phi_B}{\partial x_k}, \frac{\partial \phi_B}{\partial x_l} \rangle_{\Omega_e},$$
$$b_1 = -\langle 1, \varphi_{B4} \rangle_{\Omega_e}, \; b_2 = -\langle \phi_B, \varphi_{B4} \rangle_{\Omega_e},$$
$$b_3 = -\left( \langle \frac{\partial \phi_B}{\partial x_k}, \frac{\partial \varphi_{B4}}{\partial x_l} \rangle_{\Omega_e} - \langle \frac{\partial \phi_B}{\partial x_k}, \frac{\partial \phi_B}{\partial x_l} \rangle_{\Omega_e} \right)$$
--.

In column 32, on line 43 "$b_1 = -\langle 1, \varphi_{B4} \rangle \Omega_e A_e^{-1}, \; b_2 = -\langle \varphi_B, \varphi_{B4} \rangle \Omega_e A_e^{-1},$"
should read -- $b_1 = -\langle 1, \varphi_{B4} \rangle_{\Omega_e} A_e^{-1}, \; b_2 = -\langle \phi_B, \varphi_{B4} \rangle_{\Omega_e} A_e^{-1},$ --.

CERTIFICATE OF CORRECTION (continued)

U.S. Pat. No. 7,881,912 B2

In column 33, on line 29 " $\delta_1 = -6.8577197\ldots, \beta_2 = 12.6283403\ldots, \delta_3 = -6.8566234\ldots$ " should read -- $\delta_1 = -6.8577197\cdots, \delta_2 = 12.6283403\cdots, \delta_3 = -6.8566234\cdots$ --.

In column 34, on lines 8-9 " $\varphi_B = \dfrac{v_\varphi}{v} \dfrac{\varphi \delta_1 \varphi_{B1} + \delta_2 \varphi_{B2} + \varphi_{B3}}{\delta_1 + \delta_2 + 1}$ " should read -- $\varphi_B = \dfrac{v_\varphi}{v} \dfrac{\delta_1 \varphi_{B1} + \delta_2 \varphi_{B2} + \varphi_{B3}}{\delta_1 + \delta_2 + 1}$ --.

In column 34, on line 13 " $v_\varphi(-\infty < v_\varphi < \infty)$ " should read -- $v_\varphi(-\infty < v_\varphi < \infty)$ --.

In column 34, on lines 16-20 "
$$v' = \dfrac{\dfrac{v_\varphi}{\delta_1 + \delta_2 + 1}\left\langle\dfrac{\partial \phi_B}{\partial x_k}, \dfrac{\partial(\delta_1 \varphi_{B1} + \delta_2 \varphi_{B2} + \varphi_{B3})}{\partial x_l}\right\rangle\Omega_e}{\left\langle\dfrac{\partial \phi_B}{\partial x_k}, \dfrac{\partial \phi_B}{\partial x_l}\right\rangle\Omega_e}$$
"

should read -- $v' = \dfrac{\dfrac{v_\varphi}{\delta_1+\delta_2+1}\langle\dfrac{\partial\phi_B}{\partial x_k}, \dfrac{\partial(\delta_1\varphi_{B1}+\delta_2\varphi_{B2}+\varphi_{B3})}{\partial x_l}\rangle\Omega_e}{\langle\dfrac{\partial\phi_B}{\partial x_k},\dfrac{\partial\phi_B}{\partial x_l}\rangle\Omega_e}$ --.

In column 34, on line 47 " $\langle\Psi_\alpha, \varphi_S\rangle_{\Omega_e} = \dfrac{A_e^2}{\langle 1, \phi_B\rangle_{\Omega_e}}\langle\Psi_\alpha, \varphi_B\rangle_{\Omega_e} = 0, \alpha = 1\ldots N+1$ "

should read-- $\langle\Psi_\alpha, \varphi_S\rangle_{\Omega_e} = \dfrac{A_e}{\langle 1, \phi_B\rangle_{\Omega_e}}\langle\Psi_\alpha, \varphi_B\rangle_{\Omega_e} = 0, \alpha = 1\cdots N+1$ --.

In column 34, on lines 52-56 "
$$v\left\langle\dfrac{\partial\phi_S}{\partial x_k},\dfrac{\partial\varphi_S}{\partial x_l}\right\rangle\Omega_e = \dfrac{A_e^2}{\langle 1,\phi_B\rangle_{\Omega_e}^2}v\left\langle\dfrac{\partial\phi_B}{\partial x_k},\dfrac{\partial\phi_B}{\partial x_l}\right\rangle\Omega_e =$$
$$v'\left\langle\dfrac{\partial\phi_S}{\partial x_k},\dfrac{\partial\varphi_S}{\partial x_l}\right\rangle\Omega_e = \dfrac{A_e^2}{\langle 1,\phi_B\rangle_{\Omega_e}^2}v'\left\langle\dfrac{\partial\phi_B}{\partial x_k},\dfrac{\partial\phi_B}{\partial x_l}\right\rangle\Omega_e$$
"

should read -- $v\langle\dfrac{\partial\phi_S}{\partial x_k},\dfrac{\partial\varphi_S}{\partial x_l}\rangle\Omega_e = \dfrac{A_e^2}{\langle 1,\phi_B\rangle_{\Omega_e}^2}v\langle\dfrac{\partial\varphi_B}{\partial x_k},\dfrac{\partial\varphi_B}{\partial x_l}\rangle\Omega_e$ $= v'\langle\dfrac{\partial\phi_S}{\partial x_k},\dfrac{\partial\phi_S}{\partial x_l}\rangle\Omega_e = \dfrac{A_e^2}{\langle 1,\phi_B\rangle_{\Omega_e}^2}v'\langle\dfrac{\partial\phi_B}{\partial x_k},\dfrac{\partial\phi_B}{\partial x_l}\rangle\Omega_e$ --.

CERTIFICATE OF CORRECTION (continued)
U.S. Pat. No. 7,881,912 B2

In column 36, on lines 35-36 " $\nu\left(\frac{\partial \phi_B}{\partial x_k}, \frac{\partial \varphi_B}{\partial x_l}\right)\Omega_e = \nu'_m\left(\frac{\partial \phi_B}{\partial x_k}, \frac{\partial \phi_B}{\partial x_l}\right)\Omega_e$ ,"

should read -- $\nu\langle\frac{\partial \phi_B}{\partial x_k}, \frac{\partial \varphi_B}{\partial x_l}\rangle_{\Omega_e} = \nu'_m\langle\frac{\partial \phi_B}{\partial x_k}, \frac{\partial \phi_B}{\partial x_l}\rangle_{\Omega_e}$ --.

In column 38, on line 63 " $w(\nu_m')_B{}^T = [w(\nu_1')_{B1} \ldots w(\nu_L')_{BL}]$ ,"

should read -- $w(\nu_m')_B^T = \begin{bmatrix} w(\nu_1')_{B1} & \cdots & w(\nu_L')_{BL} \end{bmatrix}$ --.

In column 40, on lines 51-52 " $\nu\left(\frac{\partial \phi_S}{\partial x_k}, \frac{\partial \varphi_S}{\partial x_l}\right)\Omega_e = \nu'_m\left(\frac{\partial \phi_S}{\partial x_k}, \frac{\partial \phi_S}{\partial x_l}\right)\Omega_e$ ,"

should read -- $\nu\langle\frac{\partial \phi_S}{\partial x_k}, \frac{\partial \varphi_S}{\partial x_l}\rangle_{\Omega_e} = \nu'_m\langle\frac{\partial \phi_S}{\partial x_k}, \frac{\partial \phi_S}{\partial x_l}\rangle_{\Omega_e}$ --.

In column 42, on line 12 " $\tilde{\tau}_{eS}^{-1} u_S^{-1} \approx \tilde{\tau}'_{eR} u'_S$ ," should read -- $\tilde{\tau}_{eS}^{-1} u'_S \approx \tilde{\tau}_{eR}^{-1} u'_S$ --.

In column 43, on line 14 " $w(\nu_m')_S{}^T = [w(\nu_1')_{S1} \ldots w(\nu_L')_{SL}]$ ," should read -- $w(\nu_m')_S^T = \begin{bmatrix} w(\nu_1')_{S1} & \cdots & w(\nu_L')_{SL} \end{bmatrix}$ --.

In column 45, on line 9 "a a0 computer" should read -- a computer --.